US007536303B2

(12) United States Patent
Yoshizawa et al.

(10) Patent No.: US 7,536,303 B2
(45) Date of Patent: May 19, 2009

(54) AUDIO RESTORATION APPARATUS AND AUDIO RESTORATION METHOD

(75) Inventors: Shinichi Yoshizawa, Osaka (JP); Tetsu Suzuki, Osaka (JP); Yoshihisa Nakatoh, Osaka (JP)

(73) Assignee: Panasonic Corporation, Osaka (JP)

( * ) Notice: Subject to any disclaimer, the term of this patent is extended or adjusted under 35 U.S.C. 154(b) by 485 days.

(21) Appl. No.: 11/401,263

(22) Filed: Apr. 11, 2006

(65) Prior Publication Data

US 2006/0193671 A1 Aug. 31, 2006

Related U.S. Application Data

(63) Continuation of application No. PCT/JP2005/022802, filed on Dec. 12, 2005.

(30) Foreign Application Priority Data

Jan. 25, 2005 (JP) ............................ 2005-017424

(51) Int. Cl.
*G10L 21/02* (2006.01)
*G10L 15/20* (2006.01)

(52) U.S. Cl. ........................ 704/231; 704/270; 704/278

(58) Field of Classification Search ................. 704/231, 704/232, 233, 255, 257, 270, 278
See application file for complete search history.

(56) References Cited

U.S. PATENT DOCUMENTS 5,485,524 A * 1/1996 Kuusama et al. ........... 381/94.3
5,673,210 A * 9/1997 Etter ........................... 702/69
7,024,360 B2 * 4/2006 Savic et al. ................. 704/256
7,031,980 B2 * 4/2006 Logan et al. ............. 707/104.1
7,243,060 B2 * 7/2007 Atlas et al. .................. 704/200

(Continued)

FOREIGN PATENT DOCUMENTS

JP 2-4062 1/1990

(Continued)

OTHER PUBLICATIONS

Kenichi Noguchi, et al., *Determination and Removal of Instantaneous Noises in a One-Channel Input Signal*, Mar. 2004, Annual Meetings of the Acoustical Society of Japan, pp. 655-656.

*Primary Examiner*—Martin Lerner
(74) *Attorney, Agent, or Firm*—Wenderoth, Lind & Ponack, L.L.P.

(57) ABSTRACT

An audio restoration apparatus is provided which restores an audio to be restored having a missing audio part and being included in a mixed audio. The audio restoration apparatus includes: a mixed audio separation unit which extracts the audio to be restored included in the mixed audio; an audio structure analysis unit which generates at least one of a phoneme sequence, a character sequence and a musical note sequence of the missing audio part; an unchanged audio characteristic domain analysis unit which segments the extracted audio to be restored into time domains in each of which an audio characteristic remains unchanged; an audio characteristic extraction unit which identifies a time domain where the missing audio part is located, and extracts audio characteristics of the identified time domain in the audio to be restored; and an audio restoration unit which restores the missing audio part in the audio to be restored.

4 Claims, 34 Drawing Sheets

U.S. PATENT DOCUMENTS 7,310,601 B2 * 12/2007 Nishizaki et al. ............ 704/240
7,315,816 B2 * 1/2008 Gotanda et al. ............. 704/226
7,473,838 B2 * 1/2009 Suzuki et al. ................. 84/600
2003/0187651 A1 10/2003 Imatake
2004/0186717 A1 * 9/2004 Savic et al. ................. 704/256
2005/0123150 A1 * 6/2005 Betts ......................... 381/94.3
2006/0136214 A1 6/2006 Sato
2007/0101249 A1 * 5/2007 Lee et al. ................. 715/500.1
2008/0118082 A1 * 5/2008 Seltzer et al. .............. 381/94.1

FOREIGN PATENT DOCUMENTS

JP 2000-222682 8/2000
JP 2003-295880 10/2003
JP 2004-272128 9/2004
JP 2005-18037 1/2005

* cited by examiner

FIG. 9

(a)

*Konni■wa*⇒*Konnichiwa.* (Hello.) Phoneme sequence: chi
*Shin■■■n*⇒*Shinkansen* (Bullet train) Phoneme sequence: kanse (b)

「*Shingo no iro wa aka to■■to kiiro da.*」 ⇒ 「*Shingo no iro wa aka to ao to kiiro da.*」 ("Colors of traffic light are red, green and yellow.") Phoneme sequence: *Ao* (Green)

「*Saru mo* ■■■ *ochiru.*」 ⇒ 「*Saru mo ki kara ochiru.*」 ("Even monkey falls down from tree.") Phoneme sequence: *Ki kara* (from tree)

FIG. 10

(a)

Frame 1 /t/
Frames 2 to 3 /u/

Frames 52 to 55 /a/

(b)

| | |
|---|---|
| Frames 1 to 10 | (*Tsugi* (Next)) |
| Frames 11 to 15 | (*wa*) |
| Frames 16 to 32 | (*Osaka*) |
| Frames 33 to 55 | (*Osaka*) |

(c)

| | | |
|---|---|---|
| Time | 1 seconds to 5 seconds | (*Tsugi wa Osaka, Osaka.* (Next stop is Osaka.)) |
| Time | 8 seconds to 20 seconds | (*Sanbansen ni ressha ga hairi masu.* (Train is arriving at Platform 3.)) |

(d)

⟨Voice characteristic⟩

Frame 1 /t/
Frames 2 to 3 /u/

Frames 52 to 55 /a/

⟨Voice tone⟩

| | |
|---|---|
| Frames 1 to 10 | (*Tsugi*) |
| Frames 11 to 15 | (*wa*) |
| Frames 16 to 32 | (*Osaka*) |
| Frames 33 to 55 | (*Osaka*) |

⟨Speaker's characteristics Gender-specific characteristics, Voice age, Audio volume, Reverberation characteristic, Audio quality⟩

| | |
|---|---|
| Frames 1 to 55 | (*Tsugi wa Osaka, Osaka.* (Next stop is Osaka.)) |
| Frames 80 to 150 | (*Sanbansen ni densha ga hairi masu.* (Electric train is arriving at Platform 3.)) |

| | Audio characteristics 1 (Domain 1) | Audio characteristics 2 (Domain 2) | Audio characteristics 3 (Domain 3) | Audio characteristics 4 (Domain 4) |
|---|---|---|---|---|
| F0 | ... | ... | ... | ... |
| Power | ... | ... | ... | ... |
| Spectrum rate | ... | ... | ... | ... |
| Spectrum characteristics | ... | ... | ... | ... |

FIG. 17

| Frame number | Speech waveform | Distortion level |
|---|---|---|
| 1 | 0.2 | 0.9 |
| 2 | 0.5 | 0.2 |
| 3 | 0.1 | 0.1 |
| 4 | -0.1 | 1.0 |
| 5 | 0.3 | 0.1 |
| ⋮ | ⋮ | ⋮ |

Waveform of mixed audio S101C

FIG. 27

| Frame | Frequency (Hz) | Audio attribute | Power | Distortion level |
|---|---|---|---|---|
| 1 | 0~1 | Friend | 0.2 | 0.9 |
| | 2~5 | Friend | 0.5 | 0.2 |
| | 5~10 | None | 0.1 | 0.1 |
| | 11~50 | None | -0.1 | 1.0 |
| | | | 0.3 | 0.1 |
| | … | … | … | … |
| 2 | 0~1 | | | |
| | 2~5 | | | |
| 3 | | | | |
| 4 | | … | | |
| 5 | | Bell | | |
| … | | … | | |

AUDIO RESTORATION APPARATUS AND AUDIO RESTORATION METHOD

CROSS REFERENCE TO RELATED APPLICATION

This is a continuation application of PCT application No. PCT/JP05/022802 filed Dec. 12, 2005, designating the United States of America.

BACKGROUND OF THE INVENTION (1) Field of the Invention

The present invention relates to an audio restoration apparatus which restores a distorted audio (including speech, music, an alarm and a background audio such as an audio of a car) which has been distorted due to an audio recording failure, an intrusion of surrounding noises, an intrusion of transmission noises and the like.

(2) Description of the Related Art

Recently, our living space is becoming flooded with various types of audios including artificial sounds such as BGM playing in streets and alarms, and audios generated by artificial objects such as cars. This becomes a problem in view of safety, functionality and comfort. For example, at a train station in a big city, an announcement may not be heard due to departure bells, noises of trains, voices of surrounding people and the like. A voice through a mobile phone may not be heard due to surrounding noises. Bicycle's bells may not be heard due to noises of cars. Such being the case, safety, functionality and comfort are impaired.

In view of the above-mentioned changes in the social environment, there is a need to restore a distorted audio to a natural and listenable audio, and to provide a user with the restored audio. The distorted audio has been distorted due to an audio recording failure, an intrusion of environmental noises, an intrusion of transmission noises and the like. It is particularly important to restore the audio using an audio which is similar to the real audio in view of voice characteristic, voice tone, audio color, audio volume, reverberation characteristic, audio quality and the like.

There is a first conventional audio restoration method of restoring speech including a segment distorted due to instantaneous noises by replacing the distorted speech part with the waveform of a segment which is sequential in time (For example, refer to Reference 1: "Ichi-channel nyuuryoku shingo chu toppatsusei zatsuon no hanbetsu to jokyo (Determination and removal of instantaneous noises in a one-channel input signal)", Noguchi and other three authors, March, 2004, Annual meeting of the Acoustical Society of Japan. FIG. 1 shows the conventional audio restoration method disclosed in the above-mentioned Reference 1.

In FIG. 1, in the speech extraction Step 3201, speech parts are extracted by removing the segment of instantaneous noises from the speech waveform distorted by the intrusion of the instantaneous noises. In the speech restoration Step 3202, the speech is restored by inserting the speech waveform of the segment, which is immediately before the extracted distorted segment where instantaneous noises are located, into the position where the distorted segment was located (the disclosure in pp. 655 and 656 of Reference 1 is relevant to the present invention).

There is a second conventional audio restoration method relating to a vehicle traffic information providing apparatus which is mounted on a vehicle, and which receives a radio wave indicating the vehicle traffic information sent from a broadcasting station and provides a driver with vehicle traffic information. The method is intended for restoring speech distorted due to an intrusion of transmission noises by means that a linguistic analysis unit restores a phoneme sequence, and then reading out the restored phoneme sequence through speech synthesis (For example, refer to Patent Reference 1: Japanese Laid-Open Patent Application No. 2000-222682). FIG. 2 shows the conventional audio restoration apparatus disclosed in Patent Reference 1.

In FIG. 2, a receiving apparatus 3302 receives a radio wave of vehicle traffic information sent from the broadcasting station 3301 and converts it into a speech signal. A speech recognition apparatus 3303 performs speech recognition of the speech signal and converts it into language data. A linguistic analysis apparatus 3304 performs linguistic analysis compensating missing parts based on language data with same contents which is repeatedly outputted from the speech recognition apparatus 3303 (the disclosures in claim 2, and FIG. 1 of Patent Reference 1 are relevant to the present invention). A speech synthesis apparatus 3305 reads out information, which is judged as necessary, through speech synthesis. The information is among information of traffic statuses represented by the phoneme sequence restored by the linguistic analysis apparatus 3304.

There is a third conventional audio restoration method relating to a speech packet interpolation method of interpolating a missing part using a speech packet signal inputted before the input of the missing part. The method is intended for interpolating the speech packet corresponding to the missing part by calculating a best-match waveform with regard to the speech packet signal inputted before the input of the missing part by means of non-standardized differential operation processing, each time of inputting a sample value corresponding to a template (For example, refer to Patent Reference 2: Japanese Laid-Open Patent Application No. 2-4062 (claim 1)).

There is a fourth conventional audio restoration method relating to speech communication where packets are used. In the method, the following are used: a judgment unit which judges whether or not speech signal data sequence to be inputted includes a missing segment and outputs a first signal indicating the judgment; a speech recognition unit which performs speech recognition of the speech signal data sequence to be inputted using an acoustic model and a language model, and outputs the recognition result; a speech synthesis unit which performs speech synthesis based on the recognition result of the speech recognition unit, and outputs the speech signal; and a mixing unit which mixes the speech signal data sequence to be inputted and the output by the speech synthesis unit at a mixing rate which changes in response to the first signal, and output the mixing result (For example, refer to Patent Reference 3: Japanese Laid-Open Patent Application No. 2004-272128 (claim 1, and FIG. 1)). FIG. 3 shows the conventional audio restoration apparatus disclosed in the above-mentioned Patent Reference 3.

In FIG. 3, an input unit 3401 extracts speech signal data parts from the respective speech packets which are incoming and outgoing, and outputs them sequentially. The speech recognition unit 3404 performs speech recognition of the speech signal data to be outputted in time sequence from the input unit 3401 using an acoustic model for speech recognition 3402 and a language model 3403, and outputs the recognition results in time sequence. A monitor unit 3407 monitors the respective packets which are incoming and outgoing, and provides the speech recognition unit 3404 with supplemental information indicating whether or not a packet loss occurred. The speech synthesis unit 3406 performs speech synthesis using the acoustic model for speech synthesis 3405 based on the phoneme sequence outputted from the speech recognition unit 3404, and outputs a digital speech signal. A buffer 3408 stores outputs from the input unit 3401. A signal mixing unit 3409 is controlled by the monitor unit 3407, and selectively outputs one of (a) the outputs of the speech synthesis unit 3406 in a period corresponding to a packet loss and (b) the outputs of the buffer 3408 in periods other than the period corresponding to the packet loss.

However, the first conventional configuration has been conceived assuming that the audio to be restored has a waveform. Thus, the configuration makes it possible to restore an audio only in a rare case where the audio has a repeated waveform and a part of the repeated waveform has been lost. The configuration has drawbacks that: it does not make it possible to restore (a) many general audios which exist in a real environment and which cannot be represented in a waveform and (b) an audio to be restored which is entirely distorted.

In the second conventional configuration, a phoneme sequence is restored using knowledge regarding the audio structure through linguistic analysis when a distorted audio is restored. Therefore, it becomes possible to restore an audio linguistically even in the case where the audio to be restored is a general audio with a non-repeated waveform or an audio which is entirely distorted. However, there is no concept of restoring an audio using an audio which is similar to the real audio based on audio characteristic information such as speaker's characteristics, and voice characteristic. Therefore, the configuration has a drawback that it does not make it possible to restore an audio which sounds natural in a real environment. For example, in the case of restoring a voice of a Disk Jockey (DJ), the audio is restored using another person's voice stored in a speech synthesis apparatus.

In the third conventional configuration, a missing audio part is generated through a pattern matching at a waveform level. Therefore, the configuration has a drawback that it does not make it possible to restore a missing audio part in the case where the whole segment where the waveform changes has been lost. For example, it does not make it possible to restore an utterance of "Konnichiwa (Hello)" in the case where plural phonemes have been lost as represented by "Koxxchiwa" (Each x shows that there is a missing phoneme.)

In the fourth conventional configuration, knowledge regarding an audio structure of "language model" is used. Therefore, even in the case of an audio with missing phonemes, it makes it possible to estimate a phoneme sequence of an audio to be restored based on the context, and restoring the audio linguistically. However, there is no concept of extracting audio characteristics, which include voice characteristic, voice tone, audio volume, and reverberation characteristic, from an inputted speech, and restoring the speech based on the extracted audio characteristics. Therefore, the configuration has a drawback that it does not make it possible to restore a speech with high fidelity with respect to real audio characteristics in the case where voice characteristic, voice tone and the like of a person change from one minute to the next depending on the person's feeling and tiredness.

With those conventional configurations, it was impossible to restore a distorted audio using real audio characteristics, in the case where the distorted audio is a general audio which has a non-repeated waveform and exist in this real world.

SUMMARY OF THE INVENTION

The present invention solves these conventional problems. An object of the present invention is to provide an audio restoration apparatus and the like which restores a distorted audio (including speech, music, an alarm and a background audio such as an audio of a car) which has been distorted due to an audio recording failure, an intrusion of surrounding noises, an intrusion of transmission noises and the like.

The inventors of the present invention found it important to look at the following facts: (A) Plural voices of people exist in audios in a real environment, for example, in a case where person B speaks after person A speaks and in another case where persons A and B speak at the same time; (B) a voice characteristic, a voice tone and the like of a person change from one minute to the next depending on the person's feeling and tiredness; and (C) the audio volume and reverberation characteristic of a background audio and the like change from one minute to the next according to changes in the surrounding environment. Under these circumstances, it is difficult to previously store all audio characteristics which exist in a real environment. Therefore, there is a need to extract audio to be restored which is included in a mixed audio, and extract the real audio characteristics, of the audio part to be restored, from among the extracted audio to be restored. Here, in order to extract such audio characteristics with high accuracy, the data of a waveform corresponding to a comparatively long duration is required. Therefore, if an audio is restored by simply extracting only the audio characteristics of an audio part which is in time proximity to the missing part in the audio to be restored, the audio will be distorted. In addition, in the case where audio characteristics change in the time proximity to the missing part in the audio to be restored, audio characteristics which are different from real audio characteristics are to be extracted. For this reason, changes of audio characteristics of the audio to be restored which has been extracted from a mixed audio are monitored, and the audio is segmented into time domains in each of which audio characteristics remain unchanged. In other words, the audio to be restored is segmented by time points at which the audio characteristics change so as to be classified into time domains in each of which audio characteristics remain unchanged. By extracting audio characteristics of an audio using audio data (such as waveform data) having comparatively long durations which corresponds to the time domains where audio characteristics remain unchanged and the missing parts are located, it is possible to reproduce real audio characteristics with fidelity. Time domains where audio characteristics remain unchanged change depending on the nature of the audio to be restored in a mixed audio whose state changes from one minute to the next. Therefore, it is required to obtain time domains of an audio to be restored in the inputted mixed audio in each restoration.

The audio restoration apparatus of the present invention restores an audio to be restored having a missing audio part and being included in a mixed audio. The audio restoration apparatus includes: a mixed audio separation unit which extracts the audio to be restored included in the mixed audio; an audio structure analysis unit which generates at least one of a phoneme sequence, a character sequence and a musical note sequence of the missing audio part in the extracted audio to be restored, based on an audio structure knowledge database in which semantics of audio are registered; an unchanged audio characteristic domain analysis unit which segments the extracted audio to be restored into time domains in each of which an audio characteristic remains unchanged; an audio characteristic extraction unit which identifies a time domain where the missing audio part is located, from among the segmented time domains, and extracts audio characteristics of the identified time domain in the audio to be restored; and an audio restoration unit which restores the missing audio part in the audio to be restored, using the extracted audio characteristics and the generated one or more of phoneme sequence, character sequence and musical note sequence.

With this configuration, audio structure information is generated using an audio structure knowledge database where semantics of audio are registered, and the audio is restored based on the audio structure information. The audio structure information to be generated includes at least one of a phoneme sequence, a character sequence and a musical note sequence. Therefore, it is possible to restore a wide variety of general audios (including speech, music and a background audio). Together with this, a missing audio part in an audio to be restored is restored based on the audio characteristics of the audio within a time domain where audio characteristics remain unchanged. Therefore, it is possible to restore the audio having audio characteristics with high fidelity with respect to the real audio characteristics, in other words, it is possible to restore the audio to be restored before being distorted or lost.

Preferably, in the audio restoration apparatus, the unchanged audio characteristic domain analysis unit determines time domains in each of which an audio characteristic remains unchanged, based on at least one of a voice characteristic change, a voice tone change, an audio color change, an audio volume change, a reverberation characteristic change, and an audio quality change.

With this configuration, it is possible to accurately obtain a time domain where audio characteristics remain unchanged. Therefore, it is possible to generate audio characteristic information with high accuracy, and this makes it possible to restore the audio to be restored accurately.

More preferably, in the audio restoration apparatus, the audio restoration unit restores the whole audio to be restored which is made up of the missing audio part, and the part other than the missing audio part, using the extracted audio characteristics and the generated one or more of the phoneme sequence, the character sequence and the musical note sequence.

With this configuration, a missing audio part and the other audio parts are restored using the same audio characteristics. Therefore, it is possible to restore the audio where the restored part is highly consistent with the other parts.

With the audio restoration apparatus of the present invention, it is possible to restore a wide variety of general audios (including speech, music and a background audio). Further, since it is possible to restore an audio having audio characteristics with high fidelity with respect to the real audio characters, the present invention is highly practical.

FURTHER INFORMATION ABOUT TECHNICAL BACKGROUND TO THIS APPLICATION

The disclosure of Japanese Patent Application No. 2005-017424 filed on Jan. 25, 2005 including specification, drawings and claims is incorporated herein by reference in its entirety.

The disclosure of PCT application No. PCT/JP05/022802 filed, Dec. 12, 2005, including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 9 is a diagram showing an example of a generation method of audio structure information;

FIG. 10 is a diagram showing an example of information of domains where audio characteristics remain unchanged;

FIG. 17 is a diagram showing an example of separated audio information;

FIG. 27 is a diagram showing an example of separated audio information;

DESCRIPTION OF THE PREFERRED EMBODIMENT(S)

Embodiments of the present invention will be described below with reference to figures. Note that the parts which are the same or corresponding to the earlier-mentioned parts are provided with the same reference numbers, and the descriptions of the parts are not repeated.

First Embodiment

Figure 1:
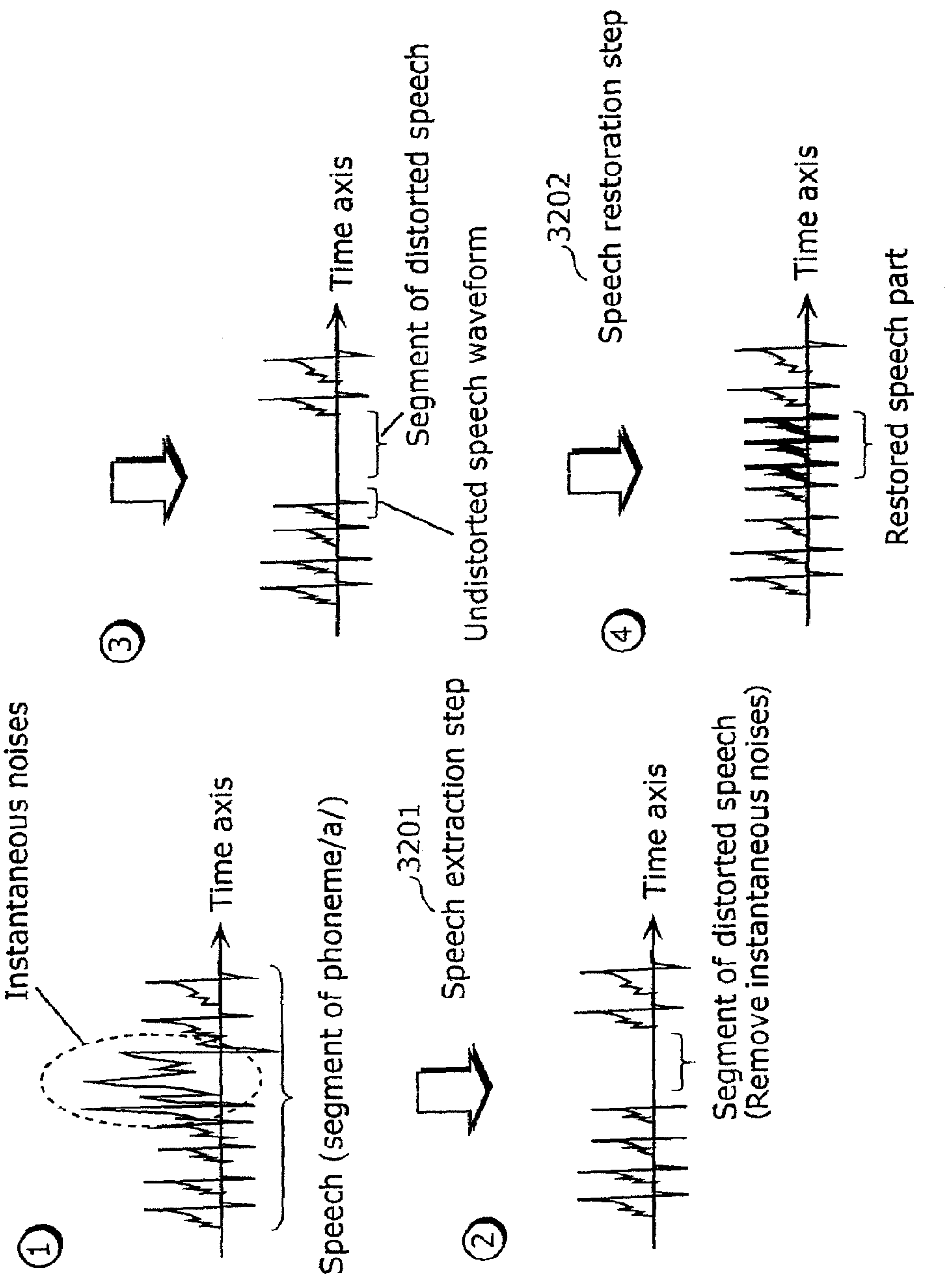
FIG. 1 PRIOR ART
FIG. 1 is a diagram illustrating a first conventional audio restoration method.
Figure 2:
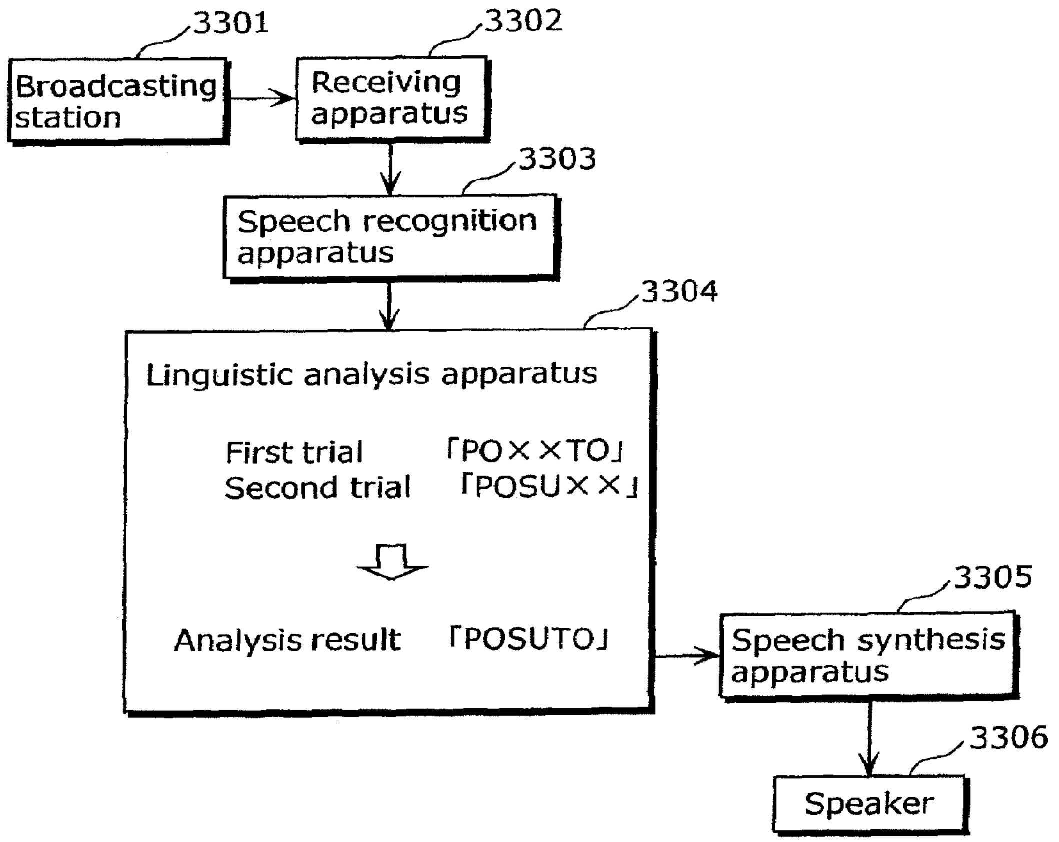
FIG. 2 PRIOR ART
FIG. 2 is a diagram illustrating a second conventional audio restoration method.
Figure 3:
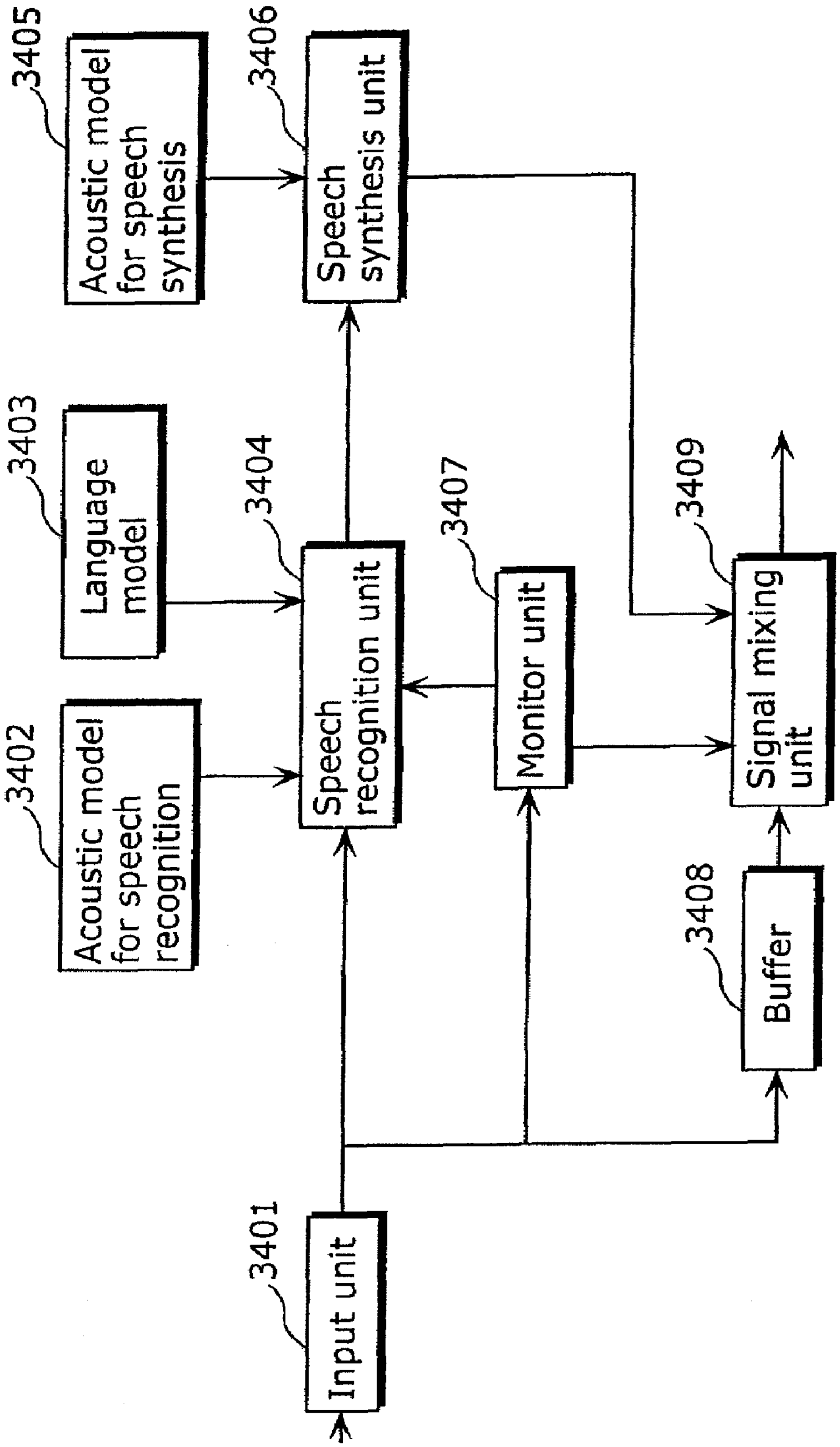
FIG. 3 PRIOR ART
FIG. 3 is a diagram illustrating a fourth conventional audio restoration method.
Figure 4:
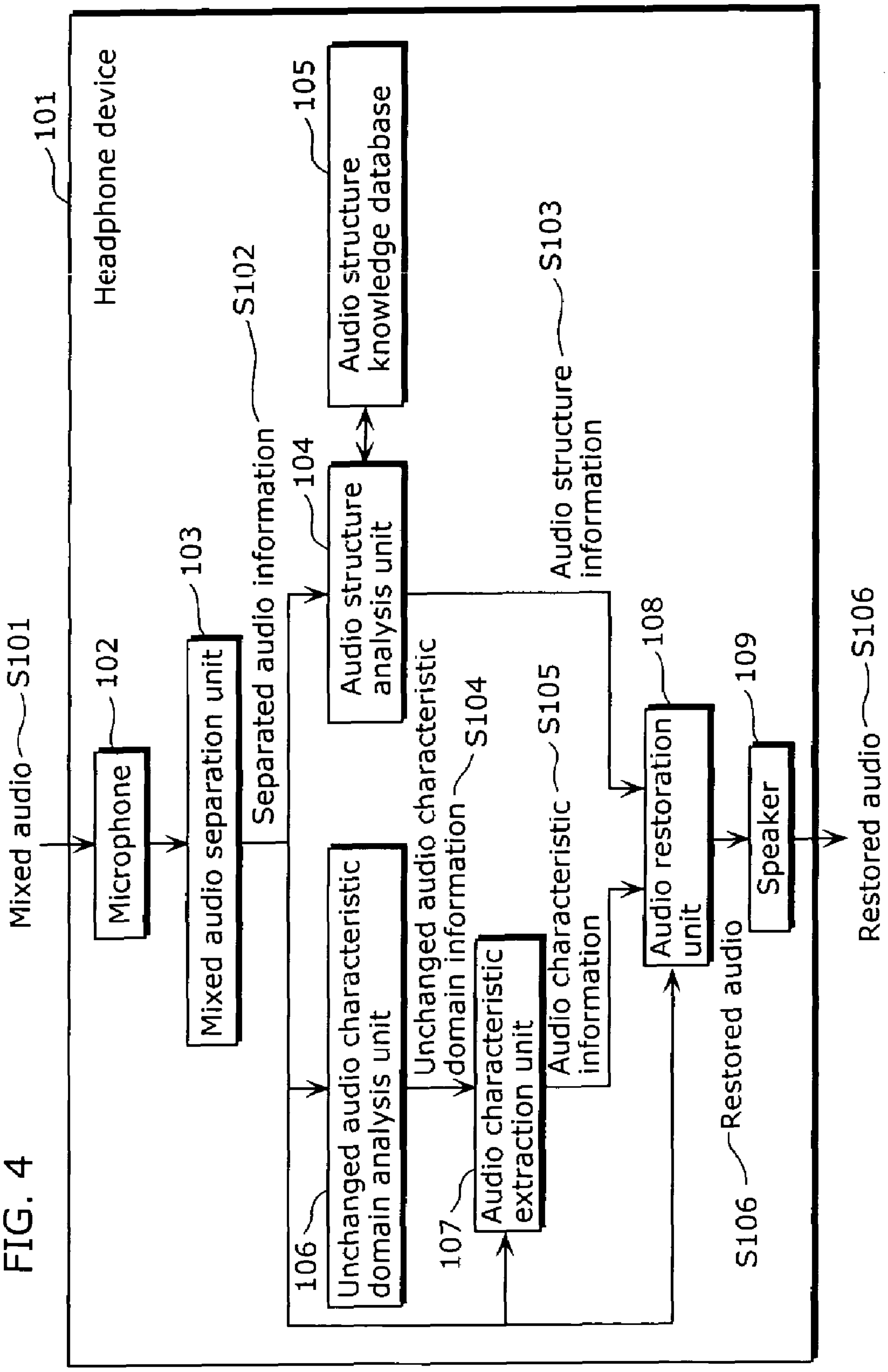
FIG. 4 is a block diagram showing an overall configuration of an audio restoration apparatus in a first embodiment of the present invention.

FIG. 4 is a block diagram showing an overall configuration of an audio restoration apparatus in a first invention of the present invention. Here will be described the audio restoration apparatus using an example case where the audio restoration apparatus is incorporated in a headphone device 101.

As audios to be restored, the following cases will be described later on: <I> case of restoring speech, <II> case of restoring musical notes, and <III> case of restoring overlapped two types of audios (speech and background audio). In each of the three cases, the following audio restoration methods will be described later on: <i> method of restoring only a missing part, and <ii> method of restoring the whole audio including the missing part.

In FIG. 4, the headphone device 101 is provided with an audio restoration function of restoring an audio, in a mixed audio, needed by a user. It is also possible to use the headphone device 101 provided with functions of, for example, a mobile phone, a mobile music stereo, and a hearing aid. The headphone 101 in FIG. 4 includes: a microphone 102, a mixed audio separation unit 103, an audio structure analysis unit 104, an audio structure knowledge database 105, an unchanged audio characteristic domain analysis unit 106, an audio characteristic extraction unit 107, an audio restoration unit 108, and a speaker 109.

The headphone device 101 is an example audio restoration unit. It restores an audio which includes a missing audio part to be restored and which is included in a mixed audio. The mixed audio separation unit 103 is an example mixed audio separation unit which extracts the audio to be restored included in the mixed audio. The audio structure analysis unit 104 is an example audio structure analysis unit which generates at least one of a phoneme sequence, a character sequence, and a musical note sequence of the missing audio part of the extracted audio to be restored, based on the audio structure knowledge database 105 where semantics of audio parts are registered. The unchanged audio characteristic domain analysis unit 106 is an example unchanged audio characteristic domain analysis unit which segments the extracted audio to be restored into time domains where audio characteristics remain unchanged. The audio characteristic extraction unit 107 is an example audio characteristic extraction unit which identifies the time domains including the missing audio parts from among the segmented time domains, and extracts the audio characteristics of the identified time domains in the audio to be restored. The audio restoration unit 108 is an example audio restoration unit which restores the missing audio part in the audio to be restored using the extracted audio characteristics and the generated one or more of the phoneme sequence, character sequence and musical note sequence. The one or more generated sequences have been generated by the audio structure analysis unit 104. Note that "phoneme sequence" includes "prosodeme sequence" and the like, not only "phoneme sequence". Additionally, "character sequence" includes "word sequence", "sentence sequence" and the like, not only "character sequence". Further, "musical note sequence" shows a sequence of musical notes as will be described later on.

The respective processing units which constitute the headphone device 101 will be described below in detail.

The microphone 102 is intended for inputting a mixed audio S101 and outputting it to the mixed audio separation unit 103.

The mixed audio separation unit 103 extracts an audio material to be restored from the mixed audio S101 as separated audio information S102. The audio materials are information of the waveform of the separated audio and information of a missing audio part.

The audio structure analysis unit 104 generates audio structure information S103 which shows the semantics of the audio parts to be restored, based on the separated audio information S102 extracted by the mixed audio separation unit 103 and the audio structure knowledge database 105. Note that the waveform information includes not only the audio waveform on a time axis but also a spectrogram which will be described later on.

The unchanged audio characteristic domain analysis unit 106 obtains domains where audio characteristics remain unchanged based on the separated audio information S102 extracted by the mixed audio separation unit 103 and generates unchanged audio characteristic domain information S104. Here, audio characteristics correspond to representations of an audio. In addition, "segmenting" in the Claims of the present invention corresponds to obtaining a domain where audio characteristics remain unchanged.

The audio characteristic extraction unit 107 extracts the audio characteristics of each domain, in which audio characteristics remain unchanged, in the audio to be restored. This extraction is performed based on the unchanged audio characteristic domain information S104 generated by the unchanged audio characteristic domain analysis unit 106 and generates audio characteristic information S105.

The audio restoration unit 108 generates a restored audio S106 based on the audio structure information S103 generated by the audio structure analysis unit 104 and the audio characteristic information S105 generated by the audio characteristic extraction unit 107.

The speaker 109 outputs the restored audio S106 generated by the audio restoration unit 108 to the user.

Figure 5:
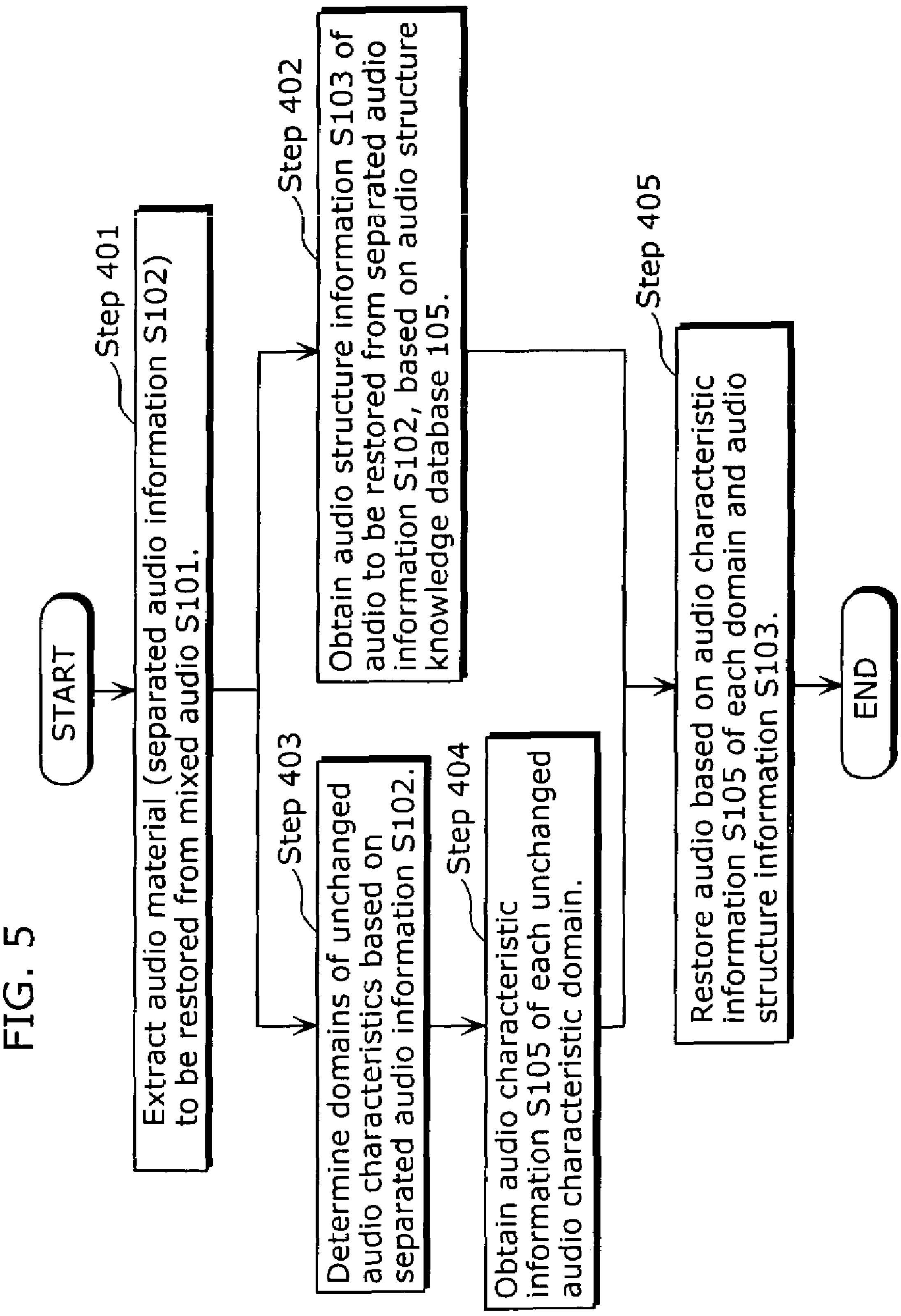
FIG. 5 is a flow chart showing an operation flow of the audio restoration apparatus in the first embodiment of the present invention.

FIG. 5 is a flow chart showing an operation flow of the audio restoration apparatus in the first embodiment of the present invention.

To get things started, the mixed audio separation unit 103 extracts, from the mixed audio S101, an audio material to be restored which is the separated audio information S102 (Step 401). Next, the audio structure analysis unit 104 generates audio structure information S103 based on the extracted separated audio information S102 and the audio structure knowledge database 105 (Step 402). In addition, the unchanged audio characteristic domain analysis unit 106 obtains domains where audio characteristics remain unchanged from the extracted separated audio information S102 and generates unchanged audio characteristic domain information S104 (Step 403). Subsequently, the audio characteristic extraction unit 107 extracts the audio characteristics of each domain of unchanged audio characteristics in the audio to be restored, based on the unchanged audio characteristic domain information S104, and generates audio characteristic information S105 (Step 404). Lastly, the audio restoration unit 108 generates a restored audio S106 based on the audio characteristic information S105 for each domain and the audio structure information S103 (Step 405).

A concrete example of applying this embodiment to an audio restoration function of the headphone device 101 will be described next. Here will be considered the case of restoring an audio to be needed by a user from a mixed audio made up of: voices of various people, bicycle's bells, noises of a running car, noises of a train, an announcement at a platform of a station and chimes, BGM playing in streets and the like.

<I> Case of Restoring Speech

<i> Method of Restoring a Missing Speech Part

A user is listening to an announcement at a platform of a station in order to confirm the time when the train on which the user is going to ride will arrive at the platform. However, due to sudden chimes, the announcement speech is partially lost. Here will be described a method of restoring the announcement speech by using the audio restoration apparatus of the present invention.

In this example, in FIG. 4, the mixed audio S101 is a mixed audio where the announcement speech and chimes are overlapped with each other, and the restored audio S106 which is desired to be generated is the announcement speech. The audio structure knowledge database 105 is made up of a phoneme dictionary, a word dictionary, a morpheme dictionary, a language chain dictionary, a thesaurus dictionary, and an example usage dictionary. The unchanged audio characteristic domain analysis unit 106 determines segments where audio characteristics remain unchanged, based on phoneme segments, word segments, clause segments, sentence segments, utterance content segments, and/or utterance segments. In addition to this, the unchanged audio characteristic domain analysis unit 106 may determine time domains where audio characteristics remain unchanged, based on a voice characteristic change, a voice tone change, an audio color change, an audio volume change, a reverberation characteristic change, an audio quality change, and/or the like.

The audio restoration unit 108 restores the missing audio part of the audio to be restored, based on the audio structure information S103 and the audio characteristic information S105, and generates the other audio parts using the separated audio information S102.

Figure 6:
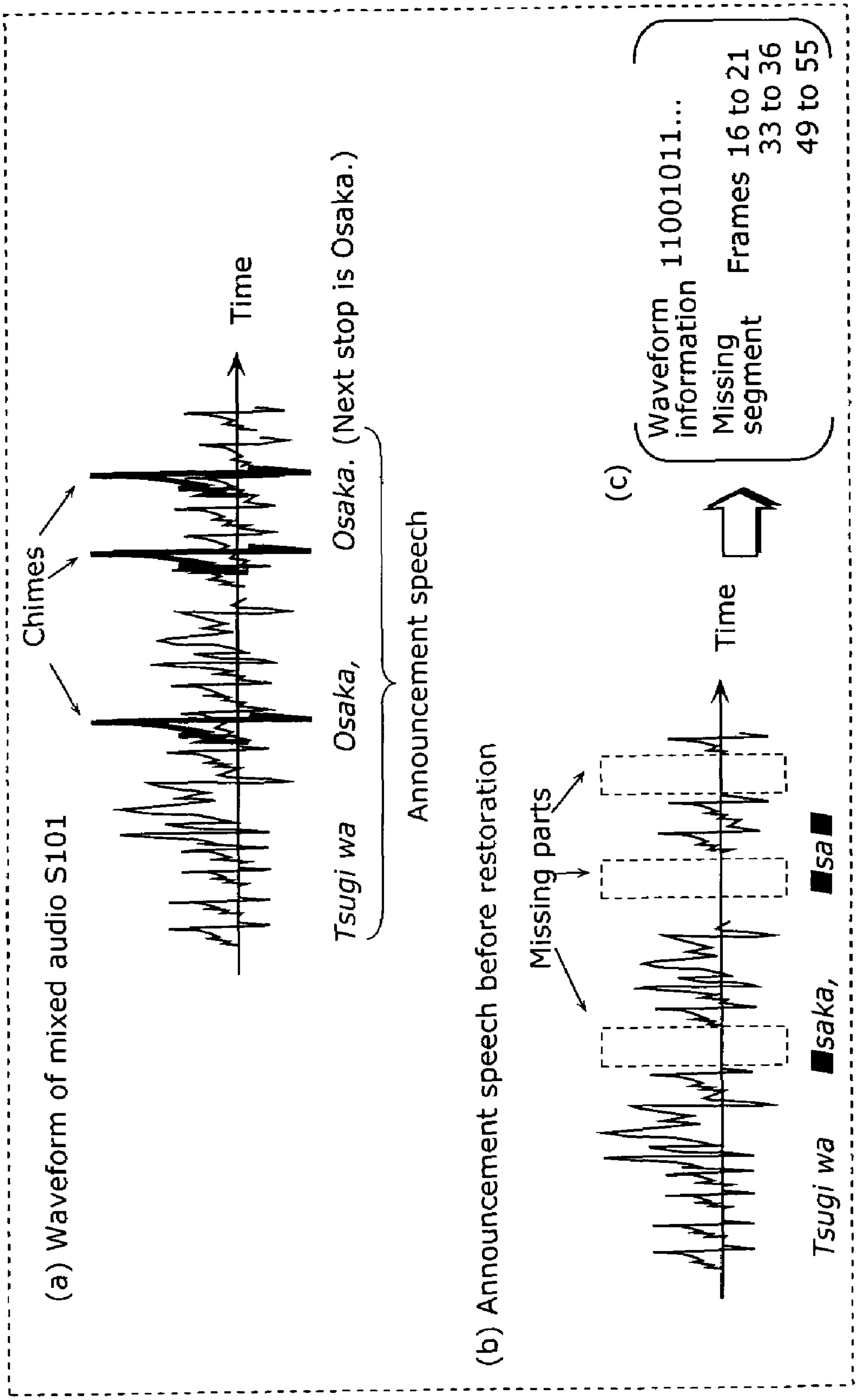
FIG. 6 is a diagram showing an example of a mixed audio and information of separated audios.

To get things started, the mixed audio S101 where the announcement speech and the chimes are overlapped with each other is received by the microphone 102 mounted on the headphone device 101. FIG. 6(*a*) shows an example schematic diagram of the mixed audio where the announcement speech and the chimes are overlapped. In this example, due to the chimes, the announcement speech of "Tsugi wa Osaka, Osaka (Next stop is Osaka, Osaka)" is partially lost, and as shown in FIG. 6(*b*), it is distorted to be "Tsugi wa ■saka, ■sa■". Here, the speech parts which are not distorted and sound natural are used as they are, and the speech parts shown as "■" will be restored.

First, the mixed audio separation unit 103 extracts the separated audio information S102 using the mixed audio S101 received by the microphone 102 (corresponding to Step 401 of FIG. 5). Here, it extracts a speech waveform calculated by extracting the components of the announcement speech to be restored and missing segment information of the announcement speech which are the separated audio information S102. Here, it analyzes the frequency of the mixed audio and detects the time at which chimes are inserted, based on the rises and falls of the power, power change in a specific frequency band and the like. Unlike the speech, chimes have constant power in the entire frequency band. Thus, based on this characteristic, the mixed audio separation unit 103 detects the time points at which the chimes are inserted. Subsequently, it extracts, as the separated audio information S102, the mixed audio (announcement speech and waveform information) of the duration during which the chimes were not inserted and the time frame information (missing segment frame) of the time points at which the chimes were inserted (Refer to FIG. 6(*c*)).

Figure 7:
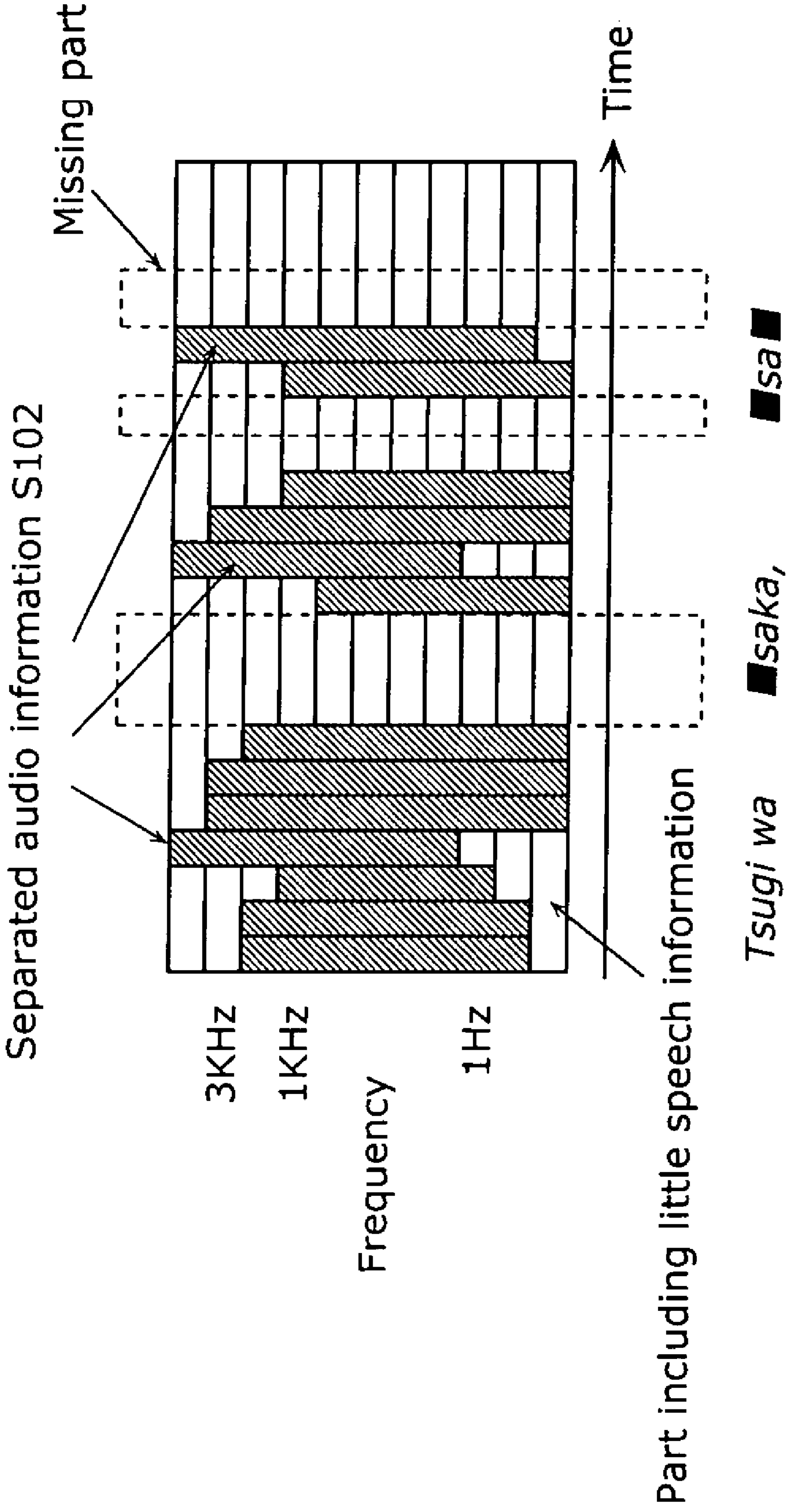
FIG. 7 is a diagram showing an example of the separated audio information.

Note that the mixed audio separation unit 103 may extract the separated audio information S102 using an auditory scene analysis, an independent component analysis, or array processing where plural microphones are used. In addition, as shown in FIG. 7, a part of the separated audio information S102 may be represented as information (for example, a set of time information, frequency information and power) on the spectrogram which has been subjected to frequency analysis, instead of being represented as the waveform information.

Next, the audio structure analysis unit 104 generates audio structure information 1103 of the announcement speech based on: the separated audio information S102 extracted by the mixed audio separation unit 103; and the audio structure knowledge database 105 which is made up of a phoneme dictionary, a word dictionary, a morpheme dictionary, a language chain dictionary, a thesaurus dictionary, and an example usage dictionary (corresponding to Step 402 of FIG. 5). Here, as audio structure information S103, it generates information of a prosodeme sequence of the announcement speech. First, it performs a feature analysis of the waveform of the extracted announcement speech which is a part of the separated audio information S102 as shown in FIG. 6(*c*), and converts it into Cepstrum coefficients used in speech recognition. Next, it performs speech recognition using the converted Cepstrum coefficients. It inputs these Cepstrum coefficients into the phoneme dictionary made up of hidden Markov models which have been previously learned through a lot of speech data, and calculates the likelihoods with respect to the respective phoneme models. Subsequently, considering probabilities of the respective phonemes based on the calculated likelihoods, it identifies the prosodeme sequence with the highest probability using the followings: the word dictionary where words used at platforms of stations are registered; the morpheme dictionary where morpheme rules of consecutive words are described; the language chain dictionary represented by probability models called N-grams generated from utterance contents used at platforms of stations; the thesaurus dictionary where synonyms are registered so that synonyms can be exchanged; and the example usage dictionary where utterance contents of plural announcement speeches are registered. Subsequently, it generates prosodeme sequence information (audio structure information S103).

Figure 8:
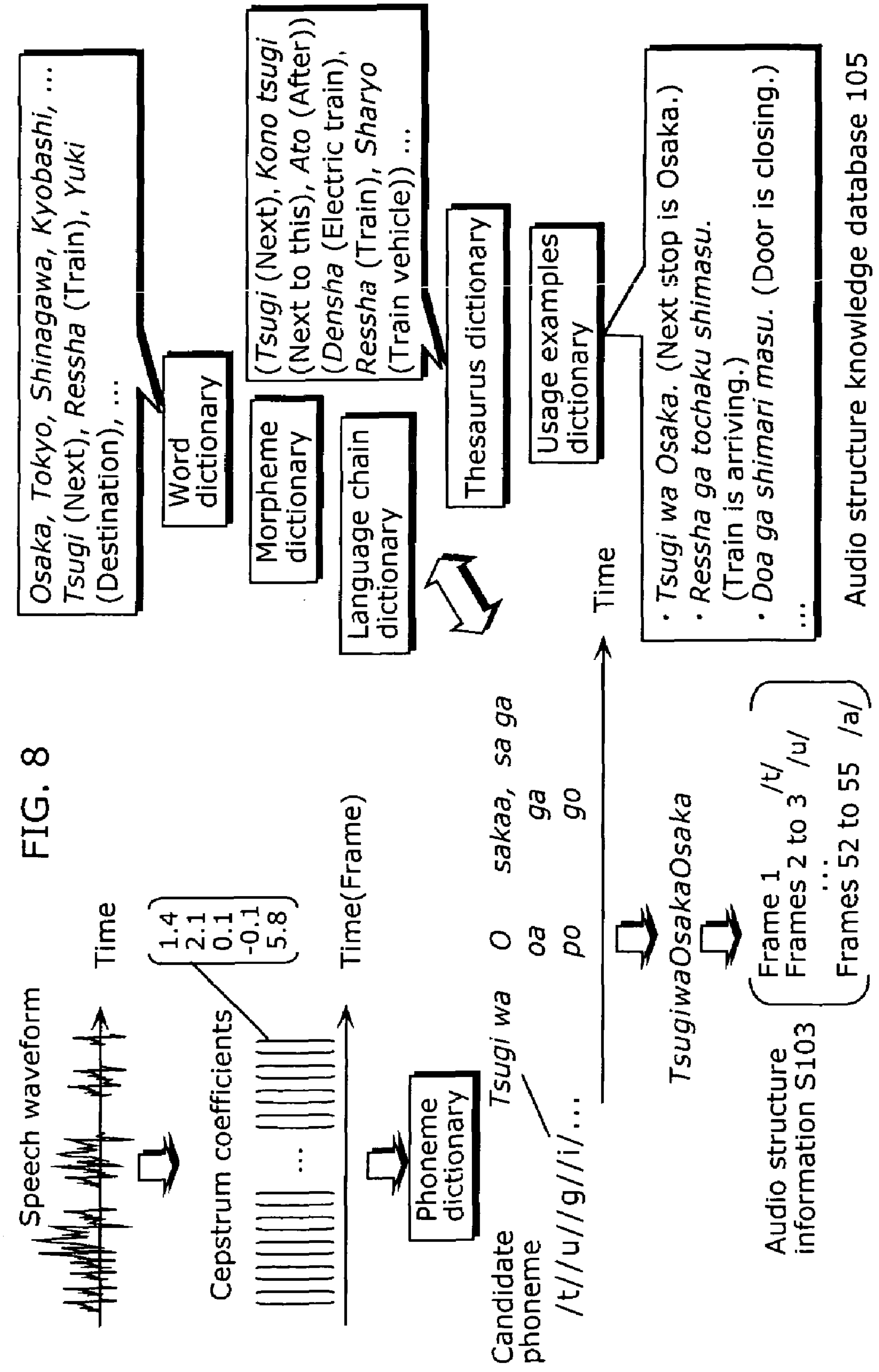
FIG. 8 is a diagram showing an example of a generation method of audio structure information.

FIG. 8 shows an example where audio structure information S103 is generated from the separated audio information S102. Here, due to chimes, the announcement speech of "Tsugi wa Osaka, Osaka (Next stop is Osaka, Osaka)" is partially lost, and thus the separated audio information S102 is distorted to be "Tsugi wa ■saka, ■sa■". Here is shown an example of restoring prosodeme sequence information of "Tsugi wa Osaka, Osaka" from the distorted "Tsugi wa ■saka, ■sa■", using the audio structure knowledge database 105.

In addition, FIG. 9 shows another example where prosodeme sequence information is obtained. As shown in FIG. 9A, the audio structure analysis unit 104 can identify "Konni■wa" as "Konnichiwa (Hello)", and identify "Shin■■■n" as "Shinkansen (bullet train)", using a word dictionary. In addition, as shown in FIG. 9B, it can identify "Shingo no iro wa aka to ■■ to kiiro da." as "Shingo no iro wa aka to ao to kiiro da (The colors of traffic light are red, green and yellow.).", and identify "Saru mo ■ ■■ ochiru" as "Saru mo ki kara ochiru (Even a monkey falls down from a tree.).", using an example usage dictionary.

Note that the audio structure analysis unit 104 may use a speech recognition algorithm of Missing Feature. Missing Feature is intended for obtaining a prosodeme sequence through a likelihood matching of the prosodeme sequence and the speech recognition models without using the waveform information of a missing part. Here, the likelihood is regarded as constant. It used all the six types of dictionaries in this example, however, it may use only a part of them. Note that, the audio structure knowledge database 105 may be updated as a need arises.

Next, the unchanged audio characteristic domain analysis unit 106 obtains domains where unchanged audio characteristics remain unchanged based on the separated audio information S102 extracted by the mixed audio separation unit 103, and generates unchanged audio characteristic domain information S104 (corresponding to Step 403 of FIG. 5). Here, it obtains domains where audio characteristics remain unchanged based on phoneme segments, word segments, clause segments, sentence segments, utterance content segments, and/or utterance segments, and generates unchanged audio characteristic domain information S104. First, it generates prosodeme sequence information using the separated audio information S102 in a similar manner that the audio structure analysis unit 104 has done so. Based on this prosodeme sequence information, it can determine phoneme segments, word segments, clause segments, and sentence segments. At this time, an audio structure database is previously stored in the unchanged audio characteristic domain analysis unit 106. For example, the segments of phonemes may be represented as frames and phoneme types. In addition, word segments may be represented as "Tsugi", "wa", "Osaka", and "Osaka". Additionally, clause segments may be represented as "Tsugiwa", "Osaka", and "Osaka". Further, the unchanged audio characteristic domain analysis unit 106 can determine segments of utterance contents based on the prosodeme sequence information and the example usage dictionary. For example, the unchanged audio characteristic domain analysis unit 106 can previously classify usage examples of the same utterance contents into groups, and previously detect the group to which uttered contents belongs based on the prosodeme sequence information. When a group is changed to another group in this example, it can determine utterance content segments regarding utterance contents as changed. In addition, it can determine the utterance segments by detecting a silent segment in the frequency band of the speech. Based on the segment information, it generates unchanged audio characteristic domain information S104 showing the information of domains where audio characteristics remain unchanged.

FIG. 10 shows an example of the unchanged characteristic domain information S104. FIG. 10(*a*) represents domains where audio characteristics remain unchanged each of which is a phoneme segment. For example, the phoneme of the Frames 2 and 3 is "/u/". This shows that the voice characteristic is the same between the Frames 2 and 3. FIG 10(*b*) represents domains where audio characteristics remain unchanged and each of which is a word segment. For example, it shows that the Frames 1 to 10 constitute an unchanged audio characteristic domain, and that the word "Tsugi (Next)" is included in the Frames 1 to 10. FIG. 10(*c*) represents domains where audio characteristics remain unchanged using representations by durations and the respectively corresponding sentences. For example, it shows that the duration corresponding to first to fifth seconds is an unchanged audio characteristic domain, and that the sentence in the duration is "Tsugi wa Osaka, Osaka (Next stop is Osaka, Osaka).". In addition, as shown in FIG. 10(*d*), the unchanged audio characteristic domain analysis unit 106 may determine the domains where an audio characteristic which is desired to be extracted remains unchanged. For example, it may simultaneously determine the following: the unchanged audio characteristic domains each of which has an unchanged voice characteristic; the unchanged audio characteristic domains each of which has an unchanged voice tone; and the unchanged audio characteristic domains each of which has unchanged speaker's characteristics, gender-specific characteristics, a voice age, an audio volume, reverberation characteristics, and/or an audio qualities.

In this way, in the announcement speech, speaking intonation changes greatly, each phoneme has a unique characteristic such as a nasal utterance, and the voice characteristics vary depending on spoken contents. Hence, the audio characteristics change from one minute to the next even in utterances of a same person. Therefore, it is greatly important to restore an audio by restoring it after: determining domains where audio characteristics remain unchanged in the audio, on a phoneme basis, on a word basis, on a clause basis, on a sentence basis, on an utterance content basis, on an utterance unit basis and/or the like; and extracting desired audio characteristics.

Here, the unchanged audio characteristic domain analysis unit 106 generates the unchanged audio characteristic domain information using all the phoneme segment, word segment, clause segment, sentence segment, utterance content segment, and utterance segment. However, it should be noted that it may generate the unchanged audio characteristic domain information using a part of them.

Figure 11:
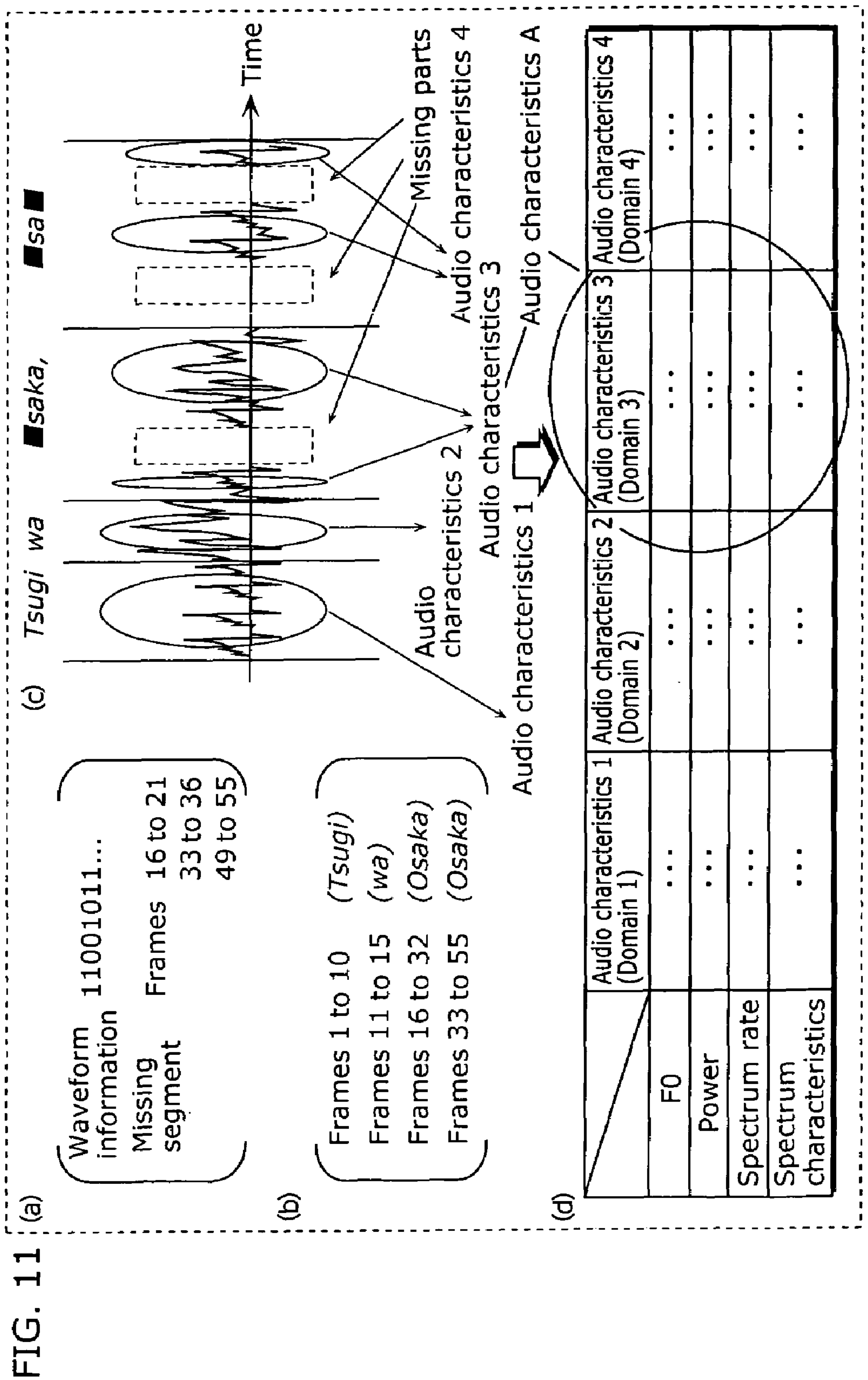
FIG. 11 is a diagram showing an example of audio characteristic information.

Next, the audio characteristic extraction unit 107 extracts the audio characteristics of each domain, where audio characteristics remain unchanged, in the announcement speech, based on the separated audio information S102 extracted by the mixed audio separation unit 103 and the unchanged audio characteristic domain information S104 generated by the unchanged audio characteristic domain analysis unit 106 and generates audio characteristic information S105 (corresponding to Step 404 of FIG. 5). Here, it extracts audio characteristics based on: who is the speaker of the voice; whether the speaker is male or female; whether the speaker is a child or an elderly person; whether the voice is clear voice, hoarse voice or the voice when the speaker has a cold; whether the voice tone is gentle or angry; whether the voice is a scream or a whisper; whether the reverberation of the voice is large or small; whether the audio quality is high or low; or the like. Here, it extracts the speaker's characteristics, the gender-specific characteristics, the voice age, the voice characteristic, the voice tone, the audio volume, the reverberation characteristic, and audio quality of each domain in the announcement speech to be restored and generates audio characteristic information S105 of the extracted audio characteristics. Here, it extracts, as audio characteristic information S105, the fundamental frequency F0, power, spectrum rate, spectrum characteristic of each domain based on the unchanged audio characteristic domain information S104, in order to use the audio characteristic information S105 in speech recognition. Here will be provided descriptions using the separated audio information S102 (shown in FIG. 6(*c*) and 11(*a*)) and the unchanged audio characteristic domain information S104 (shown in FIG. 10(*b*) and FIG. 11(*b*)). First, based on the unchanged audio characteristic domain information S104 shown in FIG. 11(*b*), it segments the audio into domains where the unchanged audio characteristics remain unchanged. As shown in FIG. 11(*c*), it segments here the audio into the following four domains: a domain of frames 1 to 10, a domain of frames 11 to 15, a domain of frames 16 to 32, and a domain of frames 33 to 55. Next, it extracts the audio characteristics of the respective segmented domains using speech waveform information of frames, other than the missing segments, which are a part of the separated audio information S102. Here, as shown in FIG. 11(*a*), here are three missing parts: frames 16 to 21, frames 33 to 36, and frames 49 to 55. FIG. 11(*d*) shows an example of audio characteristic information S105. In this example, it determines the F0, power, spectrum rate, and spectrum characteristic of each segmented domain. For example, it determines the audio characteristics (F0, power, spectrum rate and spectrum characteristic) of the third domain "Domain 3" assuming that they are the same as the audio characteristics A of a non-missing part included in the Domain 3.

Figure 12:
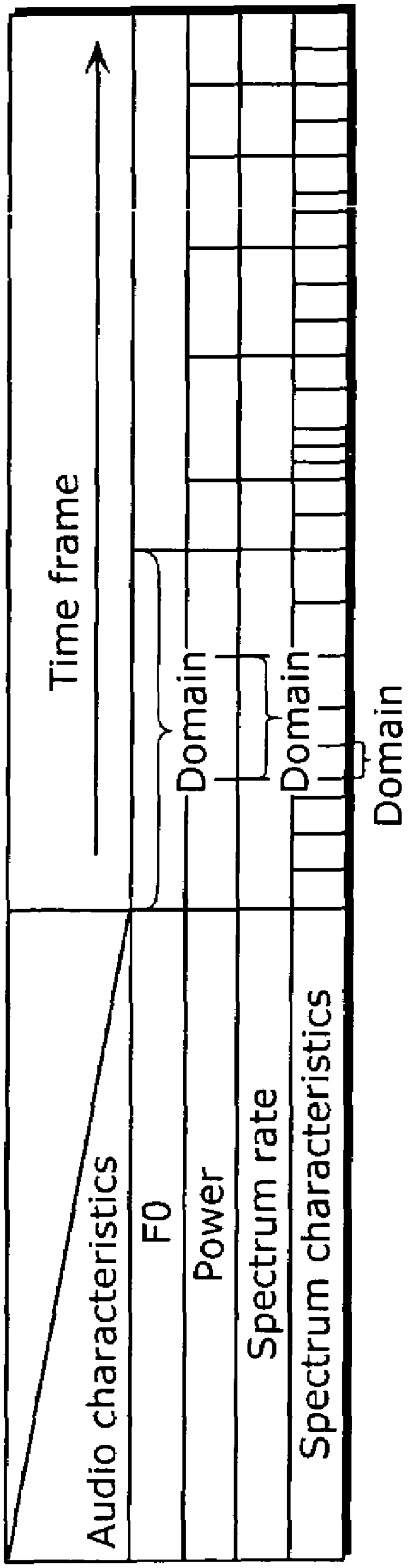
FIG. 12 is a diagram showing an example of audio characteristic information.

In the case of using FIG. 10(*d*) as the unchanged audio characteristic domain information S104, it should be noted that the audio characteristic extraction unit 107 generates audio characteristic information S105 where domains vary depending on audio characteristics, as shown in FIG. 12. In this example, each of the unchanged audio characteristics of F0, power, spectrum rate, and spectrum characteristic is extracted from a different domain. Here, F0 is a parameter which can represent speaker's characteristics, gender-specific characteristics, voice tone and the like. Power is a parameter which can represent audio volume and the like. A spectrum rate is a parameter which can represent voice tone and the like. The characteristic of a spectrum is a parameter which can represent speaker's characteristics, the gender-specific characteristics, voice age, voice characteristic, voice tone, audio quality and the like. Note that a reverberation characteristic measurement device may be attached and may measure and use a reverberation characteristic. Further, it is not necessary that the audio characteristic extraction unit 107 extracts the audio characteristics of the domains which do not include any missing parts and that it describes, in the audio characteristic information S105, the audio characteristic information of the domains which do not include any missing parts.

In this way, it becomes possible to restore an audio to be restored among a mixed audio with high precision by restoring it after: monitoring the changes of the audio characteristics with regard to the waveform components (information of separated audios) of the audio to be restored which has been extracted from a mixed audio; generating the unchanged audio characteristic domain information showing the time domains where audio characteristics remain unchanged; and extracting the audio characteristics using the data of waveforms having comparatively long durations which correspond to the time domains where audio characteristics remain unchanged.

Next, the audio restoration unit 108 restores an announcement speech based on the audio structure information S103 generated by the audio structure analysis unit 104 and the audio characteristic information S105 generated by the audio characteristic extraction unit 107 (corresponding to Step 405 of FIG. 5). Here, the audio restoration unit 108 restores the missing speech parts in the announcement through audio synthesis using a synthesized audio. First, it determines the missing part frames (the missing segments) using the separated audio information S102 (refer to FIG. 6(*c*)). Here are three missing parts: frames 16 to 21, frames 33 to 36 and frames 49 to 55. Next, based on the audio characteristic information S105, it determines the audio characteristics of the missing parts based on the audio characteristics of the domains including the missing parts. Here is an example case of FIG. 11. As the audio characteristics of the missing part ■ in "■saka", it uses the audio characteristics A extracted from the part "saka". Next, it determines the phoneme sequence information of the missing part based on the audio structure information S103. The accent information of the missing part is determined based on the audio structure information S103 and the words including the missing part. It determines intonation information of the missing part based on the utterance information including the missing parts of FIG. 11. In the example case of FIG. 11, it determines the followings: the phoneme sequence "O" which is the missing part in "■saka"; the accent information of "O" based on the word "Osaka" including the missing part; and the intonation information of "O" based on the utterance information "Tsugiwa OsakaOsaka." including the missing part. Subsequently, it restores the missing speech part through speech synthesis based on: the audio characteristics (F0, power, spectrum rate, and spectrum characteristic) of the missing part, the phoneme sequence information of the missing part, the accent information, and the intonation information. Subsequently, it restores the announcement speech by generating the announcement speech of the parts other than the missing part using the separated audio information S102 and combining the announcement speech with the restored missing speech part. More specifically, it restores the part of ■ in "■saka" through speech synthesis, and the part of "saka" received by the microphone 102 is used as it is.

As a speech restoration method, note that the audio restoration unit 108 may select a waveform which provides a high similarity with respect to the audio characteristics and the phoneme sequence information of the missing part, based on the extracted audio characteristics, from among a waveform database (not shown), that is, an audio template. In this way, it is possible to estimate the audio characteristics further accurately based on the waveform database, even in the case where there are many missing parts. This makes it possible to restore speech with high accuracy. In addition, it may modify the selected waveform through learning based on the real audio characteristics and the speech surrounding the missing part and restore the missing speech part. Unlike the general usage of speech synthesis, in the case where the speech is restored through speech synthesis, not only a phoneme sequence but also the real speech parts other than the missing part exist in the speech at this time. Therefore, it is possible to tune up the speech part to be restored so that it matches the real speech parts. Thus, it is possible to restore a speech with high accuracy. In addition to the audio characteristic information S105 extracted by the audio characteristic extraction unit 107, it may estimate the audio characteristics using the preliminary information of the speech to be restored and restore the speech. For example, it may download in advance the audio characteristics of the voice of the person who utters an announcement and restore the speech taking into account the downloaded audio characteristics. For example, it may store basic audio characteristics of human voice in the headphone device 101 and use the stored basic audio characteristics. In this way, it can restore the speech with high accuracy.

In this way, since it uses the waveforms of the speech parts other than the missing part in the speech to be restored as they are, it can perform audio restoration with high accuracy.

Lastly, the user can listen to the announcement speech which has been restored via the speaker 109.

Figure 13:
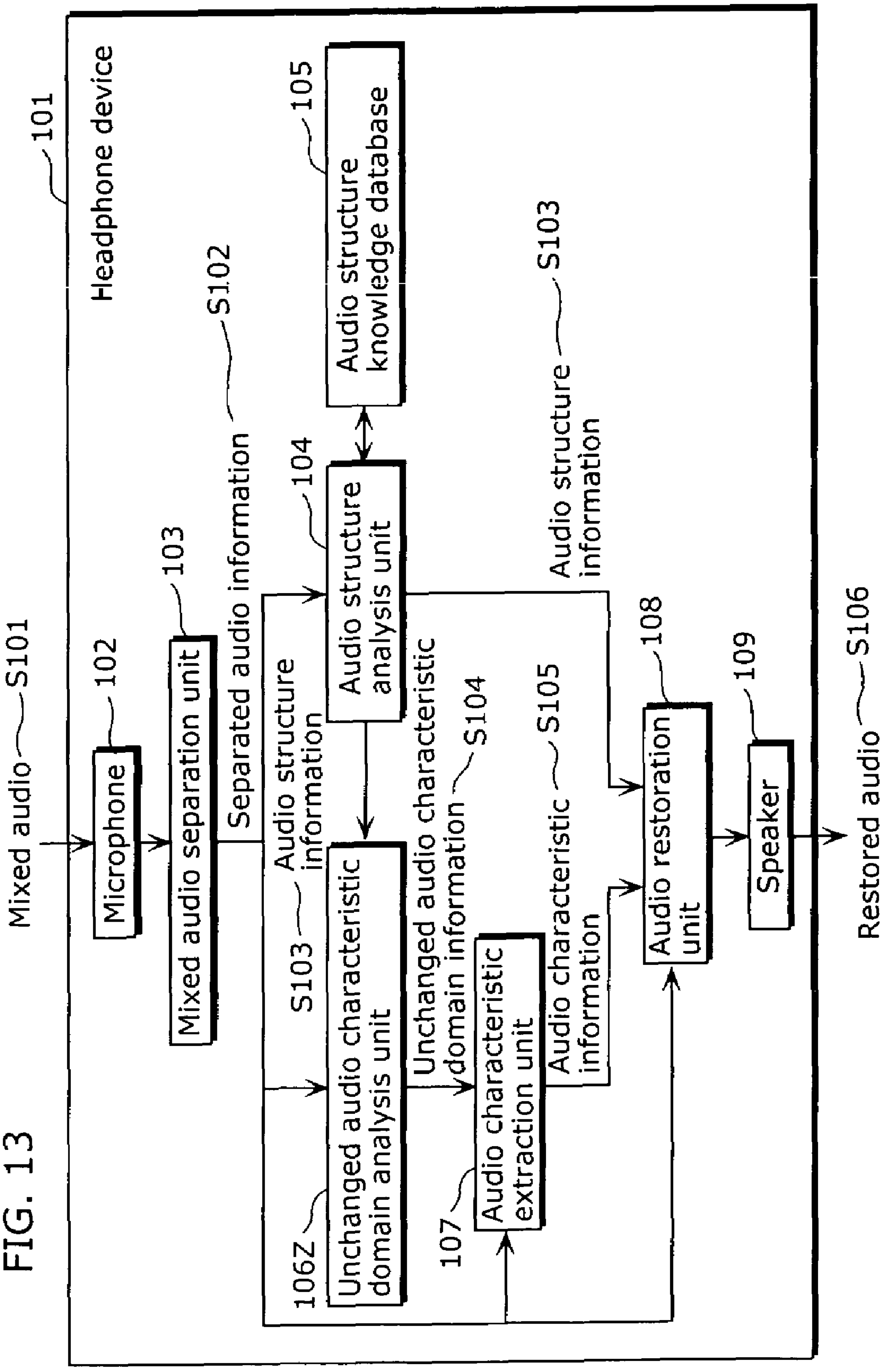
FIG. 13 is a block diagram showing another overall configuration of the audio restoration apparatus in the first embodiment of the present invention.

Note that the unchanged audio characteristic domain analysis unit 106 may be an unchanged audio characteristic domain analysis unit 106Z shown in FIG. 13 which generates unchanged audio characteristic domain information S104 using the audio structure information S103 generated by the audio structure analysis unit 104.

Figure 14:
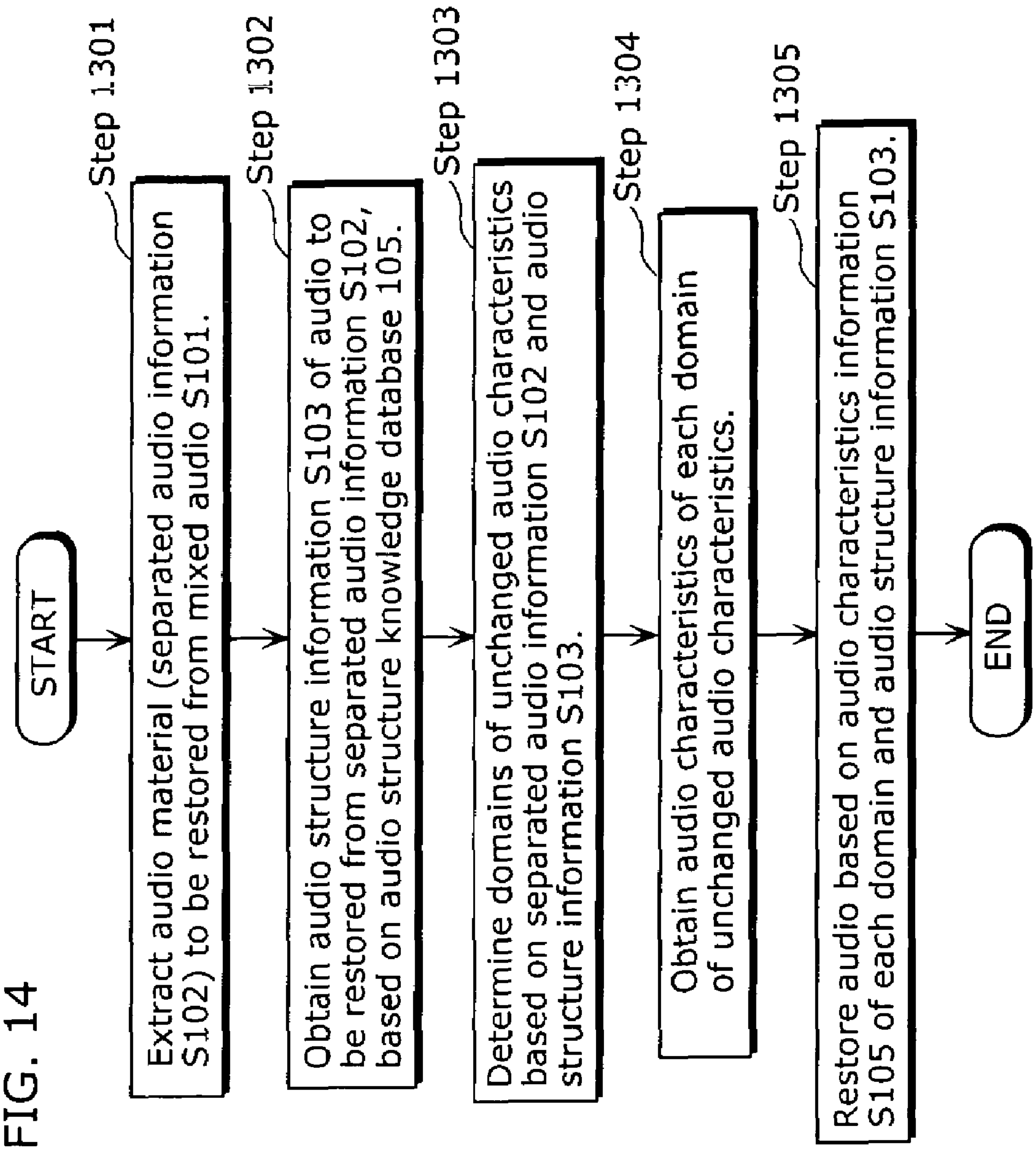
FIG. 14 is a flow chart showing an operation flow of the audio restoration apparatus in the first embodiment of the present invention.

FIG. 14 shows a flow chart of the audio restoration processing in this case. First, the mixed audio separation unit 103 extracts an audio material to be restored which is separated audio information S102, from the mixed audio S101 (Step 1301). Next, the audio structure analysis unit 104 generates audio structure information S103 based on the extracted separated audio information S102 and the audio structure knowledge database 105 (Step 1302). Next, the unchanged audio characteristic domain analysis unit 106Z obtains domains where the audio characteristics remain unchanged from the separated audio information S102 extracted based on the audio structure information S103 obtained in the audio structure information generation processing (Step 1302) and generates unchanged audio characteristic domain information S104 (Step 1303). Subsequently, the audio characteristic extraction unit 107 extracts the audio characteristics of each domain, in which audio characteristics remain unchanged, of the audio to be restored, based on the unchanged audio characteristic domain information S104, and generates audio characteristic information S105 (Step 1304). Lastly the audio restoration unit 108 generates the audio to be restored based on the audio structure information S103 and the audio characteristic information S105 of each domain (Step 1305). The unchanged audio characteristic domain analysis unit 106Z can determine phoneme segments, word segments, clause segments and sentence segments using the audio structure information S103 generated by the audio structure analysis unit 104. Therefore, it is possible to reduce the calculation amount drastically.

<ii> Method of Restoring the Whole Speech Including a Missing Part

Figure 15:
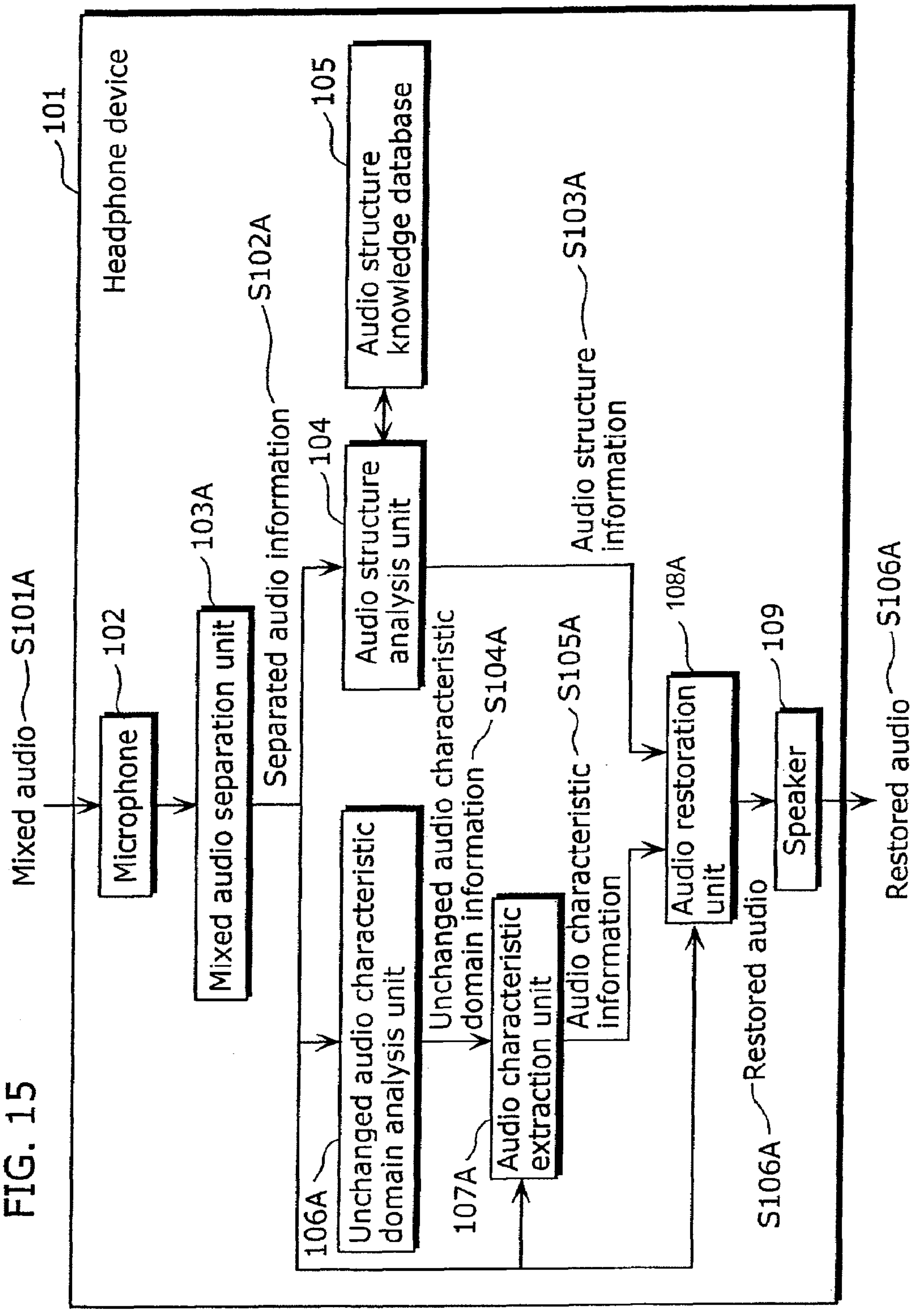
FIG. 15 is a block diagram showing an overall configuration of the audio restoration apparatus in the first embodiment of the present invention.

A user is making a conversation with two friends at an intersection. It is assumed that the user has difficulty in listening to the friends' voices due to the noises of cars and the voices of the surrounding people. Here, a method of restoring the voices of the two friends by using an audio restoration apparatus of the present invention. In the example of FIG. 4, a mixed audio where the friends' voices, the noises of cars and the voices of surrounding people are overlapped corresponds to the mixed audio S101, and the two friends' voices corresponds to the restored audio S106 to be generated. The points which are different from the example of <I>-<i> are: the operation of the mixed audio separation unit 103, the operation of the unchanged audio characteristic domain analysis unit 106, the operation of the audio characteristic extraction unit 107 and the operation of the audio restoration unit 108. Hence, as shown in FIG. 15, the mixed audio separation unit 103 is referred to as a mixed audio separation unit 103A, the unchanged audio characteristic domain analysis unit 106 is referred to as an unchanged audio characteristic domain analysis unit 106A, the audio characteristic extraction unit 107 is referred to as an audio characteristic extraction unit 107A, and the audio restoration unit 108 is referred to as an audio restoration unit 108A. The audio restoration unit 108A is an example audio restoration unit which restores the whole audio to be restored made up of the missing part audio and the audios of the parts other than the missing part, using at least one of the phoneme sequence, character sequence and musical note sequence which have been generated by the above-described audio structure analysis unit 104.

In addition, the mixed audio S101 is referred to as a mixed audio S101A, the separated audio information S102 is referred to as separated audio information S102A, the audio structure information S103 is referred to as an audio structure information S103A, the unchanged audio characteristic domain information S104 is referred to as unchanged audio characteristic domain information S104A, the audio characteristic information S105 is referred to as an audio characteristic information S105A, and the audio to be restored S106 is referred to as an audio to be restored S106A. Here, the audio restoration unit 108A restores the whole audio including the missing audio parts (including a distorted part), based on the audio structure information S103A and the audio characteristic information S105A. At this time, it restores the whole audio based on the balance information of the whole audio. In other words, it restores the whole audio by modifying the non-distorted parts also.

Figure 16:
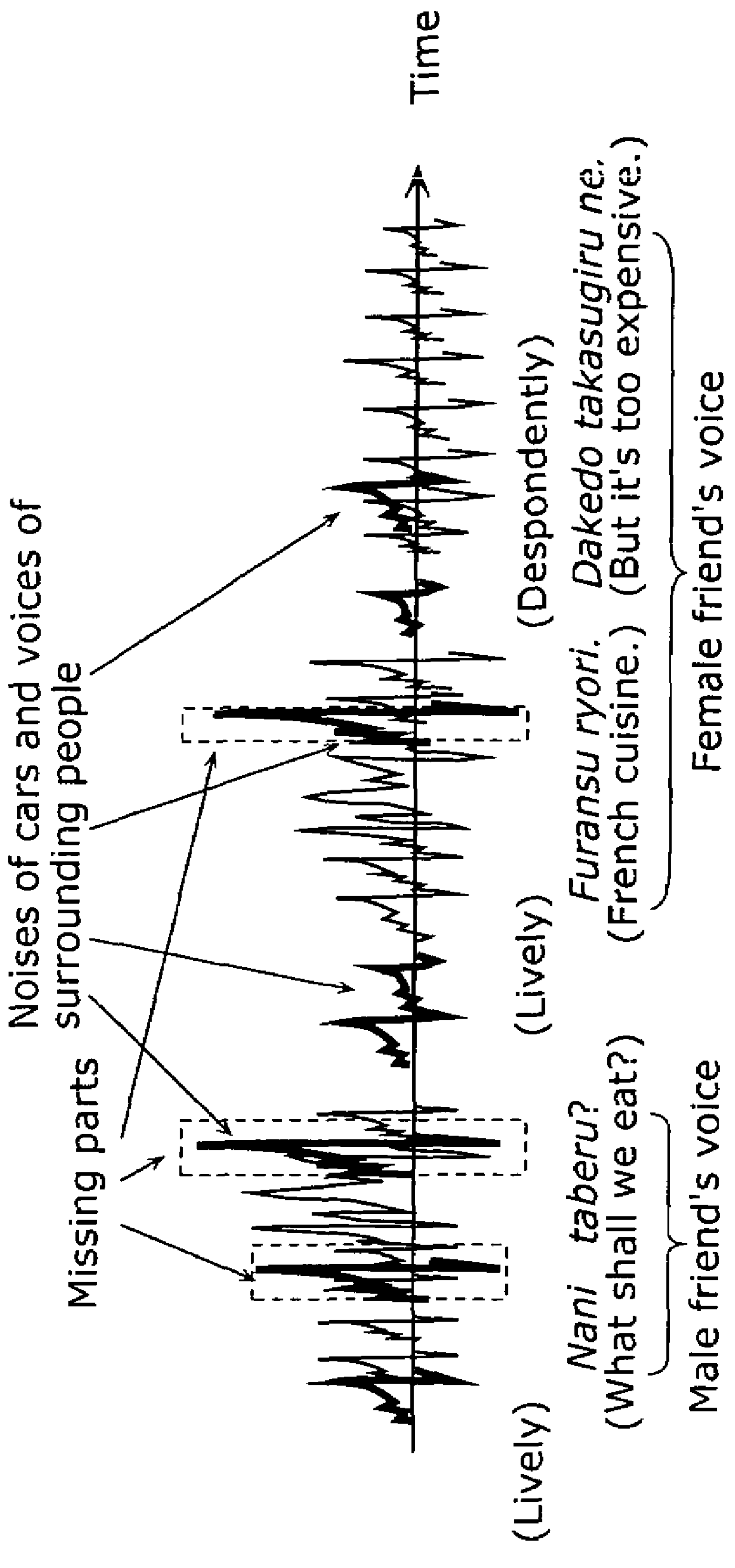
FIG. 16 is a diagram showing an example of a mixed audio.

To get things started, the mixed audio S101A is received using the microphone 102 mounted on the headphone device 101. FIG. 16 shows an example schematic diagram of the mixed audio S101A. In this example, a male friend A lively says "Nani taberu? (What shall we eat?)" to a female friend B, and the female friend B answers lively saying "Furansu ryori (French cuisine.)". Sequentially, however, knowing that French cuisine is expensive, the female friend B despondently says "Dakedo takasugiru ne (But it's too expensive).". Additionally, the two friends' voices are partially missing due to the noises of cars and the voices of surrounding people, and further, the voices are distorted in places in the whole voices.

First, the mixed audio separation unit 103A extracts the separated audio information S102A using the mixed audios S101A received by the microphone 102 (corresponding to Step 401 of FIG. 5). Here, according to an auditory scene analysis where an audio is separated using local structures of the speech waveform, the extracted speech waveforms of the two friends are extracted as a part of the separated audio information S102A. At this time, based on the power of the extracted speech, the distortion levels of the extracted speech are also extracted as separated audio information S102A. FIG. 17 shows an example of the separated audio information S102A. In this example, a pair of the speech waveform and the distortion level of each frame is regarded as the separated audio information S102A. Here, the distortion level "0.0" means a part with no distortion, and the distortion level "1.0" means a missing part. In other words, distortion levels are inversely relational to the reliance levels of audio waveforms.

Figure 18:
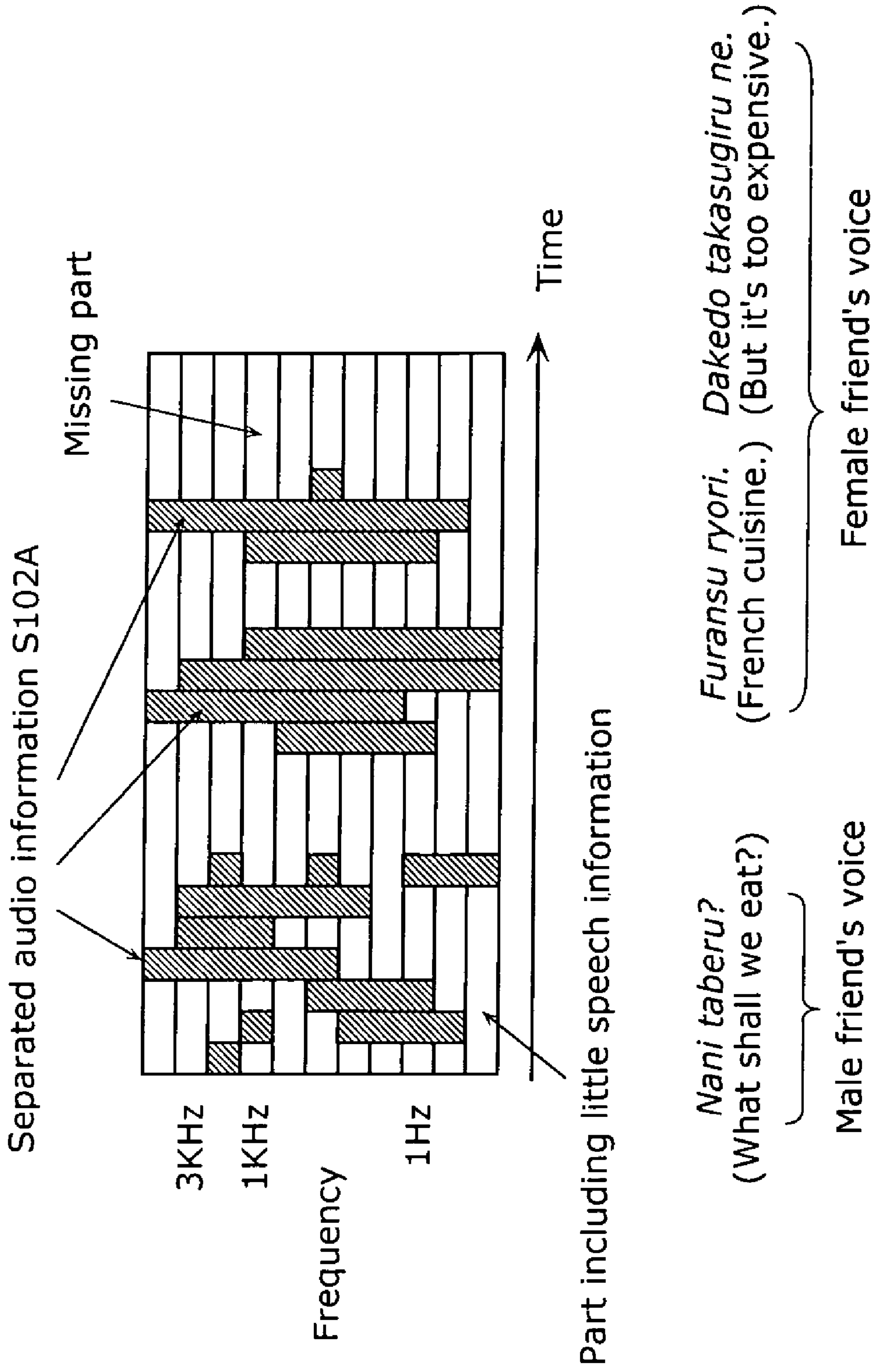
FIG. 18 is a diagram showing an example of separated audio information.

As shown in FIG. 18, it should be noted that a part of the separated audio information S102A may be represented by not waveforms but the sets of the time information, the frequency information and the power on the spectrum which has been subjected to a frequency analysis. For example, noises of cars are located in the low frequency. Likewise, each type of surrounding noises is located in a limited frequency band. Therefore, when the separated audio information S102A is extracted on a spectrum, the mixed audio separation unit 103A can extract the information of the audio to be restored with high accuracy. Note that the audio characteristic extraction unit 107A may extract the two friends' voices using an independent component analysis, or array processing where plural microphones are used.

Next, the audio structure analysis unit 104 extracts the audio structure information S103A in a similar manner to the example <I>-<i> (corresponding to Step 402 of FIG. 5).

Note that the audio structure analysis unit 104 may extract the audio structure information S103A with high accuracy through speech recognition with reliability, based on the distortion levels included in the separated audio information S102A.

Next, the unchanged audio characteristic domain analysis unit 106A obtains domains where the audio characteristics remain unchanged, based on the separated audio information S102A extracted by the mixed audio separation unit 103A and generates unchanged audio characteristic domain information S104A (corresponding to Step 403 of FIG. 5). Here, it determines the domains made up of the audio characteristics which remain unchanged, based on a change of speaker's characteristics, a change of gender-specific characteristics, a voice age change, a voice characteristic change, and/or a voice tone change, and generates the unchanged audio characteristic domain information S104A of the domains. Here, the speaker's characteristics change can be measured based on the balance of likelihoods with respect to the speaker models represented by the Gaussian distribution. For example, in the case where the speaker model having the greatest likelihood has shifted from Model A to Model B, it is judged that the speaker's characteristics has changed. In addition, the change of gender-specific characteristics can be measured by the change of F0. For example, that a male's voice has a low F0 and a female's voice has a high F0 is taken into account in the judgment. In addition, the change of voice age can be judged by generating in advance probability models for each age and comparing the speaker's voice with the probability models for each age. Additionally, a voice characteristic change can be judged by generating in advance probability models for each voice characteristic and comparing the speaker's voice with the probability models for each voice tone. A voice tone change can be judged based on a F0 change, a spectrum rate change and the like. The unchanged audio characteristic domain analysis unit 106A regards segments where the change levels of the parameters are small as domains where the audio characteristics remain unchanged, and generates unchanged audio characteristic domain information S104 of the domains. In the case of using the example of FIG. 16, it segments the voice of the male friend A and the voice of the female friend B into different domains based on a change of speakers' characteristics, a change of gender-specific characters, a voice age change and/or the like. In addition, based on a voice characteristic change, a voice tone change and the like, the voice of the female friend B is segmented into the domain where the female friend B lively answered "Furansu ryori (French cuisine)." and the domain where the female friend despondently said "Dakedo takasugiru ne (But it's too expensive)."

Note that the unchanged audio characteristic domain analysis unit 106A may determine domains where an audio characteristic remains unchanged based on each audio characteristic in a similar manner to the example <I>-<i> of (refer to FIG. 12). Here, considering the example of FIG. 16, due to the change of speaker's characteristics, the change of gender-specific characteristics, and the voice tone change, it segments the domains of the two friends' voices into at least the following segments of: "Nani taberu? (What shall we eat?)", "Furansu ryori (French cuisine)." and "Dakedo takasugiru ne (But it's too expensive).". Subsequently, it extracts the audio characteristics of each domain independently. At this time, in the case where the tension of the utterance of "Dakedo takasugiru ne (But it's too expensive)." becomes lower gradually, it further segments the segment into sub-segments and extracts the audio characteristics of each sub-segment.

In this way, in the case of restoring the speech uttered by speakers, or in the case of restoring speech where the voice tone changes, it is greatly important to restore an audio by restoring it after: judging a delimitation of an audio characteristic corresponding to a speaker and a delimitation of a voice tone in the audio; determining domains where the audio characteristics remain unchanged; and extracting the audio characteristics.

Here, the unchanged audio characteristic domain analysis unit 106A generates the unchanged audio characteristic domain information using all of the speaker's characteristics change, the gender-specific characteristic change, the voice age change, the voice characteristic change, and the voice tone change. However, it should be noted that it may generate the unchanged audio characteristic domain information using a part of them.

Next, the audio characteristic extraction unit 107A extracts the audio characteristics of each domain, in which the audio characteristics remain unchanged, in the speech to be restored, based on the separated audio information S102A extracted by the mixed audio separation unit 103A and the unchanged audio characteristic domain information S104A generated by the unchanged audio characteristic domain analysis unit 106A, and generates the audio characteristic information S105A of each domain (corresponding to Step 404 of FIG. 5). Here, it estimates the audio characteristics of a frame having a high distortion level using the audio characteristics of a frame having a low distortion level, based on the separated audio information S102A as shown in FIG. 17. For example, it simply regards the audio characteristics of the frame having a low distortion level as the audio characteristics of the frame having a high distortion level. In addition, it estimates the audio characteristics of predetermined domains by linearly adding, to the audio characteristics, the amounts of audio characteristics weighted in proportion to the distortion levels.

In this way, it is possible to reproduce the real audio characteristics with fidelity by restoring them after: monitoring the changes of the audio characteristics of the audio to be restored which has been extracted from a mixed audio; segmenting the audio into time domains in each of which audio characteristics remain unchanged; and extracting audio characteristics of audio data (such as waveform data) having comparatively long durations in which correspond to the time domains which include the missing parts and where audio characteristics remain unchanged.

Next, the audio restoration unit 108A restores the whole voices of the two friends including the parts with no missing voice part, based on the audio structure information S103A generated by the audio structure analysis unit 104 and the audio characteristic information S105A generated by the audio characteristic extraction unit 107A (corresponding to Step 405 of FIG. 5).

First, it determines the phoneme sequence information of the whole speech to be restored based on the audio structure information S103A. Next, based on the determined phoneme sequence information, it determines the accent information and the intonation information considering the whole speech on a basis of a word, an utterance and/or the like. Subsequently, it restores not the missing part only but the whole speech considering the balance of the whole voices of the two friends through speech synthesis, based on the audio characteristics (F0, power spectrum rate and spectrum character), the phoneme sequence information, the accent information, and the intonation information of the speech to be restored which are included in the audio characteristic information S105A.

As an audio restoration method, note that the audio restoration unit 108A may select a waveform which provides a high similarity to the audio characteristics, phoneme information, accent information and intonation information of the extracted audio characteristics and restore the speech based on the selected waveform. In this way, it can estimate the audio characteristics further accurately based on the waveform database, even in the case where there are many missing parts. Therefore, it can restore a speech with high accuracy. In addition, it may modify the selected waveform through learning based on the real audio characteristics and the audio surrounding the missing part and restore the missing speech part based on the modified waveform. In addition, it may estimate the audio characteristics based on the audio characteristic information S105A extracted by the audio characteristic extraction unit 107A and further preliminary information of the speech to be restored, and restore the speech based on the estimated audio characteristics. For example, it may download in advance the audio characteristics of the two friends' voices to the headphone device 101, and restore the speech referring to the audio characteristics also. For example, it may store in advance fundamental audio characteristics of human voices in the headphone device 101 and use the stored audio characteristics. This makes it possible to restore the speech with high accuracy.

In this way, restoring the whole speech instead of the missing part only improves the balance between the missing part and the other part. Therefore, it is possible to restore the speech that sounds more natural.

Lastly, the restored audio is outputted through the speaker 109, and the user can listen to the restored voices of the two friends.

As shown in the example <I>-<i>, it should be noted that the audio restoration unit 108A may determine the domains where the audio characteristics remain unchanged based on phoneme segments, words segments, clause segments, sentence segments, utterance content segments, and/or utterance segments and generate the unchanged audio characteristic domain information 104A of the determined domains.

Note that the audio restoration unit 108A may restore the speech based on the audio structure information S103A and the audio characteristic information S105A without using the separated audio information S102A.

<II> Case of Restoring a Musical Audio

<i> Method of Restoring a Missing Musical Audio Part

Figure 19:
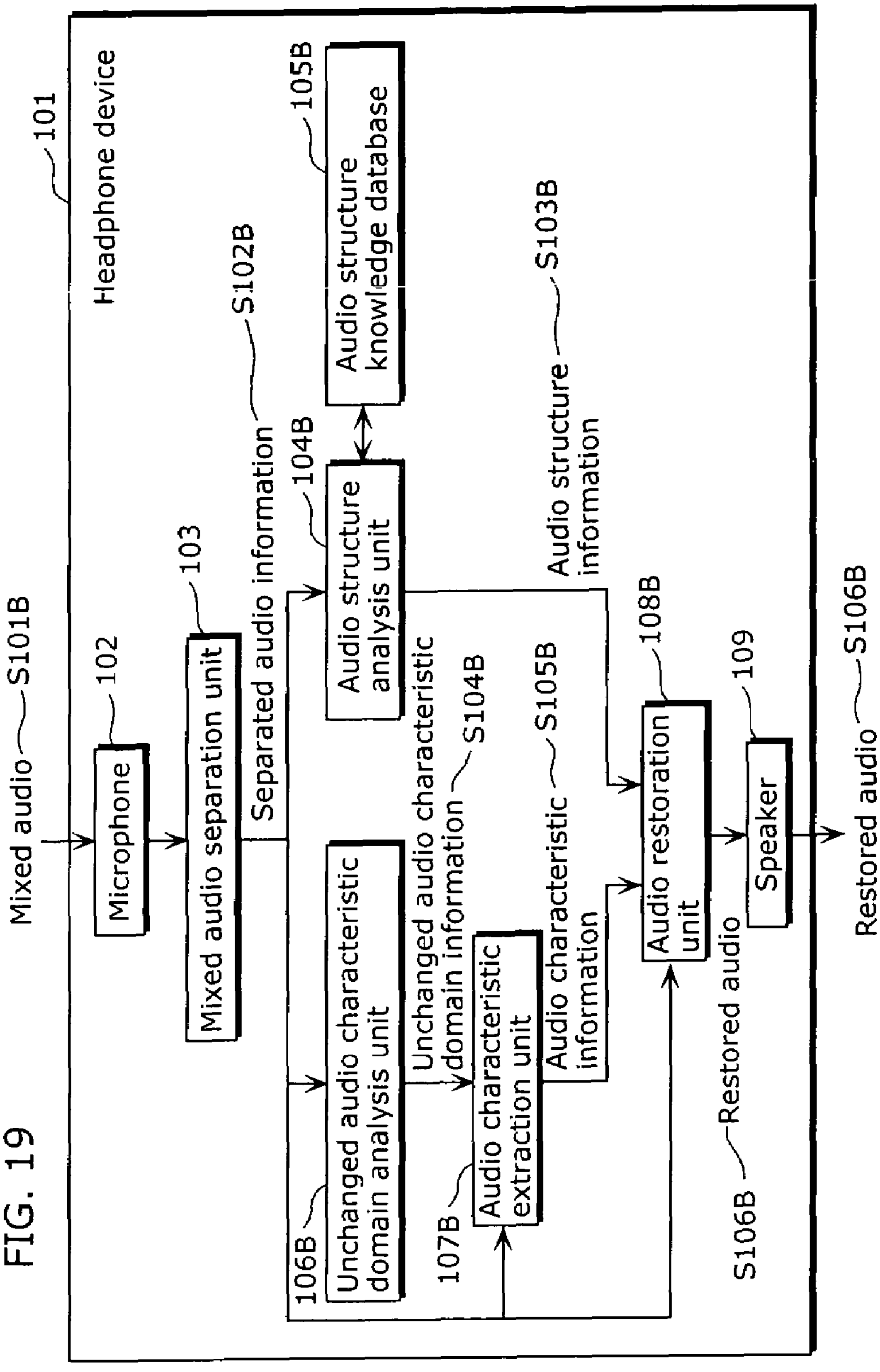
FIG. 19 is a block diagram showing an overall configuration of the audio restoration apparatus in the first embodiment of the present invention.

A user is listening to Back Ground Music (BGM) playing in streets. However, due to car's horns, the musical audio of the BGM is partially lost. Here will be described a method of restoring the BGM playing in streets by using the audio restoration apparatus of the present invention. In this example, in FIG. 4, the mixed audio S101 is a mixed audio of the BGM playing in streets and the car's horns, and the restored audio S106 to be generated is the BGM playing in streets. The points which are different from the example <I>-<i> are: the stored contents of the audio structure knowledge database 105, the operation of the audio structure analysis unit 104, the operation of the unchanged audio characteristic domain analysis unit 106, the operation of the audio characteristic extraction unit 107 and the operation of the audio restoration unit 108. Hence, as shown in FIG. 19, the audio structure knowledge database 105 is referred to as an audio structure knowledge database 105B, the audio structure analysis unit 104 is referred to as an audio structure analysis unit 104B, the unchanged audio characteristic domain analysis unit 106 is referred to as an unchanged audio characteristic domain analysis unit 106B, the audio characteristic extraction unit 107 is referred to as an audio characteristic extraction unit 107B, and the audio restoration unit 108 is referred to as an audio restoration unit 108B. In addition, the mixed audio S101 is referred to as a mixed audio S101B, the separated audio information S102 is referred to as separated audio information S102B, the audio structure information S103 is referred to as audio structure information S103B, the unchanged audio characteristic domain information S104 is referred to as unchanged audio characteristic domain information S104B, the audio characteristic information S105 is referred to as audio characteristic information S105B, and the restored audio S106 is referred to as a restored audio S106B. Here, a musical audio is restored instead of speech. The audio restoration unit 108B restores the missing audio part of the musical audio to be restored, based on the audio structure information S103B and the audio characteristic information S105B, and generates the other part of the musical audio based on the separated audio information S102B.

Figure 20:
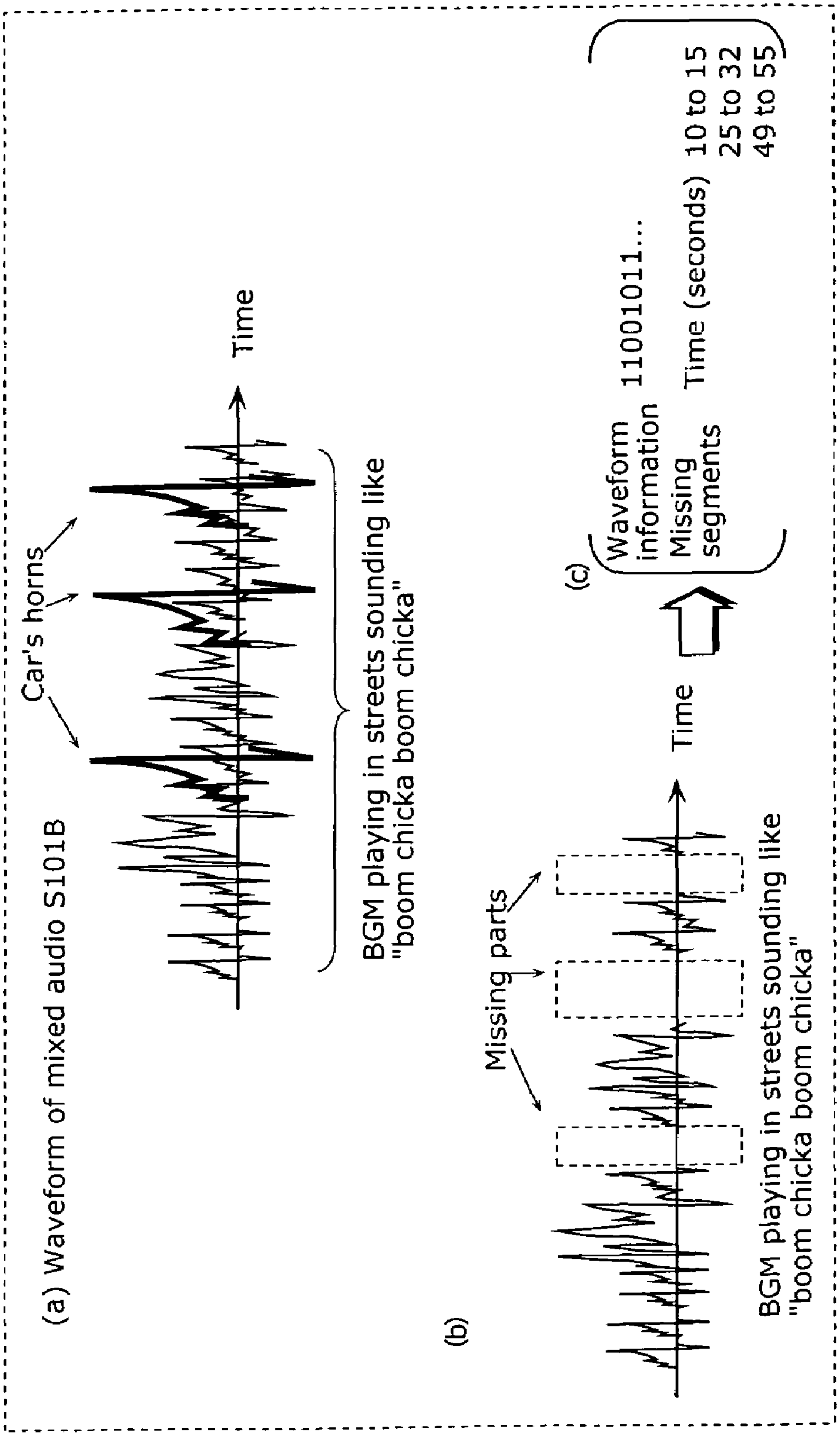
FIG. 20 is a diagram showing an example of a mixed audio and separated audio information.

To get things started, the mixed audio S101B where the BGM playing in streets and the car's horns are overlapped is received using the microphone 102 mounted on the headphone device 101. FIG. 20(*a*) is an example schematic diagram of the mixed audio S101B where the BGM playing in streets and the car's horns are overlapped. In this example, due to the car's horns, the BGM playing in streets is partially lost as shown in FIG. 20(*b*). Here, the BGM playing in streets is restored using the non-missing (audible) part of the BGM playing in streets as it is.

Similar to the example <I>-<i>, the mixed audio separation unit 103 performs frequency analysis of the mixed audio using the mixed audio S101B received by the microphone 102 first, detects the time at which car's horns are inserted based on the rises of power, and extracts the separated audio information S102B (corresponding to Step 401 of FIG. 5). Here, the separated audio information to be extracted relates to a musical audio instead of speech. FIG. 20(*c*) shows an example of separated audio information S102B. In this example, the separated audio information is made up of a musical audio waveform which is an extraction of components of the BGM playing in streets and information of the missing segment of the BGM playing in streets.

Note that the mixed audio separation unit 103 may extract the separated audio information S102B using an auditory scene analysis, an independent component analysis, or array processing where plural microphones are used. In addition, a part of the separated audio information S102B may be represented as information of the frequency on the spectrogram which has been subjected to frequency analysis (for example, a set of time information, frequency information and power) instead of the waveform information.

Next, the audio structure analysis unit 104B generates audio structure information S103B of the BGM playing in streets, which is a musical audio to be restored, based on the separated audio information S102B extracted by the mixed audio separation unit 103 and the audio structure knowledge database 105B made up of an audio ontology dictionary, and a musical score dictionary (corresponding to Step 402 of FIG. 5). Here, as audio structure information S103B, it generates information of a musical note sequence of the BGM playing in streets. First, as shown in FIG. 20(*c*), it performs frequency analysis of the audio waveform which is an extraction of the components of the BGM playing in streets and which is the separated audio information S102B. Next, it estimates the musical note sequence of the missing part using the analyzed frequency structure and the audio ontology dictionary. In the audio ontology dictionary, rules of chords, modulation, and rhythms of musical notes are stored. The audio structure analysis unit 104B estimates the musical note sequence based on the stored rules. In addition, it compares it with the musical scores of the music registered in the musical score dictionary and estimates the missing part of the musical note sequence with higher accuracy. For example, it compares (a) the musical note sequence with a missing part which has been analyzed and estimated by the separated audio information S102B with (b) the musical note sequences of the musical scores registered in the musical score dictionary. Subsequently, it can determine the missing part of the musical note sequence based on the same musical note sequence in the musical score dictionary.

Note that the audio structure analysis unit 104B may register in advance the musical score dictionary in the audio structure knowledge database 105B. It may download the musical score dictionary, and update and register it. In addition, based on the position information of the user and the like, it may select one or plural musical scores and then determine a musical note sequence. Here is an example case where BGM-A is always playing in a shop A and a user nears the shop A. In this case, it can improve the estimation accuracy by selecting the musical score of the BGM-A, and selecting and using the musical note sequence of the BGM-A.

Next, the unchanged audio characteristic domain analysis unit 106B obtains domains where the audio characteristics remain unchanged based on the separated audio information S102B extracted by the mixed audio separation unit 103, and generates unchanged audio characteristic domain information S104B (corresponding to Step 403 of FIG. 5). Here, it determines the domains where the audio characteristics remain unchanged based on an audio structure change, a melody change, an audio volume change, a reverberation characteristic change, an audio quality change, and/or an audio color change. Subsequently, it generates the unchanged audio characteristic domain information S104B. In order to detect an audio structure change, it extracts the audio structure information from the audio structure analysis unit 104B. Subsequently, it previously classifies the domains into groups based on the audio characteristics such as audio color and audio volume, so that it can detect an audio structure change based on the groups to which the extracted audio structures belong. For example, it classifies in advance the audio structures into the audio structures of piano playing and the audio structures of guitar playing. In the case where there is no change of groups of the audio structures of the inputted musical notes, it judges the domain as unchanged. In the other case, it judges the domain as changed. At this time, it is rare that the audio characteristics of the groups of the audio structures which have been previously generated completely match the audio characteristics of the audio which is desired to be restored now. Therefore, it is important to segment the musical audio into domains having the audio characteristics to be extracted, based on an audio structure change, and extract the real audio characteristics of the audio to be restored from the domains. In addition, in order to detect a melody change, it extracts the audio structure information from the audio structure analysis unit 104B. Subsequently, it can previously classify the domains into groups based on a melody having the same audio characteristics such as audio color and audio volume, and detect a melody change based on the groups to which the extracted audio structures belong. For example, based on the melody, it may determine an audio color, for example, bright color or dark color, and an audio volume. By determining the domains where the audio characteristics remain unchanged based on melody segments, it can extract the audio characteristics with high accuracy. In addition, it can detect a volume change by measuring the power. In addition, it calculates a reverberation characteristic change and an audio quality change based on the separated audio information S102B, and determines the domains where the power remains within a range as the domains made up of unchanged audio characteristics. In addition, it can measure an audio color change based on the likelihoods with respect to the audio color models represented by the Gaussian distribution which has been generated by grouping the audios into piano audios, guitar audios, violin audios and the like. Hence, it can determine the part, which has been judged as the part where the audio color remains unchanged, as the domain made up of the unchanged audio characteristics. Here, it is assumed that the missing audio part remains unchanged in audio structure, melody, audio volume, reverberation characteristic, audio quality and audio color.

Figure 21:
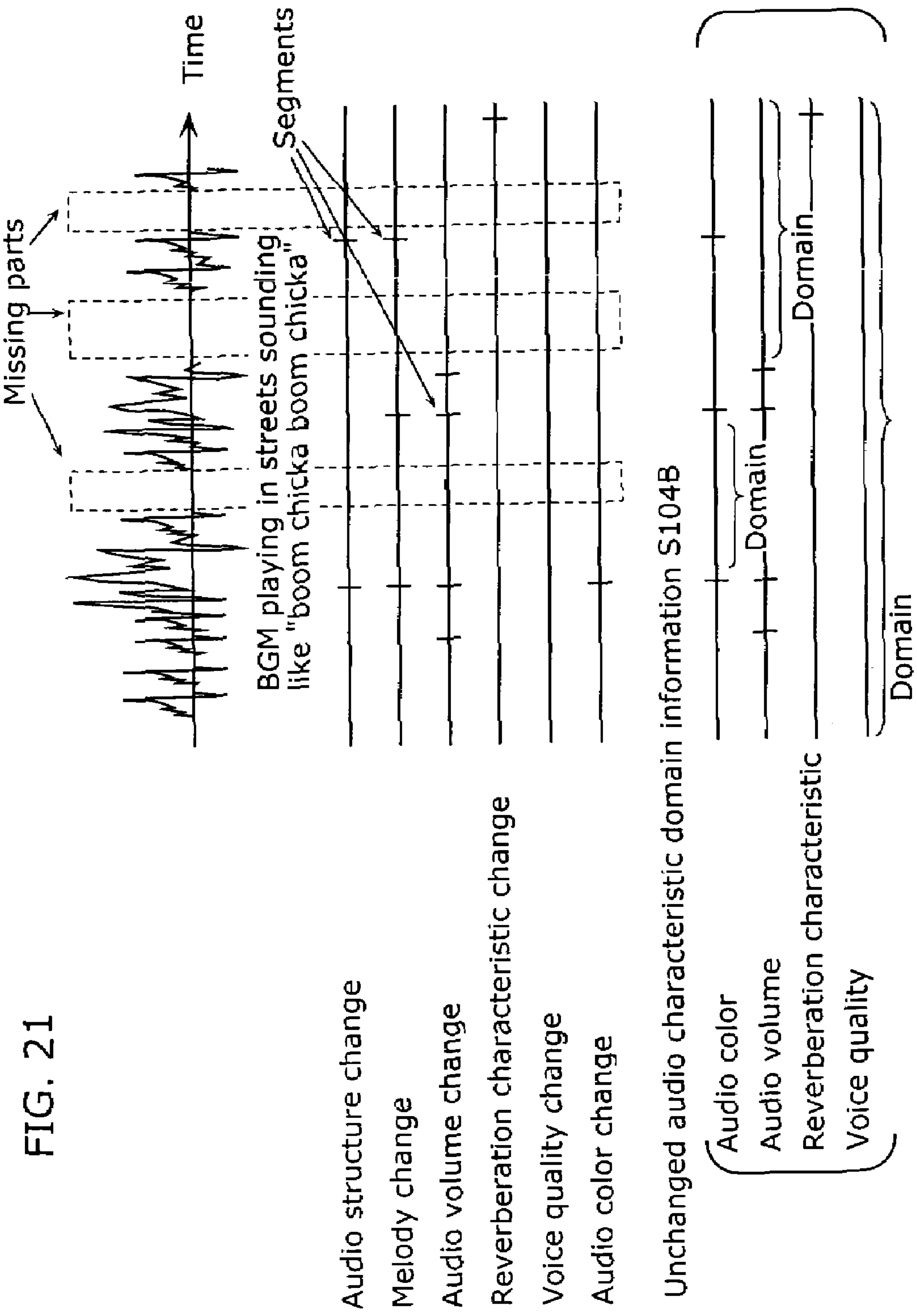
FIG. 21 is a diagram showing an example of information of domains where audio characteristics remain unchanged.

FIG. 21 shows an example of the unchanged audio characteristic domain information S104B. Here, the unchanged audio characteristic domain analysis unit 106B determines the domains each having an unchanged audio characteristic which is an audio color, an audio volume, a reverberation characteristic, or an audio quality. In this example, it determines the domain having an unchanged audio color, based on an audio structure change, a melody change and an audio color change. Additionally, it obtains the domain having an unchanged audio volume, based on an audio volume change, obtains the domain having an unchanged reverberation characteristic, based on a reverberation characteristic change, and obtains the domain having an unchanged audio quality, based on an audio quality change.

In this way, even within a musical audio, audio characteristics change. Such audio characteristics are audio color, audio volume, reverberation characteristic, audio quality and the like. Here is an example case of listening to BGM playing in streets while walking. The audio volume and reverberation characteristic change from one minute to the next depending on the positions of surrounding buildings, the positions of surrounding people, temperature, humidity and the like. Therefore, it is greatly important to restore the audio by restoring after: determining the domains made up of the unchanged audio characteristics, based on an audio structure change, a melody change, an audio color change, an audio volume change, a reverberation characteristic change, an audio quality change and/or the like; and extracting the audio characteristics of the domains.

Here, the unchanged audio characteristic domain analysis unit 106B generates the unchanged audio characteristic domain information S104B, using all of the audio structure change, the melody change, the audio volume change, the reverberation characteristic change, the audio quality change, and the audio color change. However, it should be noted that it may generate the unchanged audio characteristic domain information, using a part of them. In addition, it may extract an audio structure change and a melody change, using the audio structure information 103B generated by the audio structure analysis unit 104B.

Next, the audio characteristic extraction unit 107B extracts the audio characteristics of each domain, which is made up of the unchanged audio characteristics, of the BGM playing in streets to be restored and generates the audio characteristic information S105B (corresponding to Step 404 of FIG. 5). This extraction is based on the separated audio information S102B extracted by the mixed audio separation unit 103 and the unchanged audio characteristic domain information S104B generated by the unchanged audio characteristic domain analysis unit 106B. Here, it extracts the audio color, audio volume, reverberation characteristic and audio quality of each domain of the BGM playing in streets and generates the audio characteristic information S105B. For example, it extracts these audio characteristics using a presentation method based on a Musical Instrument Digital Interface (MIDI). For example, it performs frequency analysis of the waveform information included in the audio characteristic information S105B and examines the frequency structure so that it can determine the audio color.

In view of audio characteristics, the audio color of guitar playing is guitar, and the audio color of piano playing is piano. When considering the case of piano playing, the audio colors vary depending on the kind of a piano which is actually used for piano playing, temperature and humidity at the place of piano playing. In addition, the audio volumes vary depending on a distance between the ears of the user (the position of the microphone 102 in this case) and the audio source, and the like. In the case of listening to BGM playing in streets while moving, the audio volume changes from one minute to the next. Further, with a reverberation characteristic, a sense of depth and a sense of realism can be represented. Additionally, audio quality varies depending on the characteristics of a speaker or a microphone. Therefore, it is greatly important to restore an audio by restoring after determining the domains where the unchanged audio characteristics remain unchanged and extracting the audio characteristics of the determined domains.

In this way, it is possible to reproduce the real audio characteristics with fidelity by restoring them after: monitoring the changes of the audio characteristics of the audio to be restored which has been extracted from a mixed audio; segmenting the audio into time domains in each of which audio characteristics remain unchanged; and extracting audio characteristics of audio data (such as waveform data) having comparatively long durations in which correspond to the time domains which include the missing parts and where audio characteristics remain unchanged.

Next, the audio restoration unit 108B restores the BGM playing in streets, based on the audio structure information S103B generated by the audio structure analysis unit 104B and the audio characteristic information S105B generated by the audio characteristic extraction unit 107B (corresponding to Step 405 of FIG. 5). Here, the audio restoration unit 108B restores the missing audio part through musical audio synthesis based on a MIDI audio source, using the musical note sequence information described in the audio structure information S103B and the audio characteristic information based on the MIDI audio source described in the audio characteristic information S105B. The non-missing (undistorted) audio part of the street BGM in the separated audio information S102B is inputted through the microphone 102 as it is.

As an audio restoration method, note that the audio restoration unit 108B may select a waveform which provides a high similarity to the audio characteristics and a musical note sequence, based on the extracted audio characteristics, and restore the musical audio based on the selected waveform. In this way, it can estimate the audio characteristics further accurately based on the waveform database, even in the case where there are many missing parts. Thus, it can restore a musical audio with high accuracy. In addition, it can modify the selected waveform through learning based on the real audio characteristics and the audio surrounding the missing part, and restore the missing audio part based on the modified waveform. It may estimate the audio characteristics based on general information regarding the musical audio which is desired to be restored in addition to the audio characteristic information S105B extracted by the audio characteristic extraction unit 107B, and restore the musical audio based on the estimated audio characteristics. For example, it may store in advance the audio characteristics of a general BGM playing in streets in the headphone device 101 and referring to the audio characteristics of the BGM, and restores the audio based on the stored audio characteristics. Thus, it can restore a musical audio with high accuracy.

In this way, since the audio restoration unit 108B uses the waveform of the non-missing part in the musical audio to be restored as it is, it can restore the audio with high accuracy.

Lastly, the user can listen to the restored BGM playing in streets through the speaker 109. Here is an example where BGM is playing from a shop. The BGM sounds louder as the user nears the shop and sounds smaller as the user moves away from the shop. Thus, the BGM sounds normal to the user. Furthermore, the user can enjoy the BGM which sounds natural and which has been subjected to the removal of surrounding noises.

<ii> Method of Restoring the Whole Musical Audio Including a Missing Part

Figure 22:
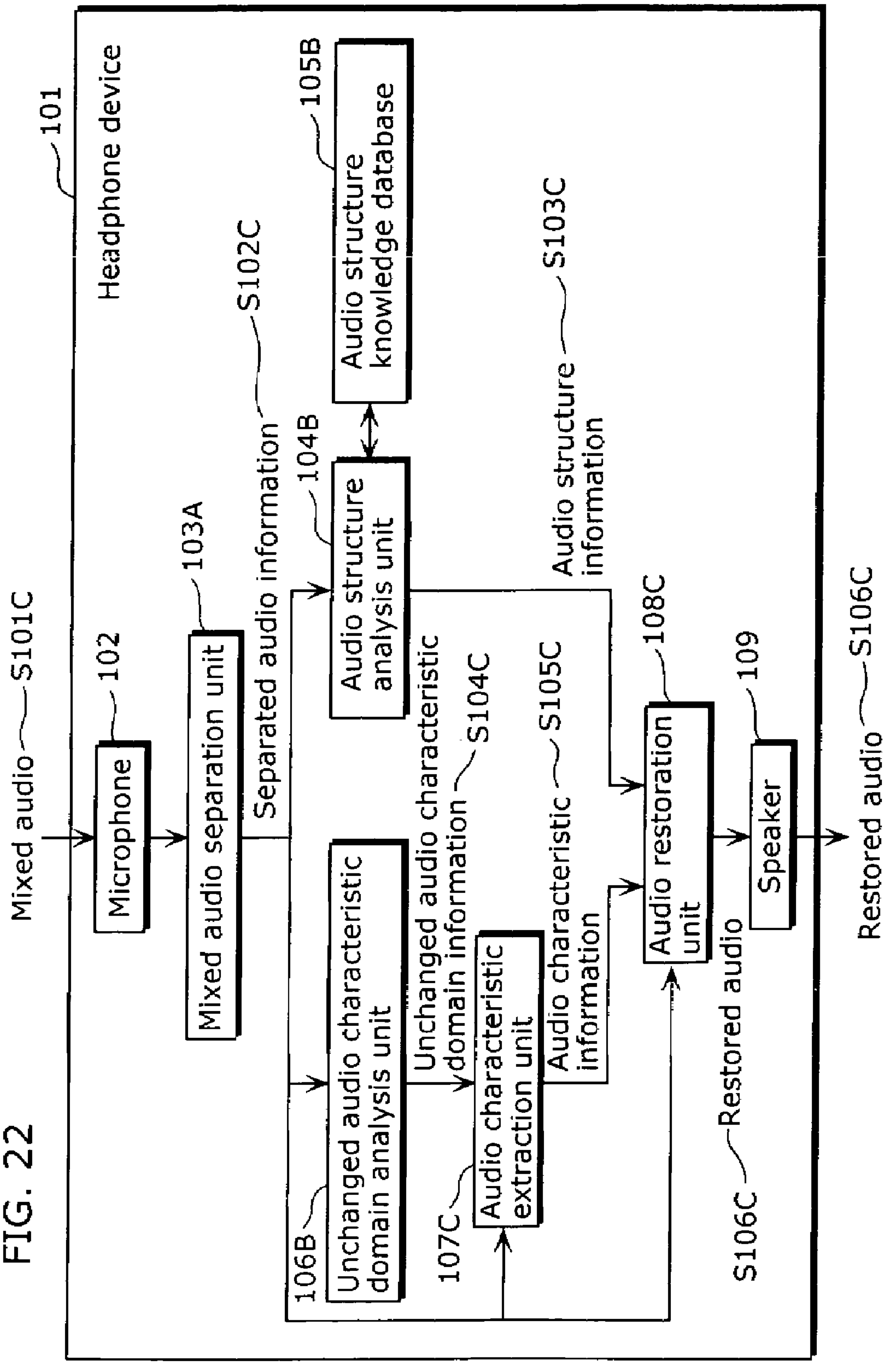
FIG. 22 is a block diagram showing an overall configuration of the audio restoration apparatus in the first embodiment of the present invention.

A user is listening to classical music at a concert hall. It is assumed that the user has difficulty in listening to the music because a neighboring person has started to eat snacks with noises sounding like "crunch crunch". Here, a method of restoring the classical music using the audio restoration apparatus of the present invention will be described. In this example, in FIG. 4, the mixed audio S101 is a mixed audio of the classical music and the noises sounding like "crunch crunch" at the time of eating snacks, and the restored audio S106 to be generated is classical music. The points which are different from the example <II>-<i> of FIG. 19 are: the operation of the mixed audio separation unit 103, the operation of the audio characteristic extraction unit 107B, and the operation of the audio restoration unit 108B. Hence, as shown in FIG. 22, the mixed audio separation unit 103B is referred to as a mixed audio separation unit 103A (refer to the example <I>-<ii>), the audio characteristic extraction unit 107B is referred to as an audio characteristic extraction unit 107C, and the audio restoration unit 108B is referred to as an audio restoration unit 108C. In addition, the mixed audio S101B is referred to as a mixed audio S101C, the separated audio information S102B is referred to as separated audio information S102C, the audio structure information S103B is referred to as audio structure information S103C, the unchanged audio characteristic domain information S104B is referred to as unchanged audio characteristic domain information S104C, the audio characteristic information S105B is referred to as audio characteristic information S105C, and the restored audio S106B is referred to as a restored audio S106C. Here, the audio restoration unit 108C restores the whole audio including the missing part to be restored, based on the audio structure information S103C and the audio characteristic information S105C. At this time, the whole audio is restored based on the balance information of the whole audio. Here, the point of difference from the example <I>-<ii> is that the audio to be restored is a musical audio instead of speech.

Figure 23:
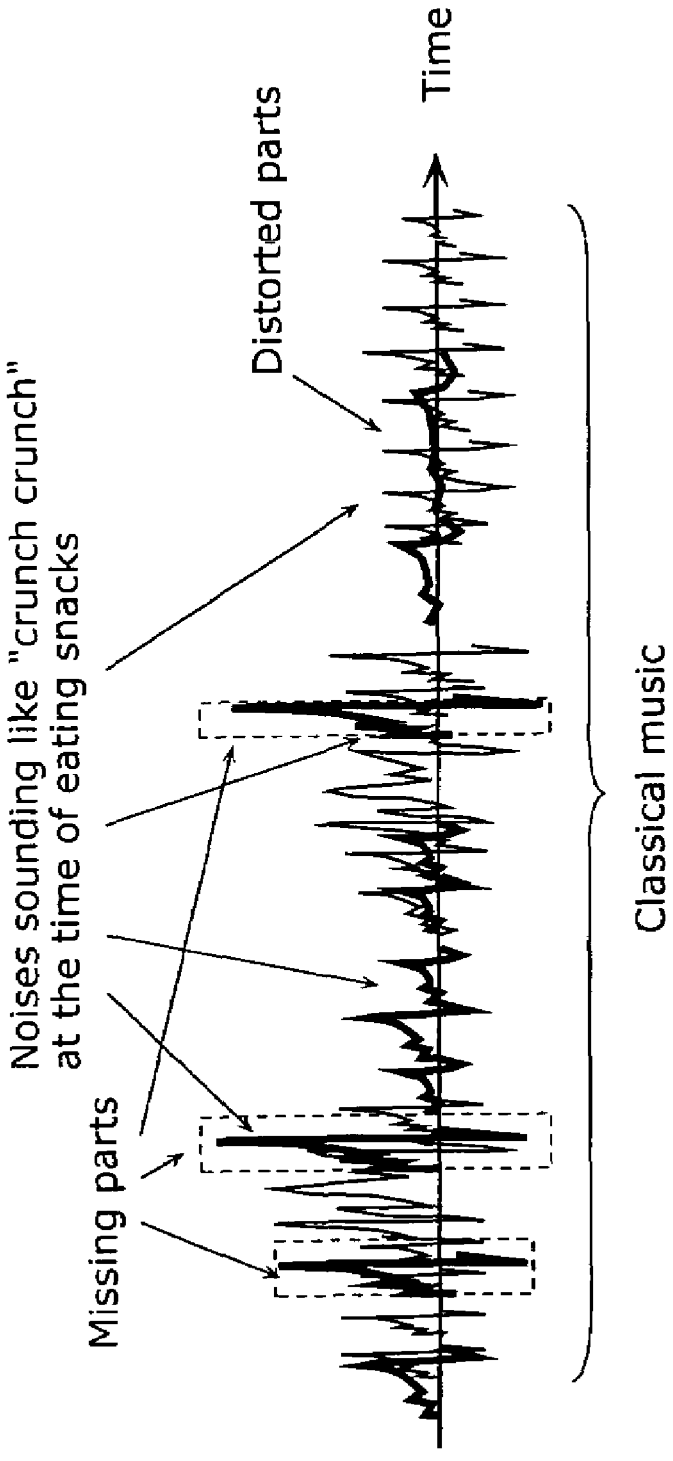
FIG. 23 is a diagram showing an example of a mixed audio.

To get things started, the mixed audio S101C is received using the microphone 102 mounted on the headphone device 101. The mixed audio S101C is an audio where the classical music and the noises sounding like "crunch crunch" at the time of eating snacks are overlapped. FIG. 23 shows an example schematic diagram of the mixed audio where the classical music and the noises sounding like "crunch crunch" at the time of eating snacks are overlapped. In this example, due to the noises at the time of eating snacks, the whole audio of the classical music is distorted. First, the mixed audio separation unit 103A extracts the separated audio information S102C using the mixed audio S101C received through the microphone 102, in a similar manner to the example <I>-<ii> (corresponding to Step 401 of FIG. 5). Here, the separated audio information to be extracted relates to a musical audio, instead of speech. Here, separated audio information having a format similar to FIG. 17 can be extracted. However, it should be noted that this example relates to a musical audio waveform, instead of a speech waveform.

Note that the separated audio information S102C may be represented by frequency information (for example, a set of time information, frequency information and power) on the spectrogram which has been subjected to frequency analysis, instead of being represented by waveform information. In addition, the classical music, which is a part of the separated audio information S102C, of the classical music may be extracted through an independent component analysis, or array processing where plural microphones are used.

Next, the audio structure analysis unit 104B generates audio structure information S103C of the classical music, which is an audio to be restored, in a similar manner to the example <II>-<i> (corresponding to Step 402 of FIG. 5).

Note that a musical score note may be previously registered in the audio structure knowledge database 105B. Additionally, the musical score of the musical tune to be played today may be updated and registered by downloading it from the musical website of the concert hall.

Next, the unchanged audio characteristic domain analysis unit 106B generates unchanged audio characteristic domain information S104C, in a similar manner to the example <II>-<i> (corresponding to Step 403 of FIG. 5).

Next, the audio characteristic extraction unit 107C extracts the audio characteristics of the classical music to be restored of each domain made up of the unchanged audio characteristics, based on the separated audio information S102C extracted by the mixed audio separation unit 103A and the unchanged audio characteristic domain information S104C generated by the unchanged audio characteristic domain analysis unit 106B, and generates the audio characteristic information S105C based on the extracted audio characteristics (corresponding to Step 404). Here, the audio characteristic extraction unit 107C estimates the audio characteristics using the audio characteristics of a frame with a low distortion level among the distortion levels included in the separated audio information S102C shown as FIG. 17, unlike the example <II>-<i>. Note that the audio characteristic extraction unit 107C may estimate the audio characteristics of predetermined domains by linearly adding the amounts of audio characteristics weighted in proportion to the distortion levels.

In this way, the audio characteristic extraction unit 107C can reproduce the real audio characteristics with fidelity by restoring them after: monitoring the changes of the audio characteristics of the audio to be restored which has been extracted from a mixed audio; segmenting the audio into time domains in each of which audio characteristics remain unchanged; and extracting audio characteristics of audio data (such as waveform data) having comparatively long durations in which correspond to the time domains which include the missing parts and where audio characteristics remain unchanged.

Next, the audio restoration unit 108C restores the whole classical music made up of a missing part, a distorted part and an undistorted part, based on the audio structure information S103C generated by the audio structure analysis unit 104B and the audio characteristic information S105C generated by the audio characteristic extraction unit 107C (corresponding to Step 405 of FIG. 5). First, the audio restoration unit 108C determines prosodeme sequence information of the whole musical audio which is desired to be restored, based on the audio structure information S103C. Next, based on the determined prosodeme sequence information, it determines rhythm information and audio volume change information of the whole musical tune, on a basis of a tune, a bar and/or the like. Subsequently, the audio restoration unit 108C restores the musical audio considering the balance of the whole audio through musical audio synthesis based on a MIDI audio source, using the musical note sequence described in the audio structure information S103C and the audio characteristics based on the MIDI audio source described in the audio characteristic information S105C.

By restoring the whole musical audio considering the balance of the whole musical audio, instead of the missing part only, it is possible to improve the balance of the musical audio between the missing part and the musical audio of the other part. Thus, it is possible to restore more natural musical audio. Lastly, the user can listen to the classical music through the speaker 109.

<III> Case of Restoring an Overlapped Two Kinds of Audios (Speech and a Background Audio)

A user is walking a street while making a conversation with a friend. However, due to noises of cars and voices of surrounding people, the user has difficulty in listening to the friend's voice. At that time, a bicycle comes from behind and the bicycle's bells are rung. However, it is assumed that the audio of the bells are not audible enough, due to the surrounding noises. Here will be described a method of restoring the audios of the friend's voice and the bicycle's bells, using the audio restoration apparatus of the present invention. In this example, in FIG. 4, the mixed audio S101 is the mixed audio where the friend's voice, the bicycle's bells and the surrounding noises are overlapped, and the restored speech S106 to be generated are the friend's voice and the bicycle's bells. The point of difference from the example <I>-<i> is that not the audio but the two of speech and a background audio are to be restored, and that the speech and the background audio which are desired to be restored are partially overlapped with each other.

Figure 24:
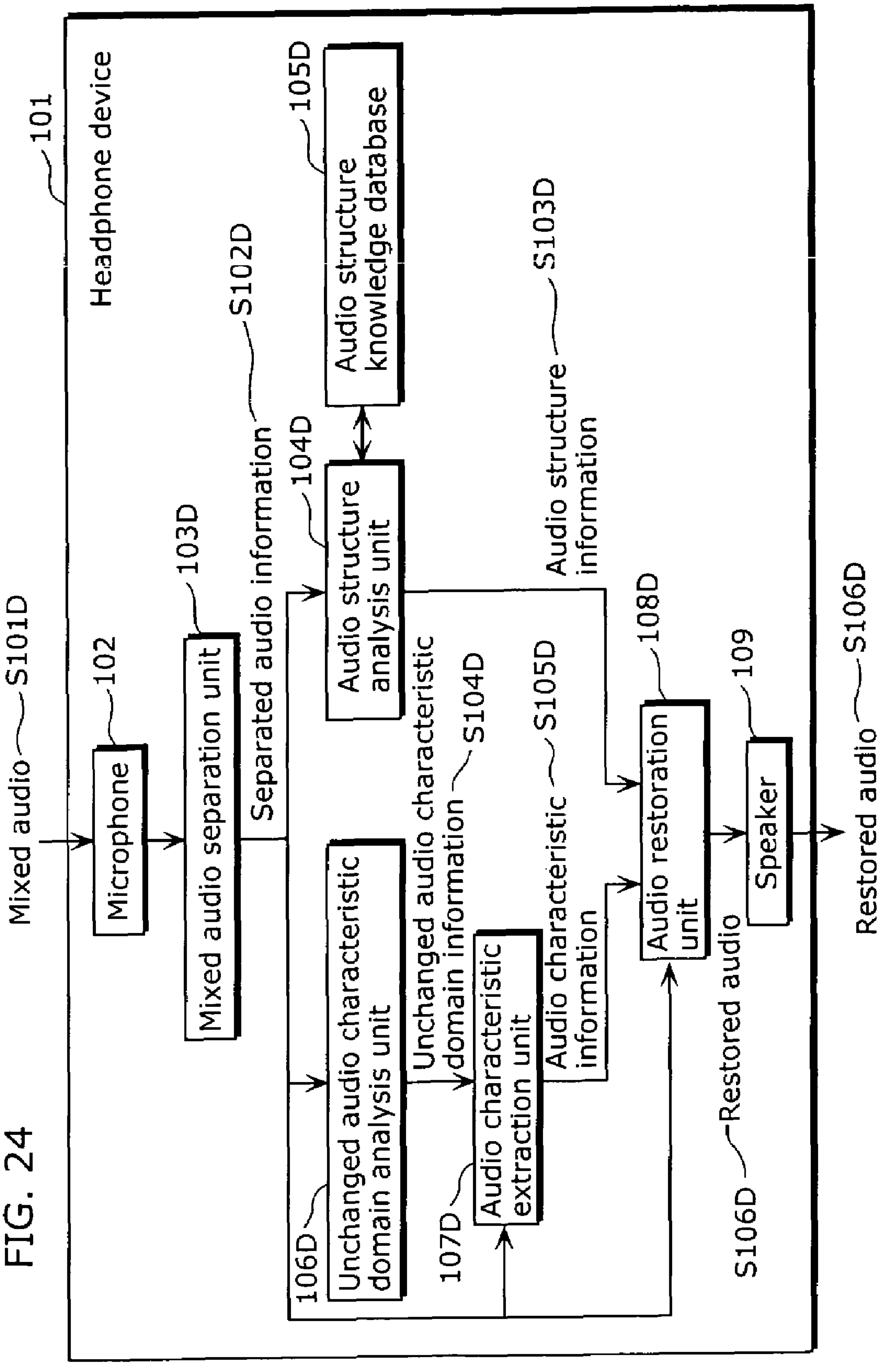
FIG. 24 is a block diagram showing an overall configuration of the audio restoration apparatus in the first embodiment of the present invention.

FIG. 24 is a block diagram showing an overall configuration of this embodiment.

The microphone 102 is intended for inputting a mixed audio S101D and outputting it to a mixed audio separation unit 103D.

The mixed audio separation unit 103D extracts the audio material to be restored which is separated audio information S102D from the mixed audio S101D.

An audio structure analysis unit 104D generates the audio structure information S103D of the audio to be restored, based on the separated audio information S102D extracted by the mixed audio separation unit 103D and the audio structure knowledge database 105D.

The unchanged audio characteristic domain analysis unit 106D obtains domains made up of the unchanged audio characteristics from the separated audio information S102D extracted by the mixed audio separation unit 103D and generates unchanged audio characteristic domain information S104D.

The audio characteristic extraction unit 107D extracts the audio characteristics of each domain, which is made up of the unchanged audio characteristics, of the audio to be restored, based on the unchanged audio characteristic domain information S104D generated by the unchanged audio characteristic domain analysis unit 106D, and generates the audio characteristic information S105D based on the extracted audio characteristics.

An audio restoration unit 108D generates a restored audio S106D based on the audio structure information S103D generated by the audio structure analysis unit 104D and the audio characteristic information S105D generated by the audio characteristic extraction unit 107D.

The speaker 109 outputs the restored audio S106D generated by the audio restoration unit 108D to the user.

Figure 25:
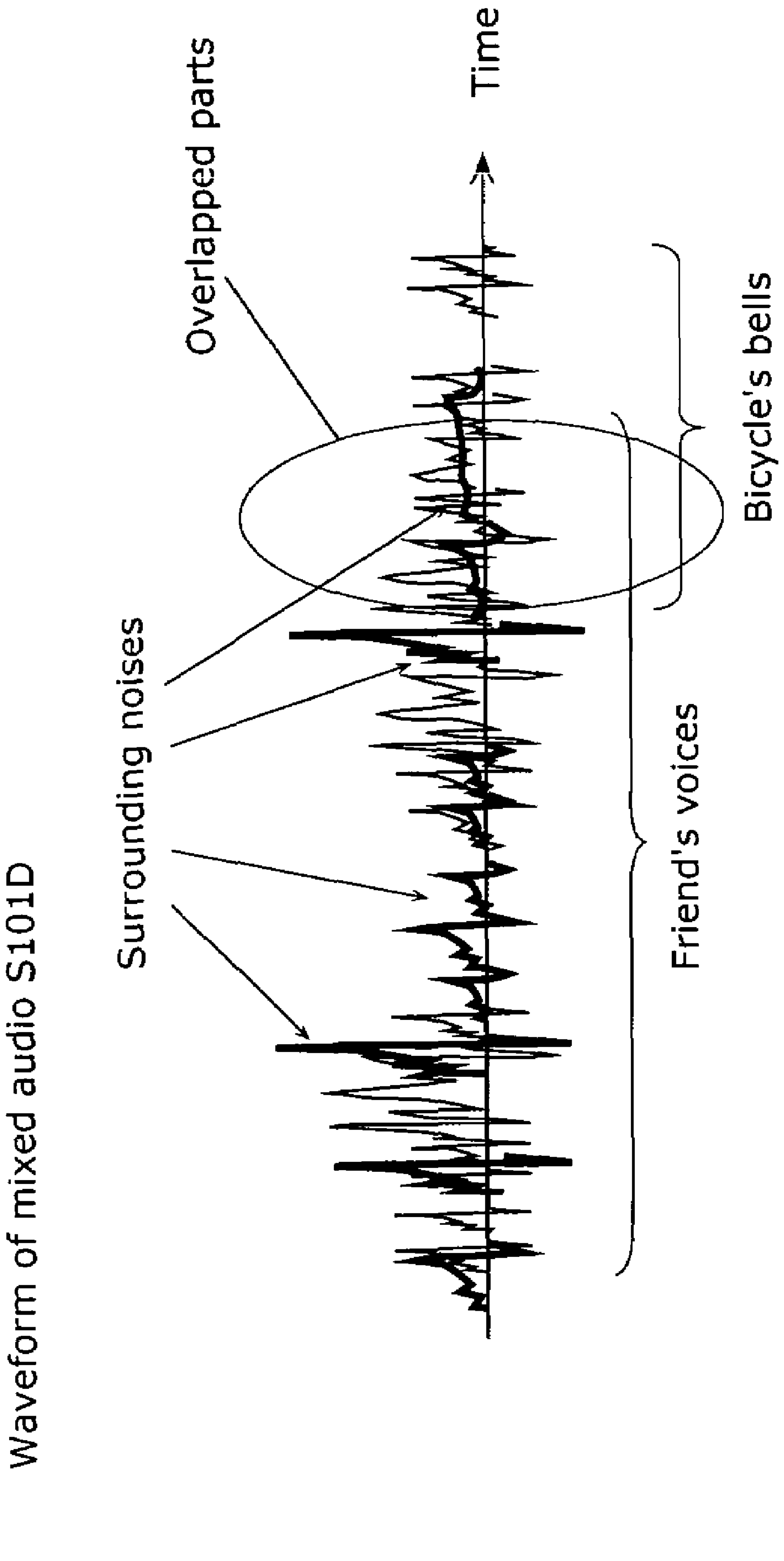
FIG. 25 is a diagram showing an example of a mixed audio.

To get things started, the mixed audio S101D is received using the microphone 102 mounted on the headphone device 101. The mixed audio S101D is the audio where the friend's voice, the bicycle's bells and the surrounding noises are overlapped with each other. FIG. 25 shows an example schematic diagram of the mixed audio where the friend's voice, the bicycle's bells and the surrounding noises are overlapped. In this example, the friend's voice and the bicycle's bells, which are the audios desired to be restored, are partially overlapped with each other. Additionally, the surrounding noises are overlapped with both of the friend's voice and the bicycle's bells.

Figure 26:
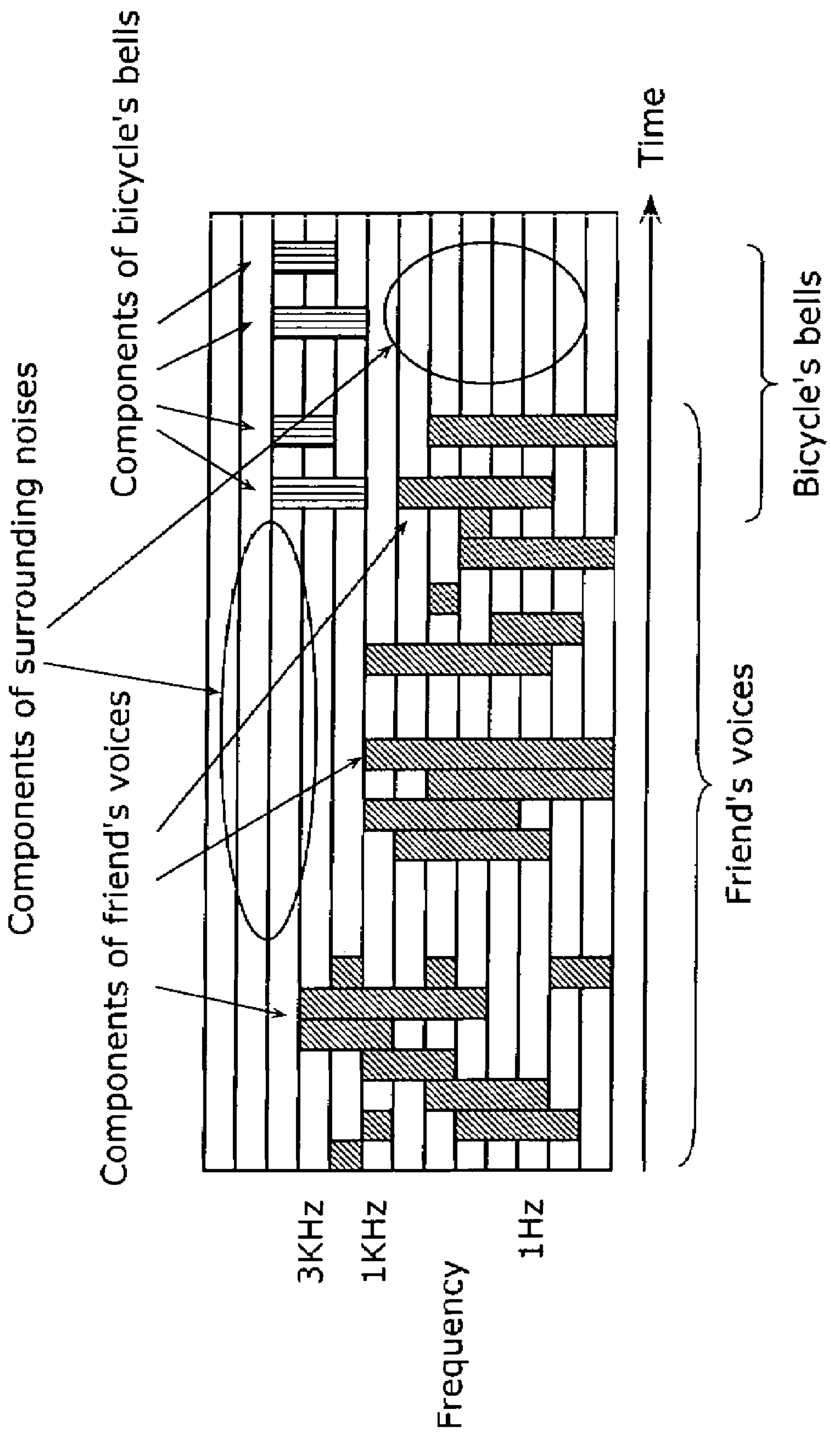
FIG. 26 is a diagram showing an example of separated audio information.

First, the mixed audio separation unit 103D extracts the separated audio information S102D using the mixed audio S101D received through the microphone 102 (corresponding to Step 401 of FIG. 5). Here, the mixed audio separation unit 103D performs frequency analysis of the mixed audio S101D and represents it as a spectrogram. Subsequently, it performs auditory scene analysis using a structural part of the audio waveform, and determines the attributes of the respective minute time-frequency domains. Such attributes are the friend's voice, the bicycle's bells, and the surrounding noises. Here, these three audios are separated using a method where it is assumed that only a single audio is preferentially dominant in each of the minute domains. FIG. 26 schematically shows the result of the auditory scene analysis. This result of this case shows that, even in the case where the friend's voice and the bicycle's bells are temporally overlapped, segmenting the domains on a frequency-by-frequency basis makes it possible to separate the components respectively. Subsequently, it extracts the separated audio information S102D like the example of FIG. 27, based on the result of the auditory scene analysis. In the example of separated audio information sown as FIG. 27, the attributes of the domain components of each time frame and frequency are written in the separated audio information, and the power values and the distortion levels of the respective domain components are also written. These attributes are the friend's voice, the bicycle's bells and so on. These distortion levels can be calculated based on the ratios between the respective domain components extracted through auditory scene analysis and the respective before-extraction components of the mixed audio.

Note that the mixed audio separation unit 103D may extract the separated audio information S102D using an independent component analysis, or array processing where plural microphones are used.

Next, the audio structure analysis unit 104D generates the audio structure information S103D of the friend's voice and the bicycle's bells which are the audios to be restored, based on the separated audio information S102D extracted by the mixed audio separation unit 103D and the audio structure knowledge database 105D which is made up of a phoneme dictionary, a word dictionary, a language chain dictionary and an audio source model dictionary (corresponding to Step 402 of FIG. 5). Here, it generates the phoneme sequence information and the musical note sequence information, as the audio structure information S103D. The phoneme sequence information of the friend's voice is generated using the phoneme dictionary, the word dictionary and the language chain dictionary. The musical note sequence information of the bicycle's bells which are a background audio is generated using the audio source model dictionary. First, it calculates the likelihoods of the friend's voice component which is a part of the separated audio information S102D (the component is, for example the frequency information of the component whose "audio attribute" is written as "friend" in the separated audio information of FIG. 27) with respect to the respective hidden Markov models (included in the phoneme dictionary) represented on the frequency domain which has been previously learned through a lot of audio data. Subsequently, it predicts a candidate phoneme based on the likelihoods. Further, it determines a phoneme sequence by narrowing down candidates based on the word dictionary and the language chain dictionary. In addition, it calculates the likelihoods of the bicycle's bell component which is a part of the separated audio information S102D (the component is, for example the frequency information of the component whose "audio attribute" is written as "bell" in the separated audio information of FIG. 27) with respect to the respective hidden Markov models (included in the phoneme dictionary) represented on the frequency domain which has been previously learned through a lot of speech data. Subsequently, it predicts candidate musical notes based on the likelihoods. Further, it determines a musical note sequence by narrowing down the candidate musical notes based on the audio source model dictionary where the temporal structures of the bicycle's bells and the like are written. Here, the audio structure analysis unit 104D may determine a phoneme sequence or a musical note sequence with high accuracy using the "distortion levels" written in the separated audio information of FIG. 27.

Figure 28:
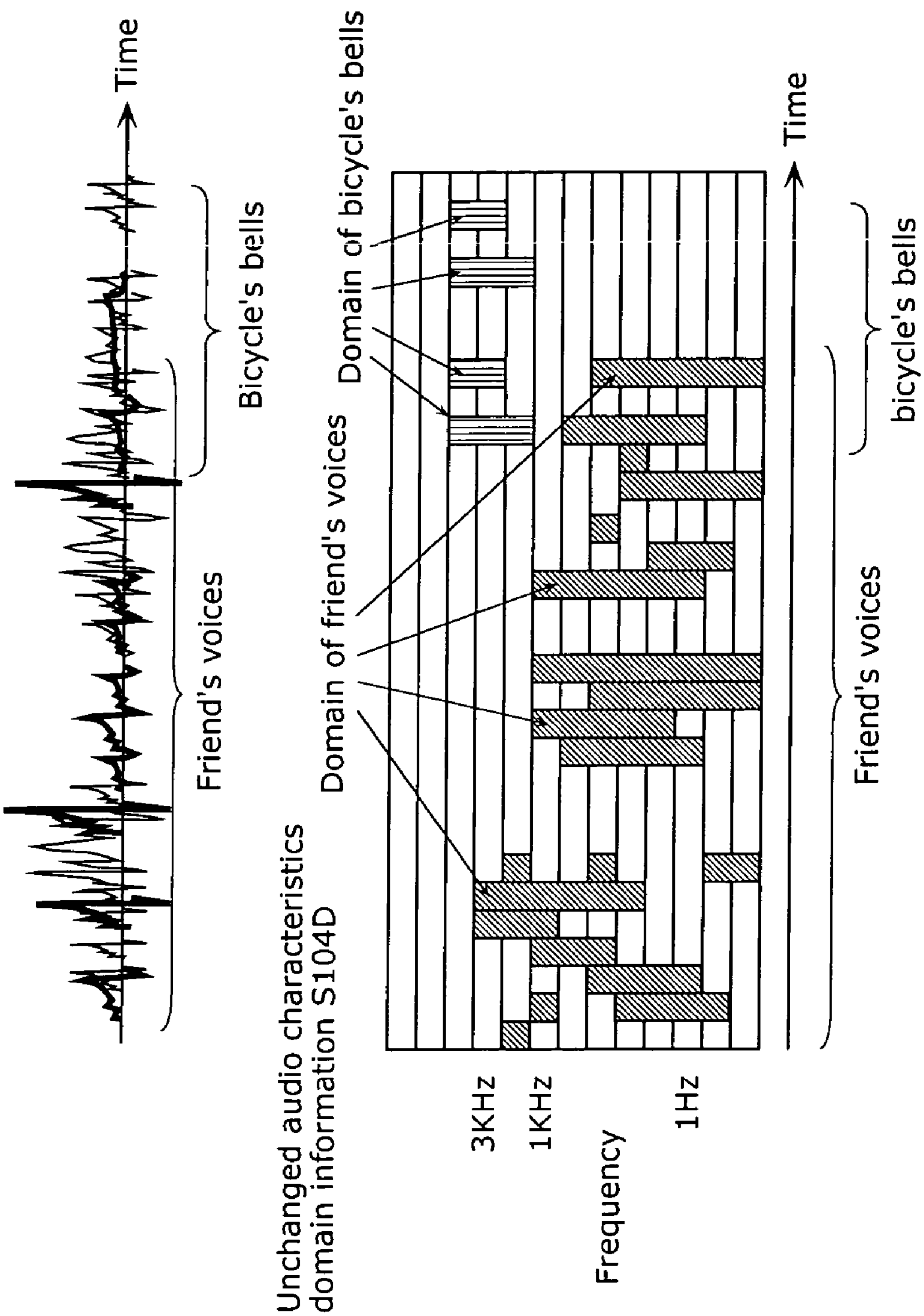
FIG. 28 is a diagram showing an example of unchanged audio characteristic domain information.

Next, the unchanged audio characteristic domain analysis unit 106D obtains domains made up of the unchanged audio characteristics, based on the separated audio information S102D extracted by the mixed audio separation unit 103D, and generates unchanged audio characteristic domain information S104D (corresponding to Step 403 of FIG. 5). Here, it determines which time-frequency domains are regarded as the domains made up of the unchanged audio characteristics, and generates the unchanged audio characteristic domain information based on the determined domains. FIG. 28 shows an example of the unchanged audio characteristic domain information S104D where the following two types of domains are extracted: time-frequency domains of the friend's voice; and the time-frequency domains of the bicycle's bells. In other words, the next-described audio characteristic extraction unit 107D extracts the two types of audio characteristics. The feature of this example is that the domains considered as the domains having the unchanged audio characteristics are temporally divided, and the domains are time-frequency domains.

Next, the audio characteristic extraction unit 107D extracts the audio characteristics of the respective friend's voice and bicycle's bells, based on the separated audio information S102D extracted by the mixed audio separation unit 103D and the unchanged audio characteristic domain information S104D generated by the unchanged audio characteristic domain analysis unit 106D, and generates the audio characteristic information S105D (corresponding to Step 404). Here, it extracts the following: the speaker's characteristics or the like, as the audio characteristic of the friend's voice; and the audio color or the like, as the audio characteristic of the bicycle's bells. Subsequently, it regards the extracted information as the audio characteristic information S105D. Here, it extracts a single audio characteristic for the whole friend's voice, and a single audio characteristic for the whole bicycle's bells, and generates the audio characteristic information S105D based on the extracted audio characteristics.

In this way, it can reproduce the real audio characteristics with fidelity by restoring them after: monitoring the changes of the audio characteristics of the audio to be restored which has been extracted from a mixed audio; segmenting the audio into time domains in each of which audio characteristics remain unchanged; and extracting audio characteristics of audio data (such as waveform data) having comparatively long durations which correspond to the time domains which include the missing parts and where audio characteristics remain unchanged.

Next, the audio restoration unit 108D restores the audios of the friend's voice and the bicycle's bells based on the audio structure information S103D generated by the audio structure analysis unit 104D and the audio characteristic information S105D generated by the audio characteristic extraction unit 107D (corresponding to Step 405 of FIG. 5). First, it restores the friend's voice in a similar manner to the example <I>-<ii>, and restores the bicycle's bells using a MIDI audio source.

In this way, even in the case where plural audios to be restored are overlapped with each other, it can restore the respective audios to be restored with high accuracy.

Note that the audio restoration unit 108D may restore the domains with low distortion levels or the undistorted domains using the "power" values of the separated audio information of FIG. 27 as they are. In this case, the frequency powers of the domains with high distortion levels are to be restored.

Lastly, the user can selectively listen to the friend's voice or the bicycle's bells which have been restored through the speaker 109. For example, the user can preferentially listen to the bicycle's bells for safety first and the restored voices of the friends next off line if the user wishes to do so. In addition, the user can listen to the two audio sources of friend's voice and the bicycle's bells in a manner that the positions of the two audio sources which are the two speakers for right and left ears are intentionally shifted. It is desirable at this time that the audio source position of the bicycle's bells be fixed for safety reason that the user can sense the coming direction of the bicycle.

As described above, with the first embodiment of the present invention, it is possible to restore a wide range of general audios (including speech, music and a background audio) because an audio is restored based on the audio structure information generated using the audio structure knowledge database. Further, it is possible to restore the audio before being distorted with fidelity with respect to the real audio characteristics. This is because an audio is restored based on the extracted audio characteristic information of each domain made up of the unchanged audio characteristics. In addition, with the mixed audio separation unit, it is possible to restore an audio from a mixed audio where plural audios coexist. In particular, it is possible to reproduce the real audio characteristics with fidelity by restoring them after monitoring the changes of the audio characteristics of the audio to be restored which has been extracted from a mixed audio; segmenting the audio into time domains in each of which audio characteristics remain unchanged; and extracting audio characteristics of audio data (such as waveform data) having comparatively long durations which correspond to the time domains which include the missing parts and where audio characteristics remain unchanged.

Note that, in the respective examples of: <I>-<i>, <I>-<ii>, <II>-<i>, <II>-<ii> and <III>, the audio restoration unit may restore the audio based on the acoustic characteristics of each user. For example, it is not necessary that it restores the parts which are not audible to a user, taking into account a masking effect. In addition, it may restore an audio taking into account an audible range of the user.

Note that the audio restoration unit 108D may improve an audio so that the audio becomes more audible to the user by: restoring the audio with fidelity with respect to the voice characteristic, the voice tone, the audio volume, the audio quality and the like, based on the audio characteristic information generated by the audio characteristic extraction unit; modifying some of the audio characteristics; and reducing only the reverberation. In addition, it may modify the audio structure information generated by the audio structure analysis unit, and modify the audio into an audio of honorific expression or dialect expression according to the phoneme sequences based on the modified audio structure information. These variations will be further described in a second embodiment and a third embodiment.

Second Embodiment

The descriptions provided here in a second embodiment relate to that an audio characteristic modification unit modifies audio characteristics of an audio in order to make it possible to generate modified restored audio which is listenable and sounds natural to a user. Here are described, as to audios to be restored, <IV> case of restoring speech and <V> case of restoring a musical audio.

<IV> Case of Restoring Speech

Figure 29:
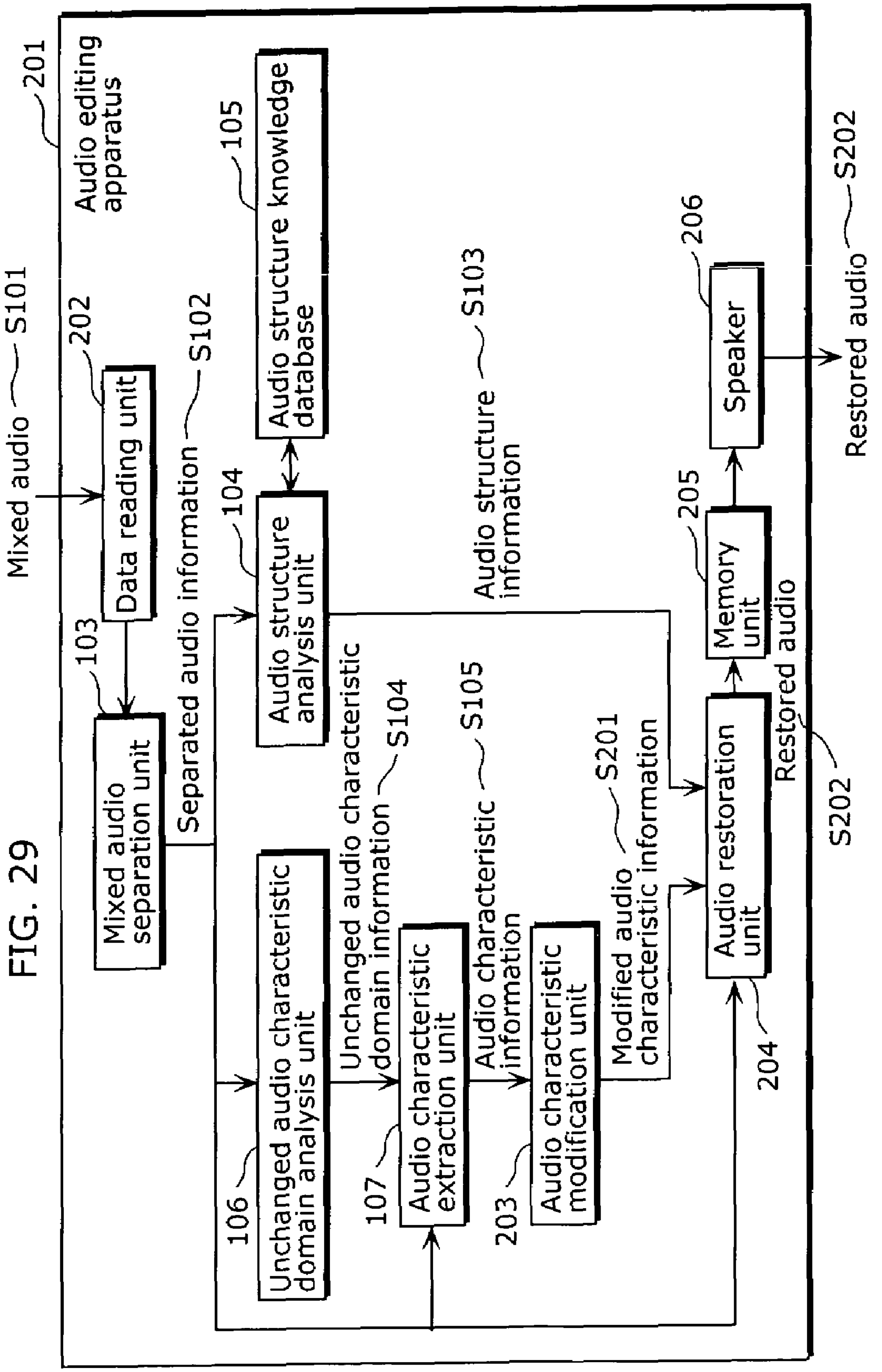
FIG. 29 is a block diagram showing an overall configuration of the audio restoration apparatus in a second embodiment of the present invention.

FIG. 29 is a block diagram showing an overall configuration of the audio restoration apparatus of the example <IV> in the second embodiment of the present invention. In FIG. 29, an audio editing apparatus 201 can be incorporated into a television, a personal computer, a Digital Versatile Disc (DVD) editing apparatus and the like. The audio editing apparatus 201 mounts an audio restoration function of extracting an audio which is desired by a user from a mixed audio, modifying the audio characteristics of the audio in order to make it possible to generate modified restored audio which is listenable. The audio editing apparatus 201 includes: a data reading unit 202, a mixed audio separation unit 103, an audio structure analysis unit 104, an audio structure knowledge database 105, an unchanged audio characteristic domain analysis unit 106, an audio characteristic extraction unit 107, an audio characteristic modification unit 203, an audio restoration unit 204, a memory unit 205, and a speaker 206.

The data reading unit 202 inputs a mixed audio S101 and outputs it to the mixed audio separation unit 103.

The mixed audio separation unit 103 extracts an audio material to be restored, which is separated audio information S102, from the mixed audio S101.

The audio structure analysis unit 104 generates audio structure information S103 of the audio to be restored, based on the separated audio information S102 extracted by the mixed audio separation unit 103 and the audio structure knowledge database 105.

The unchanged audio structure domain analysis unit 106 obtains domains where audio characteristics remain unchanged, based on the separated audio information S102 extracted by the mixed audio separation unit 103, and generates unchanged audio characteristic domain information S104.

The audio characteristic extraction unit 107 extracts the audio characteristics of each domain, in which audio characteristics remain unchanged, of the audio to be restored, based on the unchanged audio characteristic domain information S104 generated by the unchanged audio characteristic domain analysis unit 106. Subsequently, it generates audio characteristic information S105 based on the extracted audio characteristics.

The audio characteristic modification unit 203 modifies the audio characteristic information S105 generated by the audio characteristic extraction unit 107 so as to generate modified audio characteristic information S201.

The audio restoration unit 204 generates restored audio S202, based on the audio structure information S103 generated by the audio structure analysis unit 104 and the modified audio characteristic information S201 generated by the audio characteristic modification unit 203.

The memory unit 205 stores the restored audio S202 generated by the audio restoration unit 204.

The speaker 206 outputs the restored audio S202 stored in the memory unit 205.

Figure 30:
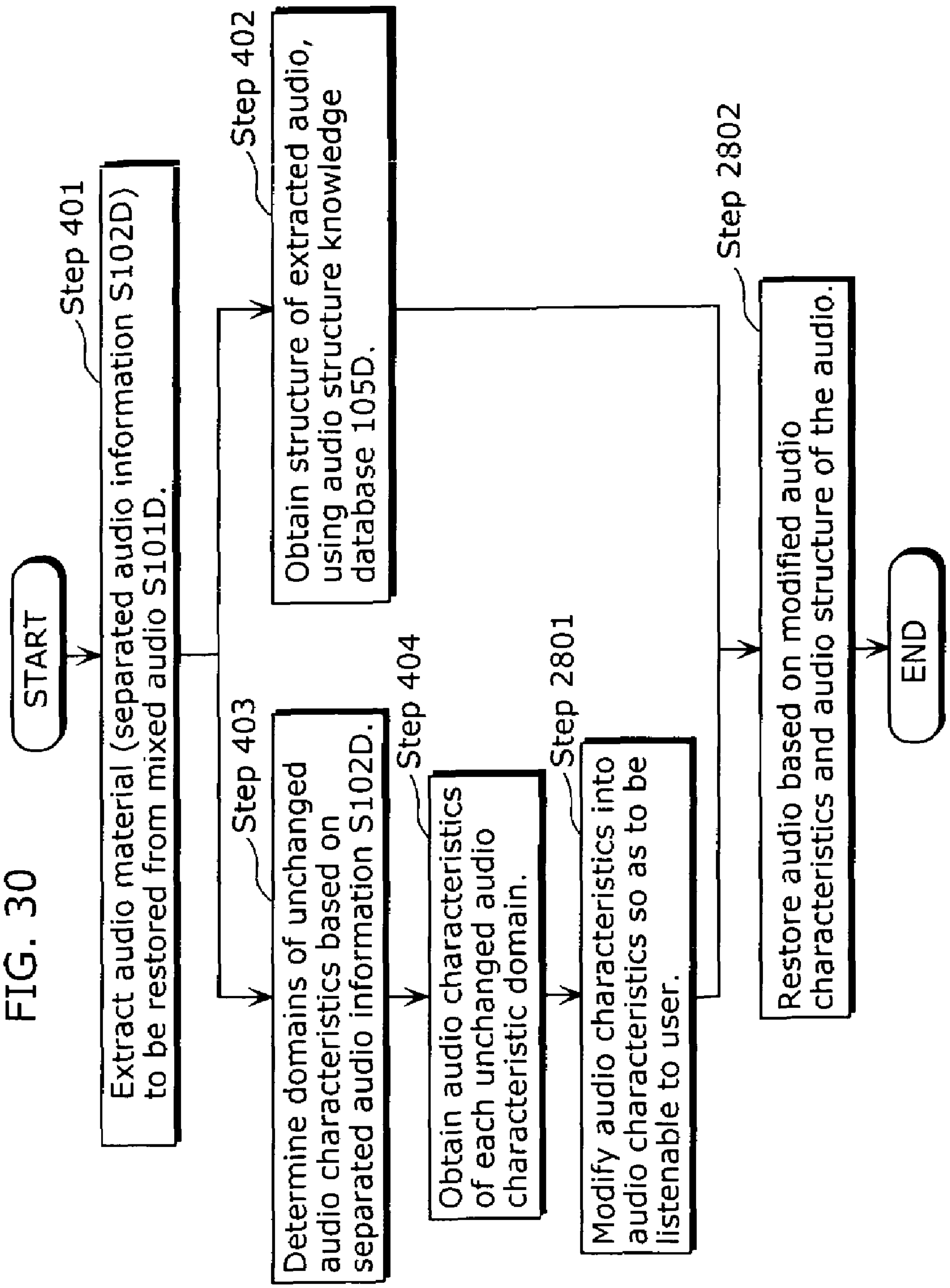
FIG. 30 is a flow chart showing an operation flow of the audio restoration apparatus in the second embodiment of the present invention.

FIG. 30 is a flow chart showing the operation flow of the audio restoration apparatus in the second embodiment of the present invention. First, the mixed audio separation unit 103 extracts, from the mixed audio S101, an audio material to be restored which is separated audio information S102 (Step 401). Next, the audio structure analysis unit 104 generates audio structure information S103, based on the extracted separated audio information S102 and the audio structure knowledge database 105 (Step 402). In addition, the unchanged audio characteristic domain analysis unit 106 obtains domains where audio characteristics remain unchanged from the extracted separated audio information S102, and generates unchanged audio characteristic domain information S104 (Step 403). Subsequently, the audio characteristic extraction unit 107 extracts the audio characteristics of each unchanged audio characteristic domain in the audio to be restored, based on the unchanged audio characteristic domain information S104, and generates audio characteristic information S105 (Step 404). Subsequently, the audio characteristic modification unit 203 modifies the audio characteristic information S105 so as to generate modified audio characteristic information S201 (Step 2801). Lastly, the audio restoration unit 204 generates a restored audio S202, based on the audio structure information S103 and the modified audio characteristic information S201 (Step 2802).

Next, a concrete example of applying the example <IV> of this embodiment to the audio restoration function of the audio editing apparatus will be described. Here will be described a method of restoring an announcement speech from a mixed audio S101 where the announcement speech and chimes are overlapped, in a similar manner to the example <I>-<i>" of the first embodiment. Here, the point different from the first embodiment is that the audio restoration unit 204 restores the audio using the modified audio characteristic information S201 generated by the audio characteristic modification unit 203, instead of using the generated audio characteristic information S105 as it is.

To get things started, the mixed audio S101 where the announcement speech and chimes are overlapped (refer to FIG. 6) is received using the data reading unit 202 mounted on the audio editing apparatus 101.

First, the mixed audio separation unit 103 extracts the separated audio information S102 using the mixed audio S101 received by the data reading unit 202 in a similar manner to the example <I>-<i> in the first embodiment (corresponding to Step 401 of FIG. 30).

Next, the audio structure analysis unit 104 generates audio structure information S103 of the announcement speech in a similar manner to the example <I>-<i> in the first embodiment.

Next, the unchanged audio characteristic domain analysis unit 106 obtains domains where audio characteristics remain unchanged, based on the separated audio information S102 extracted by the mixed audio separation unit 103, in a similar manner to the example <I>-<i> in the first embodiment, and generates the unchanged audio characteristic information S104 (corresponding to Step 403 of FIG. 30).

The audio characteristic extraction unit 107 extracts the audio characteristics of each domain, in which audio characteristics remain unchanged, of the announcement speech to be restored, based or, the separated audio information S102 extracted by the mixed audio separation unit 103 and the unchanged audio characteristic domain information S104 generated by the unchanged audio characteristic domain analysis unit 106, and generates audio characteristic information S105 (corresponding to Step 404 of FIG. 30). Here, it extracts, as audio characteristics, speaker's characteristics, gender-specific characteristics, a voice age, a voice characteristic, a voice tone, an audio volume, a reverberation characteristic and an audio quality.

Next, the audio characteristic modification unit 203 modifies the audio characteristic information S105 generated by the audio characteristic extraction unit 107 so as to generate modified audio characteristic information S201 (corresponding to Step 2801 of FIG. 30). Here, the audio characteristic modification unit 203 modifies the audio characteristic information S105 so as to generate audio characteristics which are listenable to the user. The audio characteristic information S105 is made up of the speaker's characteristics, the gender-specific characteristics, the voice age, the voice characteristic, the voice tone, the audio volume, the audio quality, the reverberation characteristic and the audio color. For example, the audio characteristic modification unit 203 can modify only the audio characteristic corresponding to the speaker's characteristics in order to highlight the feature of the speaker a little bit. Without modifying the real audio characteristics a lot, it is possible to generate modified restored audio which is listenable and sounds natural. In addition, it can modify the voice tone of the announcement into a polite voice tone. In addition, it modifies a stuttering voice into a clear voice in order to make it possible to generate modified restored audio which is listenable. In addition, it can make the audio volume louder or reduce the reverberation in order to make it possible to generate modified restored audio which is listenable. Since only a part of audio characteristics is modified here, it is possible to generate modified restored audio which sounds natural. For example, modifying only the reverberation characteristic does not affect the audio characteristic of the speaker, and thus it is possible to restore the real speech of the speaker.

Next, the audio restoration unit 204 restores the announcement speech based on the audio structure information S103 generated by the audio structure analysis unit 104 and the modified audio characteristic information S201 generated by the audio characteristic modification unit 203 (corresponding to Step 2802 of FIG. 30). Here, it restores the whole announcement speech as restored audio S202 through speech synthesis, based on the modified audio characteristics.

Next, the memory unit 205 stores the restored audio S202 generated by the audio restoration unit 204.

Lastly, the user can listen to the restored announcement through the speaker 206.

<V> Case of Restoring a Musical Audio

Figure 31:
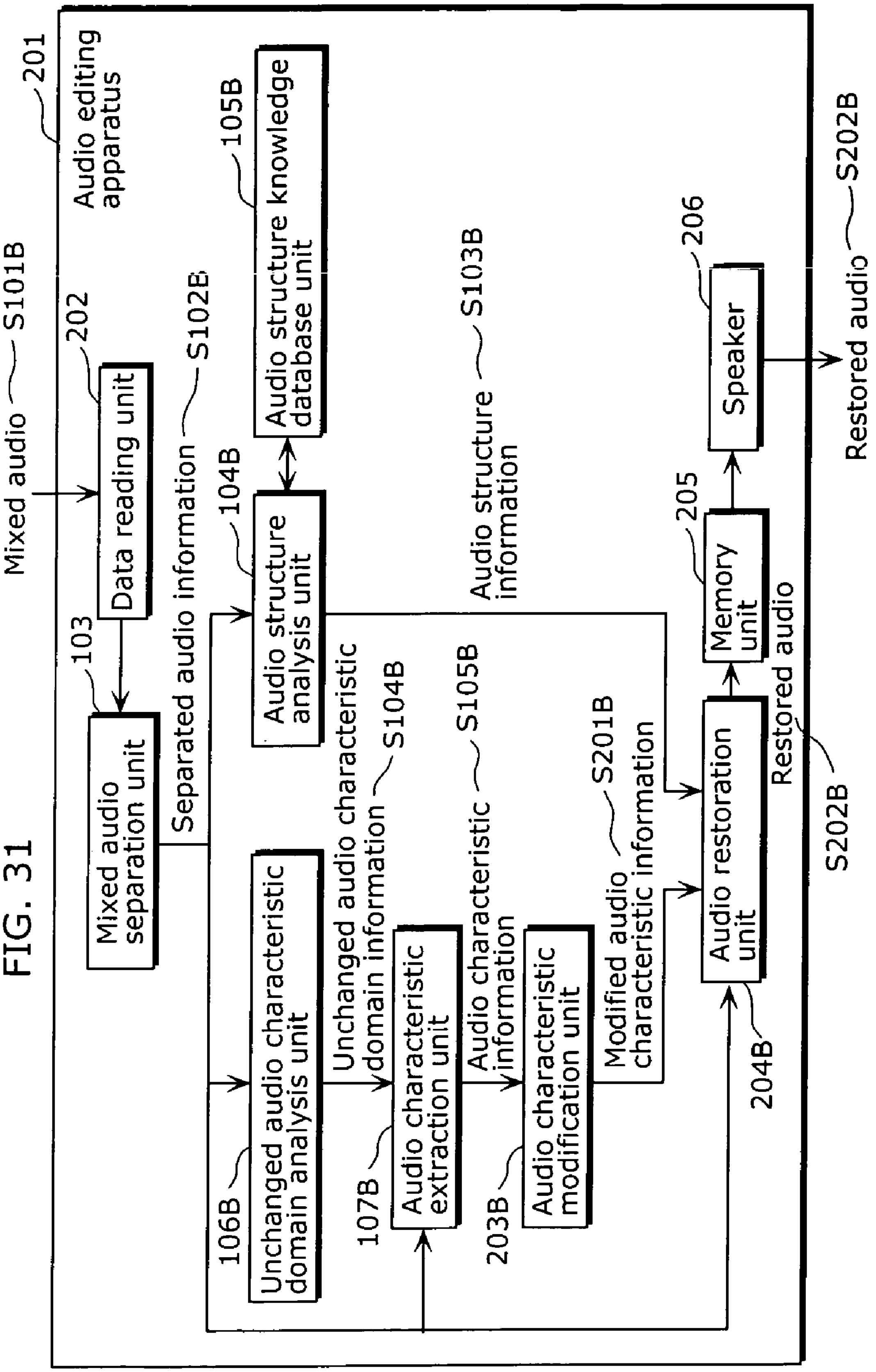
FIG. 31 is a block diagram showing another overall configuration of the audio restoration apparatus in the second embodiment of the present invention.

FIG. 31 is a block diagram showing the overall configuration of the audio restoration apparatus of the example <V> in the second embodiment of the present invention. In FIG. 31, as in a similar manner to the example <IV>, the audio editing apparatus 201 can be incorporated into a television, a personal computer and a DVD editing apparatus. The audio editing apparatus 201 mounts an audio restoration function of extracting an audio which is desired by a user from a mixed audio, modifying the audio characteristics of the audio in order to make it possible to generate modified restored audio which is listenable. The audio editing apparatus 201 includes: a data reading unit 202, a mixed audio separation unit 103, an audio structure analysis unit 104B, an audio structure knowledge database 105B, an unchanged audio characteristic domain analysis unit 106B, an audio characteristic extraction unit 107B, an audio characteristic modification unit 203B, an audio restoration unit 204B, a memory unit 205, and a speaker 206.

The data reading unit 202 inputs a mixed audio S101B and outputs it to the mixed audio separation unit 103.

The mixed audio separation unit 103 extracts an audio material to be restored which is separated audio information S102B from the mixed audio S101B.

The audio structure analysis unit 104B generates audio structure information S103B of the audio to be restored, based on the separated audio information S102B extracted by the mixed audio separation unit 103 and the audio structure knowledge database 105B.

The unchanged audio characteristic domain analysis unit 106B obtains domains where audio characteristics remain unchanged based on the separated audio information S102B extracted by the mixed audio separation unit 103, and generates unchanged audio characteristic domain information S104B.

The audio characteristic extraction unit 107B extracts the audio characteristics of each domain, in which audio characteristics remain unchanged, of the audio to be restored, based on the unchanged audio characteristic domain information S104B generated by the unchanged audio characteristic domain analysis unit 106B. Subsequently, it generates audio characteristic information S105B based on the extracted audio characteristics.

The audio characteristic modification unit 203B modifies the audio characteristic information S105B generated by the audio characteristic extraction unit 107B so as to generate modified audio characteristic information S201B.

The audio restoration unit 204B generates restored audio S202B, based on the audio structure information S103B generated by the audio structure analysis unit 104B and the modified audio characteristic information S201B generated by the audio characteristic modification unit 203B.

The memory unit 205 stores the restored audio S202B generated by the audio restoration unit 204B.

The speaker 206 outputs the restored audio S202B stored in the memory unit 205.

Next, a concrete example of applying the example <V> of this embodiment to the audio restoration function of the audio editing apparatus will be described. Here will be described a method of restoring BGM playing in streets from the mixed audio S101B where the BGM and car's horns are overlapped in a similar manner to the example <II>-<i> in the first embodiment. Here, the point of difference from the example <IV> is that a musical audio is restored instead of speech.

To get things started, the mixed audio S101B where the BGM and the car's horns are overlapped (refer to FIG. 20) is received using the data reading unit 202 mounted on the audio editing apparatus 101.

First, the mixed audio separation unit 103 extracts the separated audio information S102B using the mixed audio S101B received by the data reading unit 202 in a similar manner to the example <II>-<i> in the first embodiment (corresponding to Step 401 of FIG. 30).

Next, the audio structure analysis unit 104B generates audio structure information S103B of the BGM in a similar manner to the example <II>-<i> in the first embodiment (corresponding to Step 402 of FIG. 30).

Next, the unchanged audio characteristic domain analysis unit 106B obtains domains where audio characteristics remain unchanged, based on the separated audio information S102B extracted by the mixed audio separation unit 103, in a similar manner to the example <II>-<i> in the first embodiment, and generates the unchanged audio characteristic information S104B (corresponding to Step 403 of FIG. 30).

The audio characteristic extraction unit 107B extracts the audio characteristics of each domain, in which audio characteristics remain unchanged, of the announcement speech to be restored, based on the separated audio information S102B extracted by the mixed audio separation unit 103 and the unchanged audio characteristic domain information S104B generated by the unchanged audio characteristic domain analysis unit 106B, and generates audio characteristic information S105B (corresponding to Step 404 of FIG. 30). Here, it extracts, as audio characteristics, audio volume, audio quality, reverberation characteristic and audio color.

Next, the audio characteristic modification unit 203B modifies the audio characteristic information S105B generated by the audio characteristic extraction unit 107B so as to generate modified audio characteristic information S201B (corresponding to Step 2801 of FIG. 30). Here, the audio characteristic modification unit 203B modifies the audio characteristic information S105B so as to generate audio characteristics which are listenable to the user based on the modified audio characteristics. The audio characteristic information S105B is made up of the audio volume, the audio quality, the reverberation characteristic and the audio color. For example, the audio characteristic modification unit 203B can modify only the audio color in order to highlight the audio color of the musical instrument used in the playing a little bit. This makes it possible to generate modified restored audio which is listenable and sounds natural. In addition, it can make the audio volume louder, reduce the reverberation, or improve the audio quality in order to make it possible to generate modified restored audio which is listenable. Since only a part of audio characteristics is modified here, it is possible to generate modified restored audio which sounds natural.

Next, the audio restoration unit 204B restores the BGM based on the audio structure information S103B generated by the audio structure analysis unit 104B and the modified audio characteristic information S201B generated by the audio characteristic modification unit 203B (corresponding to Step 2802 of FIG. 30). Here, it restores the whole BGM as restored audio S202B through audio synthesis, based on the modified audio characteristics.

Next, the memory unit 205 stores the restored audio S202B generated by the audio restoration unit 204B.

Lastly, the user can listen to the restored BGM through the speaker 206.

As described above, with the second embodiment of the present invention, it is possible to restore an audio to be restored in a mixed audio, with high fidelity and accuracy with respect to the stored audio characteristics, by restoring the audio after: monitoring the changes of the audio characteristics of the audio to be restored which has been extracted from a mixed audio; segmenting the audio to be restored into time domains in each of which audio characteristics remain unchanged; and extracting audio characteristics of audio data (such as waveform data) having comparatively long durations which correspond to the time domains which include the missing parts and where audio characteristics remain unchanged. Further, with the audio characteristic modification unit, it is possible to generate a modified restored audio which is listenable to a user.

Note that the audio restoration unit may restore an audio based on the auditory sense characteristic of a user, in the examples <IV> and <V>. For example, it is not necessary that it restores the parts which are not audible to a user, taking into account a masking effect. In addition, it may restore an audio taking into account an audible range of a user. In addition, the audio characteristic modification unit may modify audio characteristics based on the auditory sense characteristic of a user. In the case where a user has difficulty in hearing a low frequency band of an audio, it may increase the power of the low frequency band in obtaining the restored audio.

The examples <IV> and <V> have been described partly using the descriptions of the examples <I>-<i> and <II>-<i> in the first embodiment. However, examples which can be used here are not limited to the examples <I>-<i> and <II>-<i>. Audios may be restored in the examples <IV> and <V> described partly using the descriptions of the examples <I>-<ii>, <II>-<ii> and <III> in the first embodiment.

Third Embodiments

The descriptions provided here relate to that an audio structure modification unit modifies audio structure information of an audio makes it possible to generate modified restored audio which is listenable and sounds natural to a user. Here is described an example case where the audio restoration apparatus of the present invention is incorporated into a mobile videophone. As to audios to be restored, the example cases provided here are <VI> case of restoring speech and <VII> case of restoring a musical audio.

<VI> Case of Restoring Speech

Figure 32:
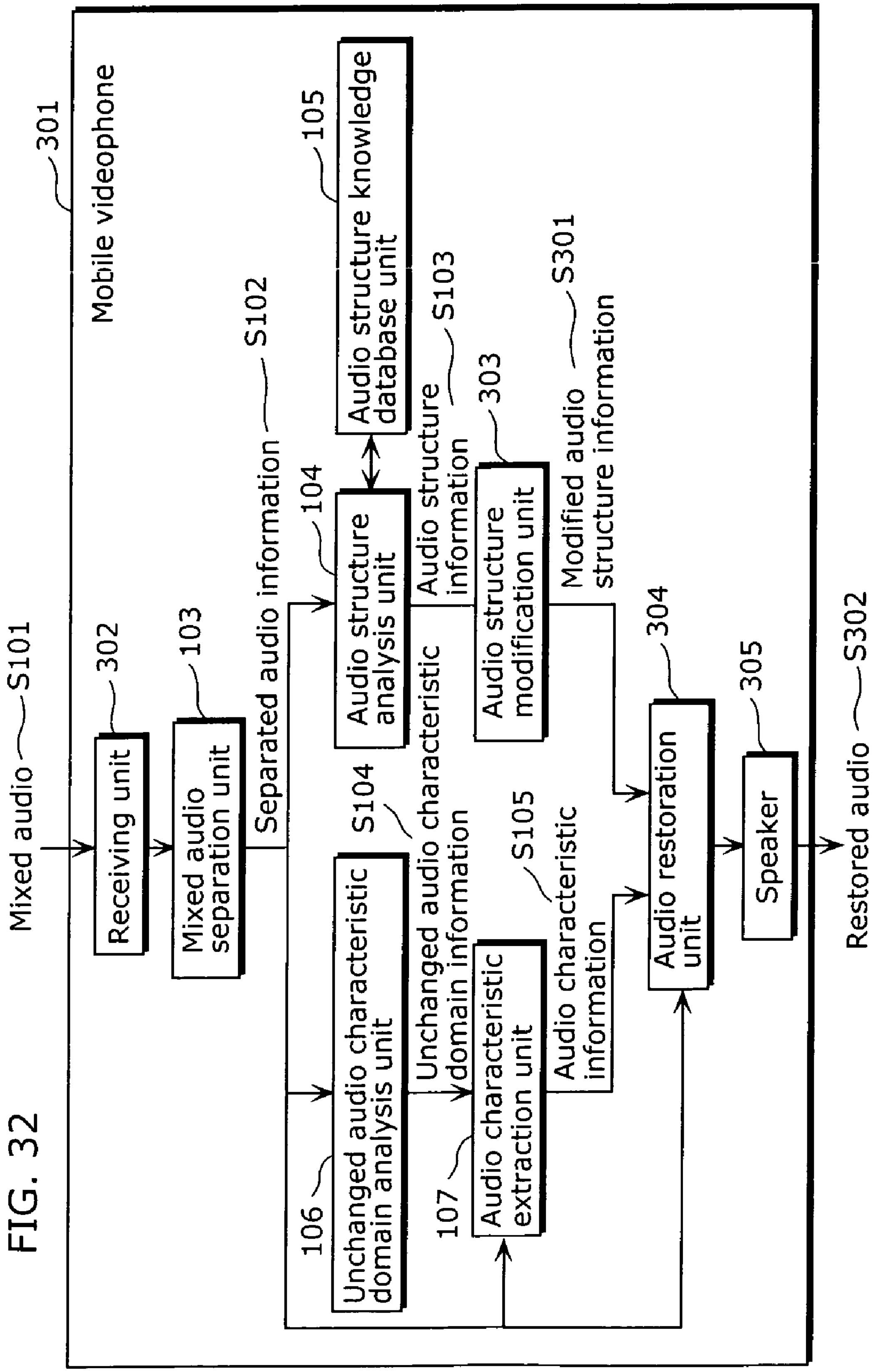
FIG. 32 is a block diagram showing an overall configuration of the audio restoration apparatus in a third embodiment of the present invention.

FIG. 32 is a block diagram showing the overall configuration of the audio restoration apparatus of the example <VI> in the third embodiment of the present invention. In FIG. 32, a mobile videophone 301 mounts an audio restoration function of extracting an audio which is desired by a user from a mixed audio, modifying the audio structure information of the audio, and generates modified restored audio which is listenable. The mobile videophone 301 includes: a receiving unit 302, a mixed audio separation unit 103, an audio structure analysis unit 104, an audio structure knowledge database 105, an audio structure modification unit 303, an unchanged audio characteristic domain analysis unit 106, an audio characteristic extraction unit 107, an audio restoration unit 204, and a speaker 305.

The receiving unit 302 inputs a mixed audio S101 and outputs it to the mixed audio separation unit 103.

The mixed audio separation unit 103 extracts an audio material to be restored which is separated audio information S102 from the mixed audio S101.

The audio structure analysis unit 104 generates audio structure information S103 of the audio to be restored, based on the separated audio information S102 extracted by the mixed audio separation unit 103 and the audio structure knowledge database 105.

The audio structure modification unit 303 modifies the audio structure information S103 generated by the audio structure analysis unit 104 so as to generate modified audio structure information S301.

The unchanged audio characteristic domain analysis unit 106 obtains domains where audio characteristics remain unchanged based on the separated audio information S102 extracted by the mixed audio separation unit 103, and generates unchanged audio characteristic domain information S104.

The audio characteristic extraction unit 107 extracts the audio characteristics of each domain, in which audio characteristics remain unchanged, of the audio to be restored, based on the unchanged audio characteristic domain information S104 generated by the unchanged audio characteristic domain analysis unit 106. Subsequently, it generates audio characteristic information S105 based on the extracted audio characteristics.

An audio restoration unit 304 generates restored audio S302, based on the modified audio structure information S301 generated by the audio structure modification unit 303 and the audio characteristic information S105 generated by the audio characteristic extraction unit 107.

The speaker 305 outputs the restored audio S302 generated by the audio restoration unit 304.

Figure 33:
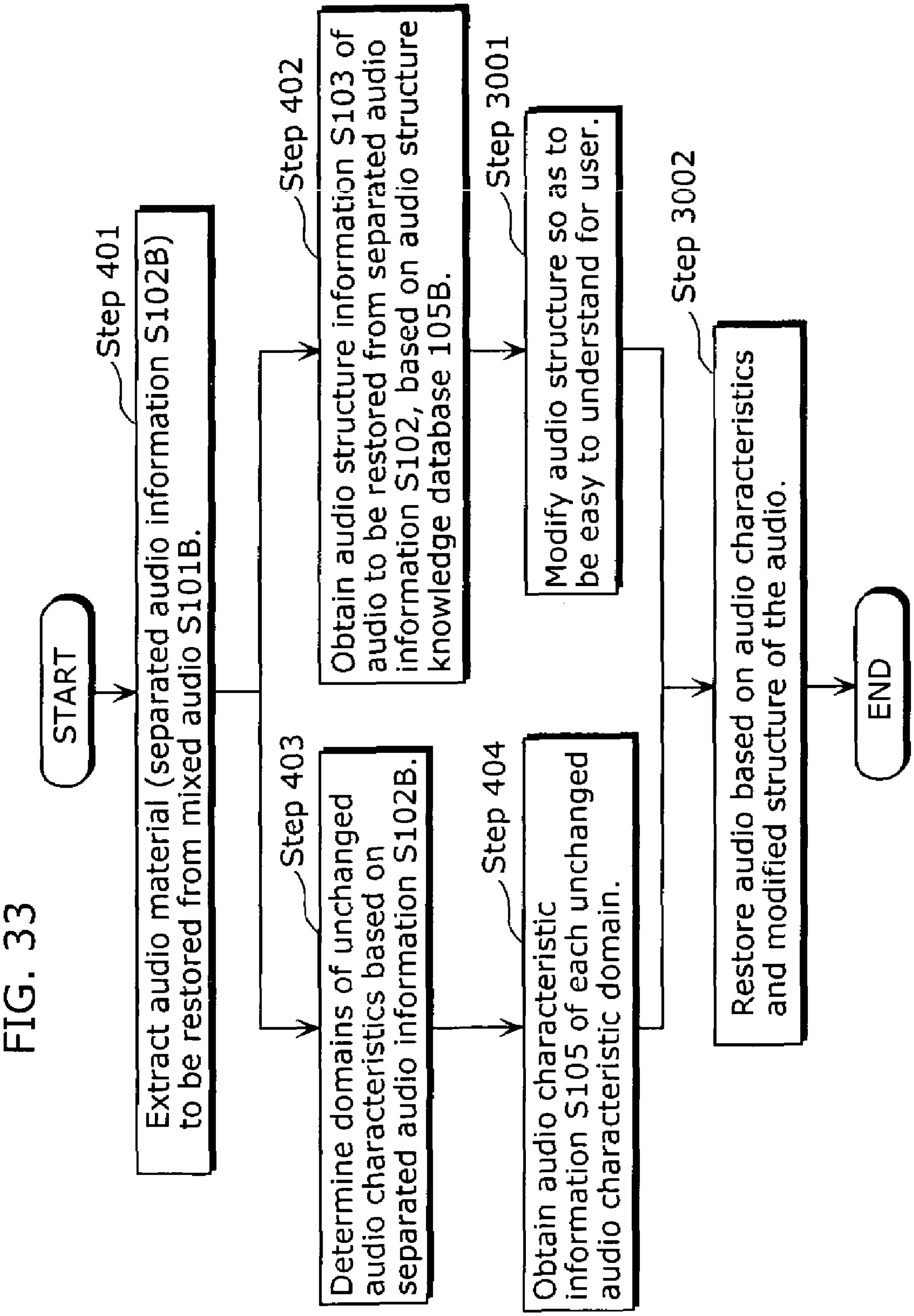
FIG. 33 is a flow chart showing an operation flow of the audio restoration apparatus in the third embodiment of the present invention.

FIG. 33 is a flow chart showing an operation flow of the audio restoration apparatus in the third embodiment of the present invention. First, the mixed audio separation unit 103 extracts, from the mixed audio S101, an audio material to be restored which is separated audio information S102 (Step 401). Next, the audio structure analysis unit 104 generates audio structure information S103, based on the extracted separated audio information S102 and the audio structure knowledge database 105 (Step 402). Subsequently, the audio structure modification unit 303 modifies the audio structure information S103 so as to generate modified audio structure information S301 (Step 3001). In addition, the unchanged audio characteristic domain analysis unit 106 obtains domains where audio characteristics remain unchanged from the extracted separated audio information S102, and generates unchanged audio characteristic domain information S104 (Step 403). Subsequently, the audio characteristic extraction unit 107 extracts the audio characteristics of each unchanged audio characteristic domain in the audio to be restored, based on the unchanged audio characteristic domain information S104, and generates audio characteristic information S105 (Step 404). Lastly, the audio restoration unit 304 generates a restored audio S302, based on the modified audio structure information S301 and the audio characteristic information S105 (Step 3002).

Next, a concrete example of applying the example <VI> of this embodiment to the audio restoration function of the mobile videophone will be described. Here will be described a method of restoring an announcement speech from a mixed audio S101 where the announcement speech and chimes are overlapped, in a similar manner to the example <I>-<i>. Here, the point different from the first embodiment is that the audio restoration unit 304 restores the audio using the modified audio characteristic information S301 generated by the audio characteristic modification unit 303, instead of using the generated audio structure information S103 as it is.

To get things started, the mixed audio S101 where the announcement speech and chimes are overlapped (refer to FIG. 6) is received using the receiving unit 302 mounted on the mobile videophone 301.

First, the mixed audio separation unit 103 extracts the separated audio information S102 using the mixed audio S101 received by the receiving unit 302 in a similar manner to the example <I>-<i> in the first embodiment (corresponding to Step 401 of FIG. 33).

Next, the audio structure analysis unit 104 generates audio structure information S103 of the announcement speech in a similar manner to the example <I>-<i> in the first embodiment.

Next, the audio structure modification unit 303 modifies the audio structure information S103 generated by the audio structure analysis unit 104 so as to generate modified audio structure information S301 (corresponding to Step 3001 of FIG. 33). Here, it modifies phoneme sequence information which is the audio structure information S103 and generates an audio structure which is easy to understand by the user based on the modified phoneme sequence. For example, it can modify a phoneme sequence corresponding to the last part of a sentence included in the announcement speech into a phoneme sequence of honorific expression or dialect expression. This makes it possible to generate modified restored audio which is easy to understand and sounds natural. In this example, it does not modify the contents of the utterance.

Next, the unchanged audio characteristic domain analysis unit 106 obtains domains where audio characteristics remain unchanged, based on the separated audio information S102 extracted by the mixed audio separation unit 103, in a similar manner to the example <I>-<i> in the first embodiment, and generates the unchanged audio characteristic information S104 (corresponding to Step 403 of FIG. 33).

The audio characteristic extraction unit 107 extracts the audio characteristics of each domain, in which audio characteristics remain unchanged, of the announcement speech to be restored, based on the separated audio information S102 extracted by the mixed audio separation unit 103 and the unchanged audio characteristic domain information S104 generated by the unchanged audio characteristic domain analysis unit 106, and generates audio characteristic information S105 (corresponding to Step 404 of FIG. 33).

Next, the audio restoration unit 304 restores the announcement speech based on the modified audio structure information S301 generated by the audio structure modification unit 303 and the audio characteristic information S105 generated by the audio characteristic extraction unit 107 (corresponding to Step 3002 of FIG. 33). Here, it restores the whole announcement speech as restored audio S302 through speech synthesis, based on the modified audio characteristics.

Lastly, the user can listen to the restored announcement through the speaker 305.

<VII> Case of Restoring a Musical Audio

Figure 34:
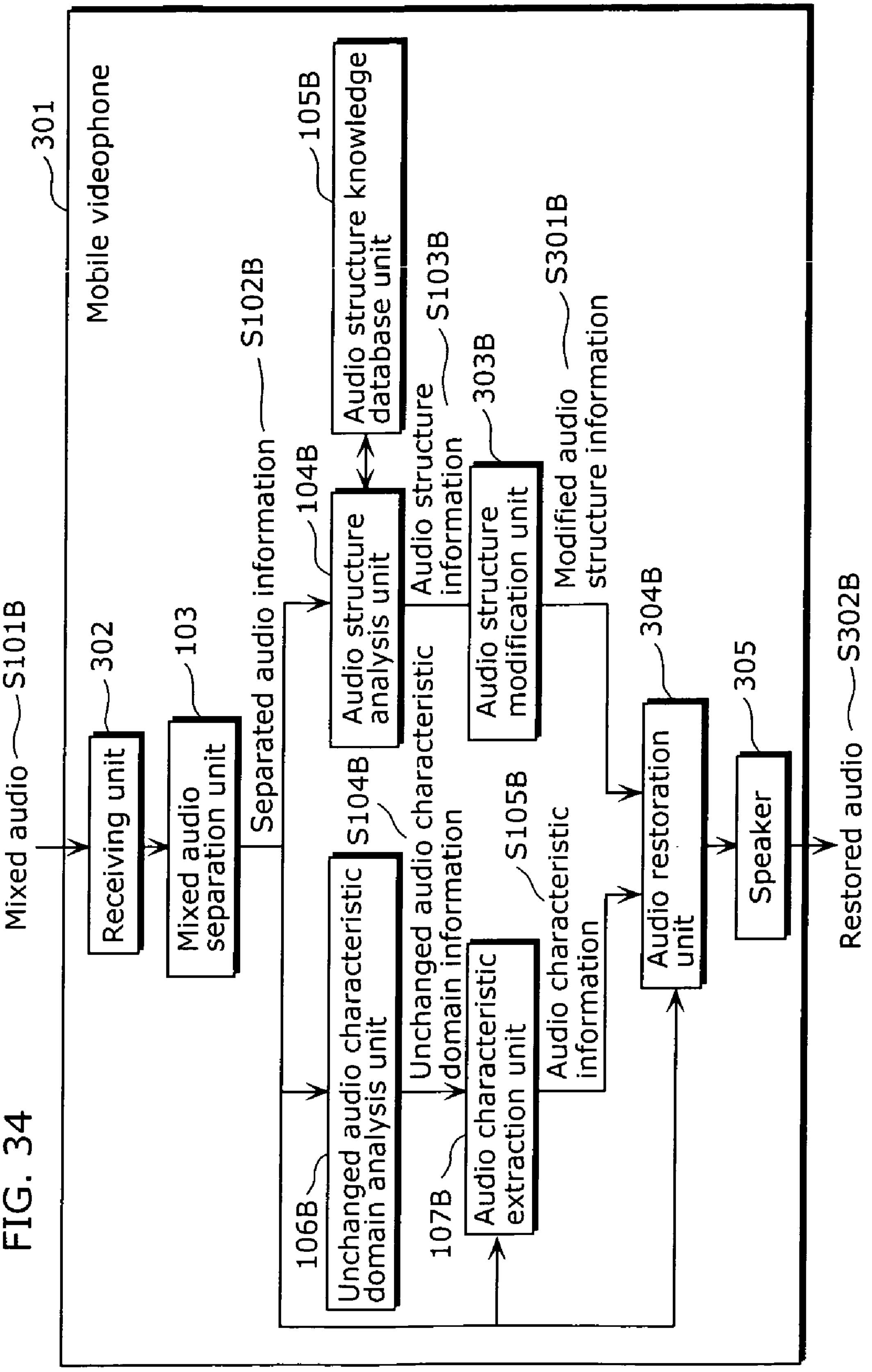
FIG. 34 is a block diagram showing another overall configuration of the audio restoration apparatus in the third embodiment of the present invention.

FIG. 34 is a block diagram showing the overall configuration of the audio restoration apparatus of the example <VII> in the third embodiment of the present invention. In FIG. 34, in a similar manner to the example <VI>, the mobile videophone 301 mounts an audio restoration function of extracting an audio which is desired by a user from a mixed audio, modifying the audio structure information of the audio, and generates modified restored audio which is listenable. The mobile videophone 301 includes: a receiving unit 302, a mixed audio separation unit 103, an audio structure analysis unit 104B, an audio structure knowledge database 105B, an audio structure modification unit 303B, an unchanged audio characteristic domain analysis unit 106B, an audio characteristic extraction unit 107B, an audio restoration unit 304B, and a speaker 305.

The receiving unit 302 inputs the mixed audio S101B and outputs it to the mixed audio separation unit 103.

The mixed audio separation unit 103 extracts an audio material to be restored which is separated audio information S102B from the mixed audio S101B.

The audio structure analysis unit 104B generates audio structure information S103B of the audio to be restored, based on the separated audio information S102B extracted by the mixed audio separation unit 103 and the audio structure knowledge database 105B.

The audio structure modification unit 303B modifies the audio structure information S103B generated by the audio structure analysis unit 104B so as to generate modified audio structure information S301B.

The unchanged audio characteristic domain analysis unit 106B obtains domains where audio characteristics remain unchanged based on the separated audio information S102B extracted by the mixed audio separation unit 103, and generates unchanged audio characteristic domain information S104B.

The audio characteristic extraction unit 107B extracts the audio characteristics of each domain, in which audio characteristics remain unchanged, of the audio to be restored, based on the unchanged audio characteristic domain information S104B generated by the unchanged audio characteristic domain analysis unit 106B. Subsequently, it generates audio characteristic Information S105B based on the extracted audio characteristics.

The audio restoration unit 304B generates restored audio S302B, based on the modified audio structure information S301B generated by the audio structure modification unit 303B and the audio characteristic information S105B generated by the audio characteristic extraction unit 107B.

The speaker 305 outputs the restored audio S302B generated by the audio restoration unit 304B.

Next, a concrete example of applying the example <VII> of this embodiment to the audio restoration function of the mobile videophone will be described. Here will be a method of restoring BGM playing in streets from the mixed audio S101B where the BGM and car's horns are overlapped in a similar manner to the example <II>-<i> in the first embodiment. Here, the point of difference from the example <VI> is that a musical audio is restored instead of speech.

To get things started, the mixed audio S101B where the BGM and the car's horns are overlapped (refer to FIG. 20) is received using the receiving unit 302 mounted on the mobile videophone 301.

First, the mixed audio separation unit 103 extracts the separated audio information S102B using the mixed audio S101B received by the receiving unit 302 in a similar manner to the example <II>-<i> in the first embodiment (corresponding to Step 401 of FIG. 33).

Next, the audio structure analysis unit 104B generates audio structure information S103B of the BGM in a similar manner to the example <II>-<i> in the first embodiment (corresponding to Step 402 of FIG. 33).

Next, the audio structure modification unit 303B modifies the audio structure information S103B generated by the audio structure analysis unit 104B so as to generate modified audio structure information S301B (corresponding to Step 3001 of FIG. 33). Here, t modifies a musical note sequence in order to make it possible to generate a modified restored audio which is easy to understand to the user. For example, in the case where the tempo of the BGM is too fast for an elderly person, it modifies the musical note sequence information into musical note sequence information which provides a slow tempo. In the case of restoring an alarm and the like, it may modify the cycle period of the audio. For example, since an elderly person has difficulty in hearing an audio having a fast cycle, it may reduce the speed of the audio in restoring the audio.

Next, the unchanged audio characteristic domain analysis unit 106B obtains domains where audio characteristics remain unchanged, based on the separated audio information S102B extracted by the mixed audio separation unit 103, in a similar manner to the example <II>-<i> in the first embodiment, and generates the unchanged audio characteristic information S104B (corresponding to Step 403 of FIG. 33).

The audio characteristic extraction unit 107B extracts the audio characteristics of each domain, in which audio characteristics remain unchanged, of the announcement speech to be restored, based on the separated audio information S102B extracted by the mixed audio separation unit 103 and the unchanged audio characteristic domain information S104B generated by the unchanged audio characteristic domain analysis unit 106B, and generates audio characteristic information S105B (corresponding to Step 404 of FIG. 33).

Next, the audio restoration unit 304B restores the BGM based on the modified audio structure information S301B generated by the audio structure modification unit 303B and the audio characteristic information S105B generated by the audio characteristic extraction unit 107B (corresponding to Step 3002 of FIG. 33). Here, it restores the whole BGM as restored audio S302B through musical note synthesis, based on the modified audio characteristics Lastly, the user can listen to the restored BGM through the speaker 305.

As described above, with the third embodiment of the present invention, it is possible to reproduce the real audio characteristics of an audio to be restored in a mixed audio, with high fidelity, by reproducing the real audio characteristics after: monitoring the changes of the audio characteristics of the audio to be restored which has been extracted from a mixed audio; segmenting the audio to be restored into time domains in each of which audio characteristics remain unchanged; and extracting audio characteristics of audio data (such as waveform data) having comparatively long durations in which correspond to the time domains which include the missing parts and where audio characteristics remain unchanged. Further, with the audio structure modification unit, it is possible to restore an audio which is listenable to the user and sounds natural.

Note that the audio restoration unit may restore an audio based on the auditory sense characteristic of the user, in the examples <VI> and <VII>. For example, it may modify the audio structure of an audio taking into account the time resolution of the auditory sense of the user. Note that the examples <VI> and <VII> have been described partly using the descriptions of the examples <I>-<i> and <II>-<i> in the first embodiment. However, examples which can be used here are not limited to the examples <I>-<i> and <II>-<i>. Audios may be restored in the examples <VI> and <VII> described partly using the descriptions of the examples <I>-<ii>, <II>-<ii> and <III> in the first embodiment.

Note that a mixed audio may include an audio part distorted due to transmission noises, an audio recording failure and the like.

Note that the audio characteristic modification unit of the second embodiment may be combined here so as to restore an audio.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The audio restoration apparatuses of the present invention can be used as apparatuses and the like which are desired to be provided with an audio restoration function. Such apparatuses desired to be provided with the function include an audio editing apparatus, a mobile phone, a mobile terminal, a video conferencing system, a headphone and a hearing aid.

What is claimed is:

1. An audio restoration apparatus which restores an audio to be restored, the audio to be restored having a missing audio part and being included in a mixed audio, and said audio restoration apparatus comprising:

a mixed audio separation unit operable to extract the audio to be restored included in the mixed audio;

an audio structure analysis unit operable to generate at least one of a phoneme sequence, a character sequence and a musical note sequence of the missing audio part in the extracted audio to be restored, based on an audio structure knowledge database in which semantics of audio are registered;

an unchanged audio characteristic domain analysis unit operable to segment the extracted audio to be restored into time domains in each of which an audio characteristic remains unchanged;

an audio characteristic extraction unit operable to identify a time domain where the missing audio part is located, from among the segmented time domains, and extract audio characteristics of the identified time domain in the audio to be restored; and an audio restoration unit operable to restore the missing audio part in the audio to be restored, using the extracted audio characteristics and the generated one or more of phoneme sequence, character sequence and musical note sequence.

2. The audio restoration apparatus according to claim 1, wherein said unchanged audio characteristic domain analysis unit is operable to determine time domains in each of which an audio characteristic remains unchanged, based on at least one of a voice characteristic change, a voice tone change, an audio color change, an audio volume change, a reverberation characteristic change, and an audio quality change.

3. The audio restoration apparatus according to claim 1, wherein said audio restoration unit is operable to restore a whole audio to be restored which is made up of the missing audio part, and a part other than the missing audio part, using the extracted audio characteristics and the generated one or more of the phoneme sequence, the character sequence and the musical note sequence.

4. An audio restoration method for restoring an audio to be restored, the audio to be restored having a missing audio part and being included in a mixed audio, and said audio restoration method comprising:

extracting the audio to be restored included in the mixed audio;

generating at least one of a phoneme sequence, a character sequence and a musical note sequence of the missing audio part in the extracted audio to be restored, based on an audio structure knowledge database in which semantics of audio are registered;

segmenting the extracted audio to be restored into time domains in each of which an audio characteristic remains unchanged;

identifying a time domain where the missing audio part is located, from among the segmented time domains, and extract audio characteristics of the identified time domain in the audio to be restored; and restoring the missing audio part in the audio to be restored, using the extracted audio characteristics and the generated one or more of phoneme sequence, character sequence and musical note sequence.

* * * * *